United States Patent
Brown

(10) Patent No.: US 6,311,095 B1
(45) Date of Patent: *Oct. 30, 2001

(54) SYSTEM AND METHOD FOR SIMULATION AND MODELING OF BIOPHARMACEUTICAL BATCH PROCESS MANUFACTURING FACILITIES

(76) Inventor: Peter G. Brown, 63 Clearwater Road, Newton, MA (US) 02162

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,777

(22) Filed: Feb. 6, 1998

Related U.S. Application Data

(60) Provisional application No. 60/037,387, filed on Feb. 7, 1997.

(51) Int. Cl.[7] .................................................. G06F 19/00
(52) U.S. Cl. .......................................... 700/117; 700/113
(58) Field of Search .................................... 700/112, 113, 700/114, 115, 116, 117, 118, 100, 97

(56) References Cited

U.S. PATENT DOCUMENTS

| | | | |
|---|---|---|---|
| 4,796,194 | 1/1989 | Atherton | 700/103 |
| 4,975,865 | 12/1990 | Carrette et al. | 700/10 |
| 5,006,992 | 4/1991 | Skeirik | 706/58 |

(List continued on next page.)

OTHER PUBLICATIONS

Sam G. Taylor et al., APICS, *Process Flow Scheduling: A Scheduling Systems Framework for Flow Manufacturing*, Copyright 1994 (168 pages).

Sam G. Taylor et al., APICS, *Can Process Flow Scheduling Help You?*, pp. 44–46, Mar. 1996.

Berstein et al., "A Simulation–based Decision Support System for a Specialty Chemicals Production Plant," *Proc. of the 1992 Winter Simulation Conference,* 1992, pp. 1262–1270.

Ehrlich et al., "Making Better Manufacturing Decisions with AIM," *Proc. of the 1996 Winter Simulation Conference,* 1996, pp. 485–491.

Faccenda et al., "A Combined Simulation/Optimization Approach to Process Plant Design," *Proc. of the 1992 Winter Simulation Conference,* 1992, pp. 1256–1261.

Ketcham et al., "A Generic Simulator for Continuous Flow Manufacturing," *Proc. of 1988 Winter Simulation Conference,* 1988, pp. 609–615.

Leitch et al., "A Real–Time Knowledge Based System for Product Quality Control," *International Conference on Control,* 1988, pp. 281–286.

(List continued on next page.)

*Primary Examiner*—William Grant
*Assistant Examiner*—Chadd J. Rapp
(74) *Attorney, Agent, or Firm*—Sterne, Kessler, Goldstein & Fox PLLC

(57) ABSTRACT

A system and method for the simulation and modeling of biopharmaceutical batch process manufacturing facilities is described herein. The system and method includes the steps of identifying a production process sequence, the production process sequence including a plurality of zsubprocesses. At least one of the plurality of subprocesses includes a plurality of batch cycles, each of which includes a plurality of unit operations. Each of the unit operations are identified by unit operation identifiers. Next, the system and method retrieves the process parameter information from a master list for each of the unit operation identifiers in the process sequence. The process parameter information includes information on discrete tasks associated with each unit operation. After the steps of identifying and retrieving, the system and method generates a process schedule that identifies initiation and completion times for each of the discrete tasks in the process sequence.

20 Claims, 42 Drawing Sheets

U.S. PATENT DOCUMENTS

| | | | |
|---|---|---|---|
| 5,148,370 | * | 9/1992 | Litt et al. .......................... 364/468.1 |
| 5,164,905 | | 11/1992 | Iwasaki et al. ...................... 700/112 |
| 5,237,508 | | 8/1993 | Furukawa et al. ................... 700/100 |
| 5,255,197 | * | 10/1993 | Iida ................................. 364/468.15 |
| 5,343,387 | | 8/1994 | Honma et al. .......................... 705/9 |
| 5,375,062 | * | 12/1994 | Aoki ............................... 364/468.05 |
| 5,402,367 | | 3/1995 | Sullivan et al. .......................... 703/6 |
| 5,402,526 | | 3/1995 | Bauman et al. ........................ 706/49 |
| 5,408,405 | | 4/1995 | Mozumder et al. ................... 700/31 |
| 5,428,525 | | 6/1995 | Cappelaere et al. ................... 700/49 |
| 5,440,478 | | 8/1995 | Fisher et al. ......................... 700/109 |
| 5,442,562 | | 8/1995 | Hopkins et al. ..................... 700/108 |
| 5,450,346 | * | 9/1995 | Krummen et al. .............. 364/140.01 |
| 5,463,555 | | 10/1995 | Ward et al. ............................. 700/96 |
| 5,495,417 | | 2/1996 | Fuduka et al. ....................... 700/112 |
| 5,594,639 | | 1/1997 | Atsumi ................................ 700/107 |
| 5,666,297 | | 9/1997 | Britt et al. .............................. 703/18 |
| 5,666,585 | | 9/1997 | Nagira et al. .......................... 399/10 |
| 5,737,581 | | 4/1998 | Keane ..................................... 703/6 |
| 5,757,659 | | 5/1998 | Arai et al. .............................. 702/22 |
| 5,774,875 | * | 6/1998 | Medeiros et al. ...................... 705/28 |
| 5,841,660 | * | 11/1998 | Robinson et al. ............. 364/468.22 |
| 5,969,973 | | 10/1999 | Bourne et al. ....................... 700/165 |
| 5,980,078 | | 11/1999 | Krivoshein et al. ..................... 700/1 |

OTHER PUBLICATIONS

Litt, J., "An Expert System to Perform On–Line Controller Tuning," *IEEE Control Systems Magazine,* vol. 11, Issue 3, Apr. 1991, pp. 18–23.

Copy of International Search Report from PCT Appl. No. PCT/US00/22104, 2 pages, mailed Jan. 25, 2001.

* cited by examiner

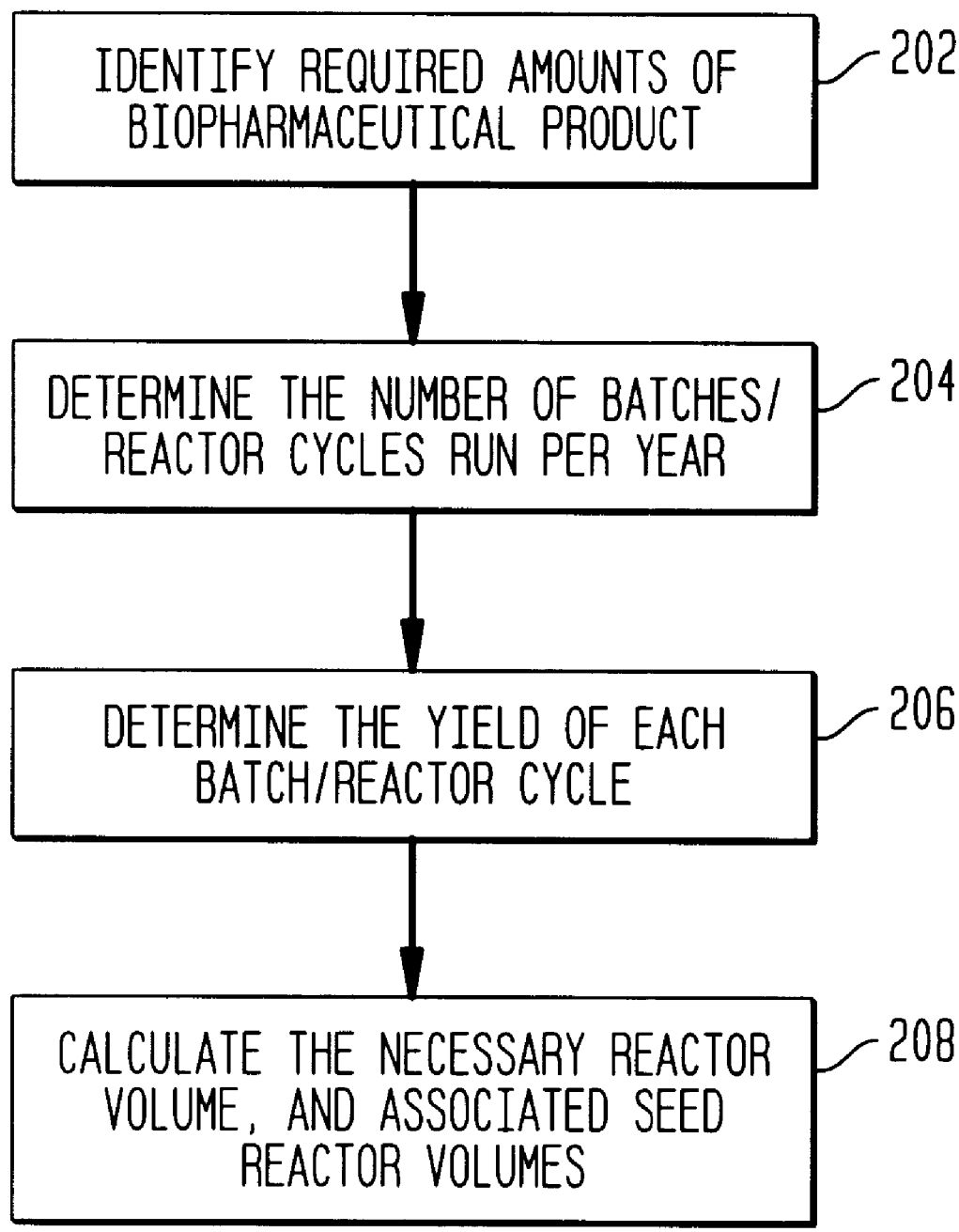

FIG. 3
UNIT OPERATIONS LIST

MICROBIAL FERMENTATION PROCESS

| UOP SEQ. NO. | CODE | UNIT OPERATION TYPE | CYCLES PER UnOp OFFSET (HRS) | BATCH UnOp START | BATCH UnOp END | BATCH OFFSET (HRS) | PROCESS UnOp START | PROCESS UnOp END | PROCESS OFFSET (HRS) | RECOVERY PRODUCT SWR | RECOVERY PRODUCT OAR | RECOVERY TOTAL PROTEIN SWR | RECOVERY TOTAL PROTEIN OAR |
|---|---|---|---|---|---|---|---|---|---|---|---|---|---|
| 1 | 1 | INOCULUM PREP | | | | | | | | | | | |
| 2 | 2 | FLASK GROWTH | | | | | | | | | | | |
| 3 | 53 | SEED FERMENTATION | | | | | | | | | | | |
| 4 | 3 | PRODUCTION FERMENTATION | 1 | 1 | 6 | | 1 | | | 100% | 100% | 100% | 100% |
| 5 | 51 | HEAT EXCHANGE | 1 | 1 | 6 | | 1 | | | 100% | 100% | 100% | 100% |
| 6 | 28 | CONT. CENTRIFUGATION/WHOLE CELL HARVEST | 3 | 1 | 6 | | 1 | | | 95% | 95% | 95% | 95% |
| 7 | 48 | RESUSPEND CELL PASTE | 3 | 1 | 6 | | 1 | | | 100% | 95% | 100% | 95% |
| 8 | 51 | HEAT EXCHANGE | 3 | 1 | 6 | | 1 | | | 100% | 95% | 100% | 95% |
| 9 | 31 | CELL DISRUPTION/HIGH PRESSURE | 1 | 1 | | | 1 | | | 80% | 76% | 90% | 86% |
| 10 | 51 | HEAT EXCHANGE | 3 | 8 | 10 | | 1 | | | 100% | 76% | 100% | 86% |
| 11 | 48 | RESUSPENSION/SURFACTANT | 3 | 8 | 10 | | 1 | | | 95% | 72% | 95% | 81% |
| 12 | 29 | CONT. CENTRIFUGATION/PRECIPITATE HARVEST | 2 | 8 | 10 | | 1 | | | 95% | 72% | 32% | 26% |
| 13 | 48 | RESUSPENSION/BUFFER | 2 | 11 | 12 | | 1 | | | 100% | 72% | 95% | 24% |
| 14 | 29 | ULTRAFILTRATION/CONCENTRATION/DILUTION | 1 | 11 | 12 | | 1 | | | 95% | 69% | 95% | 23% |
| 15 | 48 | MICROFILTRATION/TANGENTIAL FLOW | 1 | | | | 1 | | | 93% | 64% | 95% | 22% |
| 16 | 36 | PRODUCT ADSORPTION MPLC | 1 | | | | 1 | | | 85% | 54% | 33% | 7% |
| 17 | 34 | PRODUCT ADSORPTION MPLC | 1 | | | | 1 | | | 90% | 49% | 40% | 3% |
| 18 | 39 | ULTRAFILTRATION/FLOW DIALYSIS | 1 | | | | 1 | | | 95% | 46% | 95% | 3% |
| 19 | 39 | PRODUCT ADSORPTION MPLC | 1 | | | | 1 | | | 85% | 39% | 55% | 2% |
| 20 | 37 | ULTRAFILTRATION/FLOW DIALYSIS | 1 | | | | 1 | | | 90% | 35% | 95% | 1% |
| 21 | 39 | PRODUCT ADSORPTION MPLC | 1 | | | | 1 | | | 90% | 32% | 80% | 1% |
| 22 | 37 | MICROFILTRATION/DEAD END | 1 | | | | 1 | | | 95% | 30% | 95% | 1% |
| 23 | 99 | END | | | | | | | | | | | |

FIG. 4
UNIT OPERATIONS LIST

MAMMALIAN CELL CULTURE PROCESS

| UOP SEQ. NO. | CODE | UNIT OPERATION TYPE | CYCLES PER UnOp | UnOp OFFSET (HRS) | BATCH UnOp START | BATCH UnOp END | BATCH OFFSET (HRS) | PROCESS | PROCESS UnOp START | PROCESS UnOp END | OFFSET (HRS) | RECOVERY PRODUCT SWR | RECOVERY PRODUCT OAR | TOTAL PROTEIN SWR | TOTAL PROTEIN OAR |
|---|---|---|---|---|---|---|---|---|---|---|---|---|---|---|---|
| 1 | 4 | INITIAL SEEDING | 1 | | | | | 1 | | | | | | | |
| 2 | 5 | CULTURE VESSEL SPLIT | 1 | | | | | 1 | | | | | | | |
| 3 | 5 | CULTURE VESSEL SPLIT | 1 | | | | | 1 | | | | | | | |
| 4 | 5 | CULTURE VESSEL SPLIT | 1 | | | | | 1 | | | | | | | |
| 5 | 6 | SPINNER FLASK SPLIT | 1 | | | | | 1 | | | | | | | |
| 6 | 54 | SPINNER FLASK SPLIT | 1 | | | | | 1 | | | | | | | |
| 7 | 13 | STIRRED TANK REACTOR | 7 | 24 | | | | 1 | | | | | | | |
| 8 | 61 | HARVEST/FEED | 1 | | | | | 8 | 8 | 18 | 168 | | | | |
| 9 | 62 | HARVEST POOL | 1 | | | | | 8 | 8 | 18 | 168 | | | | |
| 10 | 34 | MF/TANGENTIAL FLOW | 1 | | | | | 8 | 8 | 18 | 168 | | | | |
| 11 | 36 | UF/CONCENTRATION | 1 | | | | | 8 | 8 | 18 | 168 | | | | |
| 12 | 39 | PAC/MPLC | 1 | | | | | 8 | 8 | 18 | 168 | | | | |
| 13 | 39 | PAC/MPLC | 1 | | | | | 8 | 8 | 18 | 168 | | | | |
| 14 | 36 | UF/CONCENTRATION | 1 | | | | | 8 | 8 | 18 | 168 | | | | |
| 15 | 39 | PAC/MPLC | 1 | | | | | 8 | 8 | 18 | 168 | | | | |
| 16 | 37 | UF/FLOW DIALYSIS | 1 | | | | | 8 | 8 | 18 | 168 | | | | |
| 17 | 39 | PAC/MPLC | 1 | | | | | 8 | 8 | 18 | 168 | | | | |
| 18 | 35 | MF/DEAD END | 1 | | | | | 8 | 8 | 18 | 168 | | | | |
| 19 | 99 | END | 1 | | | | | | | | | | | | |

FIG. 6A

| UNIT OPERATION ID CODE | UNIT OPERATION TYPE | PARAMETERS |
|---|---|---|
| 1 | INOCULUM PREP | # OF FLASKS, VOLUME OF FLASKS, TEMPERATURE, AGITATION, DURATION, FINAL OD |
| 2 | FLASK GROWTH | SCALE UP RATIO, MEDIA VOLUME, TEMPERATURE, AGITATION, DURATION, FINAL OD |
| 3 | FERMENTATION SEED | SCALE UP RATIO, FERMENTOR WORKING VOLUME, ANTIFOAM, BASE ACID, GROW TEMPERATURE, AGITATION, SPARGE RATE, BACK PRESSURE, TOTAL DURATION |
| 4 | FERMENTATION PRODUCTION | SCALE UP RATIO, GERMENTOR WORKING VOLUME, ANTIFOAM A, ANTIFOAM B, BASE, ACID, GROW TEMPERATURE, AGITATION, SPARGE RATE, BACK PRESSURE, TOTAL DURATION, FINAL OK, DRY CELL MASS, PRODUCT CONCENTRATION, CIP, SIP |
| 5 | HEAT EXCHANGE | PROCESS INITIAL & FINAL TEMP; UTILITY INITIAL & FINAL TEMP; PROCESS SPECIFIC HEAT; DESIGN TYPE, STEP RECOVERY OF PRODUCT, STEP RECOVERY OF T.P., TEMPERATURE REGULATION, CIP, SIP |
| 6 | BATCH CENTRIFUGATION | SYSTEM VOID VOLUME, RCF, TIME, VOLUME REDUCTION, WASH VOLUME, CLEAN, RINSE |
| 7 | RESOLUBLIZATION RESUSPENSION | REAGENT/PRODUCT RATIO, TITRATION SOLUTION, RESOLUBLIZATION, AGITATION, SOLUTION NAME, STEP RECOVERY OF THE PRODUCT, STEP RECOVERY OF T.P., TEMPERATURE REGULATION, CIP, SIP |
| 8 | CELL DISRUPTION HIGH PRESS. HOMMOGENIZATION | PRODUCT TERMPERATURE, UNILITY TEMPERATURE, VOID VOLUME, NUMBER OF PASSES, PRESSURE, FLOW RATE, TEMPERATURE INCREASE, WASH, RINSE, STEP RECOVERY OF PRODUCT, STEP RECOVERY OF T.P., TERMPERATURE REGULATION, CIP |
| 9 | DILUTE WITH SURFACTANT | REAGENT PRODUCT RATIO, TITRATION SOLUTION, DILUTION TIME, AGITATION, SOLUTION NAME, STEP RECOVERY OF PRODUCT, STEP RECOVERY OF T.P., TEMPERATURE REGULATION, CIP, SIP |
| 10 | BATCH CENTRIFUGATION PRECIPITATE HARVEST | SYSTEM VOID VOLUME, RCF, TIME, VOLUME REDUCTION, WASH VOLUME, CLEAN, RINSE, STEP RECOVERY OF PRODUCT, STEP RECOVERY OF T.P., TEMPERATURE REGULATION, CIP, SIP |
| 11 | RESUSPEND WITH CHAOTROPE | REAGENT/PRODUCT RATIO, TITRATION SOLUTION, RESOLUBLIZATION, AGITATION, SOLUTION NAME, STEP RECOVERY OF PRODUCT, STEP RECOVERY TO TP, TEMPERATURE REGULATION, CIP, SIP |
| ⋮ | ⋮ | ⋮ |

| SOLUTION TYPE | TASKS | TASK DURATION |
|---|---|---|
| S-101 | SETUP, PREINCUBATION, INCUBATION, CLEAN UP | 3, 3, 23, .3, HRS |
| S-101 | SETUP, PREINCUBATION, INCUBATION, CLEAN UP | 1, 1, 23, .3, HRS |
| S-101, 102, 103, 104, 105 | SETUP, PREINCUBATION, FERMENTATION, HARVEST, CIP, SIP, CLEAN UP | 1, 1, 21, .5, 1, 1, 3 HRS |
| S-101, 102, 103, 104, 105 | SETUP, PREINCUBATION, FERMENTATION, CIP, SIP, CLEAN UP | . |
|  | SETUP, TRANSFER, CIP, SIP, CLEAN UP | . |
| S-106 | SETUP, CENTRIFUGATION, WASH, CIP, SIP, CLEANUP | . |
| S-107 | SETUP, DILUTION, AGITATE, CIP, SIP, CLEAN UP | . |
| S-107 | SETUP, LYSIS, CIP, SIP, CLEAN UP | . |
| S-108 | SETUP, DILUTION, AGITATE, CIP, SIP, CLEAN UP | . |
| S-108 | SETUP, CENTRIFUGATION, WASH, CIP, SIP, CLEAN UP | . |
| S-109 | SETUP, FLUSH, PRIME, CONCENTRATION, DILUTION, WASH, FLUSH, STORE, CIP, SIP, CLEANUP | . |
| . | . | . |

FIG. 10

SAMPLE APPLICATION OF PROCESS DESIGN CYCLES IN PROCESS SCHEDULING

MICROBIAL FERMENTATION PROCESS (SEE UNIT OPERATION LIST)

|  |  | FIRST PROCESS CYCLE | SECOND PROCESS CYCLE |
|---|---|---|---|
|  | DURATION | WEEK    DAY | WEEK    DAY |

NOTE: NONE OF THE UNIT OPERATIONS IN THIS PROCESS HAVE MORE THAT 1 CYCLE PER UNIT OPERATION
(SEE UNIT OPERATION 8 IN THE MAMMALIAN CELL CULTURE PROCESS FOR AN EXAMPLE OF MULTIPLE CYCLES PER UNIT OPERATION)

UNIT OPERATIONS 1-6 UNDERGO THREE REPETATIVE CYCLES PER BATCH AS A SET BEFORE CONTINUING WITH UNIT OP 7
THIS TRANSLATES TO THREE RUNS ON A FERMENTOR WITH EACH HARVEST (UNIT OP 5 & 6) BEING STORED FOR POOLING AT UNIT OP 7
ASSOCIATED WITH EACH FERMENTOR RUN (UNIT OP 4) ARE THE PREVIOUS STEPS FOR INNOCULATION PREP (UNIT OPS 1-3)

1/3 FERMENTATION CYCLES PER BATCH
| | | | | |
|---|---|---|---|---|
| 1 | INOCULUM PREP | 24 HRS | 1 FRI - SAT | 2 FRI - SAT |
| 2 | FLASK GROWTH | 24 HRS | 2 SAT - SUN | 3 SAT - SUN |
| 3 | SEED FERMENTAION | 24 HRS | 2 SUN - MON | 3 SUN - MON |
| 4 | PRODUCTION FERMENTATION | 24 HRS | 2 MON - TUE | 3 MON - TUE |
| 5 | HEAT EXCHANGE | 1 HR | 2 TUE | 3 TUE |
| 6 | CENTRIFUGATION | 1 HR | 2 TUE | 3 TUE |

2/3 FERMENTATION CYCLES PER BATCH
| | | | | |
|---|---|---|---|---|
| 1 | INOCULUM PREP | 24 HRS | 2 SUN - MON | 3 SUN - MON |
| 2 | FLASK GROWTH | 24 HRS | 2 MON - TUE | 3 MON - TUE |
| 3 | SEED FERMENTAION | 24 HRS | 2 TUE - WED | 3 TUE - WED |
| 4 | PRODUCTION FERMENTATION | 24 HRS | 2 WED - THU | 3 WED - THU |
| 5 | HEAT EXCHANGE | 1 HR | 2 THU | 3 THU |
| 6 | CENTRIFUGATION | 1 HR | 2 THU | 3 THU |

3/3 FERMENTATION CYCLES PER BATCH
| | | | | |
|---|---|---|---|---|
| 1 | INOCULUM PREP | 24 HRS | 2 TUE - WED | 3 TUE - WED |
| 2 | FLASK GROWTH | 24 HRS | 2 WED - THU | 3 WED - THU |
| 3 | SEED FERMENTAION | 24 HRS | 2 THU - FRI | 3 THU - FRI |
| 4 | PRODUCTION FERMENTATION | 24 HRS | 2 FRI - SAT | 3 FRI - SAT |
| 5 | HEAT EXCHANGE | 1 HR | 2 SAT | 3 SAT |
| 6 | CENTRIFUGATION | 1 HR | 2 SAT | 3 SAT |

UNIT OPERATION 7 POOLS THE HARVESTS FROM THE THREE FERMENTATION CYCLES ABOVE
| | | | | |
|---|---|---|---|---|
| 7 | POOL HARVESTS | 3 HR | 3 MON | 4 MON |

UNIT OPERATIONS 8-9 UNDERGO THREE REPETATIVE CYCLES PER BATCH AS SET BEFORE CONTINUING WITH UNIT OPERATION 11
THIS TRANSLATES TO THREE CONSECUTIVE PASSES THROUGH CELL DISRUPTOR (UNIT OP 9) WITH ITS ASSOCIATED HEAT EXCHANGERS
(UNIT OP 8 & 10) AT THE INLET AND THE OUTLET OF THE CELL DISRUPTOR

1/3 DISRUPTION CYCLES PER BATCH
| | | | | |
|---|---|---|---|---|
| 8 | HEAT EXCHANGE | | | |
| 9 | CELL DISRUPTION | | | |
| 10 | HEAT EXCHANGE | 0.5 HR | 3 MON | 4 MON |

2/3 DISRUPTION CYCLES PER BATCH
| | | | | |
|---|---|---|---|---|
| 8 | HEAT EXCHANGE | | | |
| 9 | CELL DISRUPTION | | | |
| 10 | HEAT EXCHANGE | 0.5 HR | 3 MON | 4 MON |

3/3 DISRUPTION CYCLES PER BATCH
| | | | | |
|---|---|---|---|---|
| 8 | HEAT EXCHANGE | | | |
| 9 | CELL DISRUPTION | | | |
| 10 | HEAT EXCHANGE | 0.5 HR | 3 MON | 4 MON |

FIG. 11

SAMPLE APPLICATION OF PROCESS DESIGN CYCLES IN PROCESS SCHEDULING

MICROBIAL FERMENTATION PROCESS (SEE UNIT OPERATION LIST)

|  |  | DURATION | FIRST PROCESS CYCLE | | SECOND PROCESS CYCLE | |
|---|---|---|---|---|---|---|
|  |  |  | WEEK | DAY | WEEK | DAY |

UNIT OPS 11-12 UNDERGO TWO REPETATIVE CYCLES PER BATCH AS A SET BEFORE CONTINUING WITH UNIT OP 13
THIS TRANSLATES TO TWO CYCLES OF RESUSPENDING THE CELL TYSATE FROM THE CELL DISRUPTOR IN A MILD
SURFACTANT AND RECONCENTRATING THE INSOLUBLE PRODUCT TO A PASTE BY CENTRIFUGATION

1/2 PRODUCT WASHING CYCLES PER BATCH

| | | | | | | |
|---|---|---|---|---|---|---|
| 11 | RESUSPENSION | 0.5 HR | 3 MON | | 4 MON | |
| 12 | CENTRIFUGATION | 1 HR | 3 MON | | 4 MON | |

2/3 PRODUCT WASHING CYCLES PER BATCH

| | | | | | | |
|---|---|---|---|---|---|---|
| 11 | RESUSPENSION | 0.5 HR | 3 MON | | 4 MON | |
| 12 | CENTRIFUGATION | 1 HR | 3 MON | | 4 MON | |

UNIT OPS 13-22 UNDERGO ONLY ONE CYCLE PER UNIT OPERATION EACH TO THE END OF THE PROCESS

| | | | | | | |
|---|---|---|---|---|---|---|
| 13 | RESUSPENSION | 0.5 HR | 3 MON | | 4 MON | |
| 14 | BUFFER EXCHANGE | 2 HR | 3 MON | | 4 MON | |
| 15 | FILTRATION | 2 HR | 3 MON | | 4 MON | |
| 16 | LIQUID CHROMATOGRAPHY | 16 HRS | 3 MON - TUE | | 4 MON - TUE | |
| 17 | LIQUID CHROMATOGRAPHY | 4 HRS | 3 TUE | | 4 TUE | |
| 18 | BUFFER EXCHANGE | 2 HRS | 3 TUE | | 4 TUE | |
| 19 | LIQUID CHROMATOGRAPHY | 2 HRS | 3 WED | | 4 WED | |
| 20 | BUFFER EXCHANGE | 2 HRS | 3 WED | | 4 WED | |
| 21 | LIQUID CHROMATOGRAPHY | 2 HRS | 3 WED | | 4 WED | |
| 22 | FILTRATION | 2 HRS | 3 WED | | 4 WED | |

FIG. 12A-1

| OPERATION | PROCESS TIME LINE | | | REL. TIME SCALE (HRS) | | | ABS. DAYS | | START | | FINISH | | CALCULATIONS |
|---|---|---|---|---|---|---|---|---|---|---|---|---|---|
| | DURATION (HRS.) | | | PREP | EXEC. | COMPL. | START | END | DATE | TIME | DATE | TIME | |
| | CALC. | A/D | ADJ. | | | | | | | | | | |
| 1 A INOCULUM PREP | | | | | 15.5 | | | | 06/03/96 | 08:00 AM | | | |
| SET UP | 3.0 | 0.0 | 3.0 HRS | 12.5 | | | 0.40 | 0.52 | 06/03/96 | 09:30 AM | 06/03/96 | 12:30 PM | |
| PREINCUBATION | 3.0 | 0.0 | 3.0 HRS | 15.5 | | | 0.52 | 0.65 | 06/03/96 | 12:30 PM | 06/03/96 | 03:30 PM | |
| INCUBATION | 23.0 | 0.0 | 23.0 HRS | | | | 0.65 | 1.60 | 06/03/96 | 03:30 PM | 06/04/96 | 02:30 PM | |
| CLEAN UP | 0.3 | 0.0 | 0.3 HRS | | 38.5 | 38.8 | 1.60 | 1.61 | 06/04/96 | 02:30 PM | 06/04/96 | 02:45 PM | |
| SUBTOTAL | 29.0 | | 29.0 HRS | | 38.5 | | | | | | | | |
| 2 A FLASK GROWTH | | | | | | | | | | | | | |
| SET UP | 1.0 | 0.0 | 1.0 HRS | 37.5 | | | 1.52 | 1.56 | 06/04/96 | 12:30 PM | 06/04/96 | 01:30 PM | |
| PREINCUBATION | 1.0 | 0.0 | 1.0 HRS | 38.5 | | | 1.56 | 1.60 | 06/04/96 | 01:30 PM | 06/04/96 | 02:30 PM | |
| INCUBATION | 23.0 | 0.0 | 23.0 HRS | | | | 1.60 | 2.56 | 06/04/96 | 02:30 PM | 06/05/96 | 01:30 PM | |
| CLEAN UP | 0.3 | 0.0 | 0.3 HRS | | 61.5 | 61.8 | 2.56 | 2.57 | 06/05/96 | 01:30 PM | 06/05/96 | 01:45 PM | |
| SUBTOTAL | 25.0 | | 25.0 HRS | | 61.5 | | | | | | | | |
| 3 A SEED FERMENTATION | | | | | | | | | | | | | |
| SET UP | 1.0 | 0.0 | 1.0 HRS | 60.5 | | | 2.48 | 2.52 | 06/05/96 | 11:30 AM | 06/05/96 | 12:30 PM | |
| PREINCUBATION | 1.0 | 0.0 | 1.0 HRS | 61.5 | | | 2.52 | 2.56 | 06/05/96 | 12:30 PM | 06/05/96 | 01:30 PM | |
| FERMENTATION | 21.0 | 0.0 | 21.0 HRS | | 82.5 | | 2.56 | 3.44 | 06/05/96 | 01:30 PM | 06/06/96 | 10:30 AM | |
| HARVEST | 0.5 | 0.0 | 0.5 HRS | | 83.0 | 83.5 | 3.44 | 3.46 | 06/06/96 | 10:30 AM | 06/06/96 | 11:00 AM | 50.0 L    1.7 LPM  =  0.50 HRS |
| CIP | 1.0 | 0.0 | 1.0 HRS | | | 84.5 | 3.44 | 3.48 | 06/06/96 | 10:30 AM | 06/06/96 | 11:30 AM | |
| SIP | 1.0 | 0.0 | 1.0 HRS | | | 87.5 | 3.48 | 3.52 | 06/06/96 | 11:30 AM | 06/06/96 | 12:30 PM | |
| CLEAN UP | 3.0 | 0.0 | 3.0 HRS | | | | 3.52 | 3.65 | 06/06/96 | 12:30 PM | 06/06/96 | 03:30 PM | |
| SUBTOTAL | 28.5 | | 28.5 HRS | | 83.0 | | | | | | | | |

FIG. 12A-2

| | 3 | 4 | 5 | 6 | 7 | 8 | 9 | 10 | 11 | 12 | 13 | 14 | 15 |
|---|---|---|---|---|---|---|---|---|---|---|---|---|---|
| 26 | 4 A PRODUCTION FERMENTATION | | | | | | | | | | | | |
| 27 | SET UP | 1.00 | 0.0 | 1.0 HRS | | | | | | | | | |
| 28 | PREINCUBATION | 1.00 | 0.0 | 1.0 HRS | 82.5 | | | 3.38 | 3.42 | 06/06/96 09:00 AM | 06/06/96 10:00 AM | |
| 29 | FERMENTATION | 21.00 | 0.0 | 21.0 HRS | 83.0 | | | 3.42 | 3.46 | 06/06/96 10:00 AM | 06/06/96 11:00 AM | |
| 30 | CIP | 1.00 | 0.0 | 1.0 HRS | | 104.0 | 105.0 | 3.46 | 4.33 | 06/06/96 11:00 AM | 06/07/96 08:00 AM | |
| 31 | SIP | 1.00 | 0.0 | 1.0 HRS | | | 106.0 | 4.33 | 4.38 | 06/07/96 08:00 AM | 06/07/96 09:00 AM | |
| 32 | | | | | | | 108.0 | 4.38 | 4.42 | 06/07/96 09:00 AM | 06/07/96 10:00 AM | |
| 33 | CLEAN UP | 2.00 | 0.0 | 2.0 HRS | | | | 4.42 | 4.50 | 06/07/96 10:00 AM | 06/07/96 12:00 PM | |
| 34 | SUBTOTAL | 27.0 | | 27.0 HRS | | 104.0 | | | | | | |
| 35 | | | | | | | | | | | | | |
| 36 | 5 A HEAT EXCHANGE | | | | | | | | | | | | |
| 37 | | | | | | | | | | | | | |
| 38 | SET UP | 0.50 | 0.0 | 0.5 HRS | 104.5 | | | 4.33 | 4.35 | 06/07/96 08:00 AM | 06/07/96 08:30 AM | |
| 39 | TRANSFER | 1.00 | 0.0 | 1.0 HRS | | 105.0 | 106.0 | 4.33 | 4.38 | 06/07/96 08:00 AM | 06/07/96 09:00 AM | 562.1 LB = 9.4 LPM = 1.00 HRS |
| 40 | CIP | 1.00 | 0.0 | 1.0 HRS | | | 107.0 | 4.38 | 4.42 | 06/07/96 09:00 AM | 06/07/96 10:00 AM | |
| 41 | SIP | 1.00 | 0.0 | 1.0 HRS | | | 109.0 | 4.42 | 4.46 | 06/07/96 10:00 AM | 06/07/96 11:00 AM | |
| 42 | CLEAN UP | 2.00 | 0.0 | 2.0 HRS | | | | 4.46 | 4.54 | 06/07/96 11:00 AM | 06/07/96 01:00 PM | |
| 43 | SUBTOTAL | 5.0 | | 5.0 HRS | | 105.0 | | | | | | |
| 44 | | | | | | | | | | | | | |
| 45 | 6 A CONT. CENT./SOLIDS | | | | | | | | | | | | |
| 46 | | | | | | | | | | | | | |
| 47 | SET UP | 1.00 | 0.0 | 1.0 HRS | 105.0 | | | 4.33 | 4.38 | 06/07/96 08:00 AM | 06/07/96 09:00 AM | |
| 48 | CENTRIFUGATION | 1.00 | 0.0 | 1.0 HRS | | 106.0 | 106.4 | 4.38 | 4.42 | 06/07/96 09:00 AM | 06/07/96 10:00 AM | 562.1 LB = 9.4 LPM = 1.00 HRS |
| 49 | WASH | 0.10 | 0.0 | 0.1 HRS | | 106.1 | 107.4 | 4.42 | 4.42 | 06/07/96 10:00 AM | 06/07/96 10:06 AM | 1.0 LB = 0.2 LPM = 0.10 HRS |
| 50 | CIP | 0.25 | 0.0 | 0.3 HRS | | | 107.9 | 4.42 | 4.43 | 06/07/96 10:06 AM | 06/07/96 10:21 AM | 20.0 LB = 1.3 LPM = 0.25 HRS |
| 51 | SIP | 1.00 | 0.0 | 1.0 HRS | | | | 4.43 | 4.47 | 06/07/96 10:21 AM | 06/07/96 11:21 AM | |
| 52 | CLEAN UP | 0.50 | 0.0 | 0.5 HRS | | | | 4.47 | 4.49 | 06/07/96 11:21 AM | 06/07/96 11:51 AM | |
| 53 | SUBTOTAL | 3.85 | | 3.85 HRS | | 106.1 | | | | | | |
| 54 | | | | | | | | | | | | | |
| 55 | 1 B INOCULUM PREP | | | | | | | | | | | | |
| 56 | | | | | | | | | | | | | |
| 57 | SET UP | 1.00 | 0.0 | 1.0 HRS | 14.5 | | | 0.56 | 0.60 | 06/03/96 01:30 PM | 06/03/96 02:30 PM | |
| 58 | PREINCUBATION | 1.00 | 0.0 | 1.0 HRS | 15.5 | | | 0.60 | 0.65 | 06/03/96 02:30 PM | 06/03/96 03:30 PM | |

FIG. 12B-1

| | | PROCESS TIME LINE | | | REL. TIME SCALE (HRS) | | | ABS. DAYS | | START | | FINISH | | CALCULATIONS |
|---|---|---|---|---|---|---|---|---|---|---|---|---|---|---|
| | OPERATION | DURATION (HRS.) | | | PREP | EXEC. | COMPL. | START | END | DATE | TIME | DATE | TIME | |
| | | CALC. | A/D | ADJ. | | | | | | | | | | |
| 59 | INCUBATION | 23.0 | 0.0 | 23.0 HRS | | 15.5 | | 0.65 | 1.60 | 06/03/96 | 08:00 AM | 06/04/96 | 02:30 PM | |
| 60 | CLEAN UP | 0.3 | 0.0 | 0.3 HRS | | 38.5 | 38.8 | 1.60 | 1.61 | 06/04/96 | 02:30 PM | 06/04/96 | 02:45 PM | |
| 60 | SUBTOTAL | 25.0 | | 25.0 HRS | | 38.5 | | | | | | | | |
| 61 | | | | | | | | | | | | | | |
| | 2 B FLASK GROWTH | | | | | | | | | | | | | |
| 62 | | | | | | | | | | | | | | |
| 63 | | | | | | | | | | | | | | |
| 64 | SET UP | 1.0 | 0.0 | 1.0 HRS | 37.5 | | | 1.52 | 1.56 | 06/04/96 | 12:30 PM | 06/04/96 | 01:30 PM | |
| 65 | PREINCUBATION | 1.0 | 0.0 | 1.0 HRS | 38.5 | | | 1.56 | 1.60 | 06/04/96 | 01:30 PM | 06/04/96 | 02:30 PM | |
| 66 | INCUBATION | 23.0 | 0.0 | 23.0 HRS | | 61.5 | | 1.60 | 2.56 | 06/04/96 | 02:30 PM | 06/05/96 | 01:30 PM | |
| 67 | CLEAN UP | 0.3 | 0.0 | 0.3 HRS | | | 61.8 | 2.56 | 2.57 | 06/05/96 | 01:30 PM | 06/05/96 | 01:45 PM | |
| 67 | SUBTOTAL | 25.0 | | 25.0 HRS | | 61.5 | | | | | | | | |
| 68 | | | | | | | | | | | | | | |
| | 3 B SEED FERMENTATION | | | | | | | | | | | | | |
| 69 | | | | | | | | | | | | | | |
| 70 | SET UP | 1.0 | 0.0 | 1.0 HRS | 60.5 | | | 2.48 | 2.52 | 06/05/96 | 11:30 AM | 06/05/96 | 12:30 PM | |
| 71 | PREINCUBATION | 1.0 | 0.0 | 1.0 HRS | 61.5 | | | 2.52 | 2.56 | 06/05/96 | 12:30 PM | 06/05/96 | 01:30 PM | |
| 72 | FERMENTATION | 21.0 | 0.0 | 21.0 HRS | | 82.5 | | 2.56 | 3.44 | 06/05/96 | 01:30 PM | 06/06/96 | 10:30 AM | |
| 73 | HARVEST | 0.5 | 0.0 | 0.5 HRS | | 83.0 | | 3.44 | 3.46 | 06/06/96 | 10:30 AM | 06/06/96 | 11:00 AM | 50.0 L    1.7 LPM = 0.50 HRS |
| 74 | CIP | 1.0 | 0.0 | 1.0 HRS | | | 83.5 | 3.44 | 3.48 | 06/06/96 | 10:30 AM | 06/06/96 | 11:30 AM | |
| 75 | SIP | 1.0 | 0.0 | 1.0 HRS | | | 84.5 | 3.48 | 3.52 | 06/06/96 | 11:30 AM | 06/06/96 | 12:30 PM | |
| 76 | CLEAN UP | 3.0 | 0.0 | 3.0 HRS | | | 87.5 | 3.52 | 3.65 | 06/06/96 | 12:30 PM | 06/06/96 | 03:30 PM | |
| 77 | SUBTOTAL | 28.5 | | 28.5 HRS | | 83.0 | | | | | | | | |
| 78 | | | | | | | | | | | | | | |
| 79 | | | | | | | | | | | | | | |
| | 4 B PRODUCTION FERMENTATION | | | | | | | | | | | | | |
| 80 | | | | | | | | | | | | | | |
| 81 | SET UP | 1.0 | 0.0 | 1.0 HRS | 82.0 | | | 3.38 | 3.42 | 06/06/96 | 09:00 AM | 06/06/96 | 10:00 AM | |
| 82 | PREINCUBATION | 1.0 | 0.0 | 1.0 HRS | 83.0 | | | 3.42 | 3.46 | 06/06/96 | 10:00 AM | 06/06/96 | 11:00 AM | |
| 83 | FERMENTATION | 21.0 | 0.0 | 21.0 HRS | | 104.0 | | 3.46 | 4.33 | 06/06/96 | 11:00 AM | 06/07/96 | 08:00 AM | |

FIG. 12B-2

| | | | | | | | | | | |
|---|---|---|---|---|---|---|---|---|---|---|
| 85 | CIP | 1.0 | 0.0 | 1.0 HRS | | 105.0 | 4.33 | 4.38 | 06/07/96 | 08:00 AM 06/07/96 09:00 AM | |
| 86 | SIP | 1.0 | 0.0 | 1.0 HRS | | 106.0 | 4.38 | 4.42 | 06/07/96 | 09:00 AM 06/07/96 10:00 AM | |
| 87 | CLEAN UP | 2.0 | 0.0 | 2.0 HRS | | 108.0 | 4.42 | 4.50 | 06/07/96 | 10:00 AM 06/07/96 12:00 PM | |
| 88 | SUBTOTAL | 27.0 | | 27.0 HRS | 104.0 | | | | | | |
| 89 | | | | | | | | | | | |
| 90 | 5 B HEAT EXCHANGE | | | | | | | | | | |
| 91 | | | | | | | | | | | |
| 92 | SET UP | 0.50 | 0.0 | 0.5 HRS | 104.5 | | 4.33 | 4.35 | 06/07/96 | 08:00 AM 06/07/96 08:30 AM | |
| 93 | TRANSFER | 1.00 | 0.0 | 1.0 HRS | | 106.0 | 4.33 | 4.38 | 06/07/96 | 08:00 AM 06/07/96 09:00 AM | 562.1 lb 9.4 LPM = 1.00 HRS |
| 94 | CIP | 1.0 | 0.0 | 1.0 HRS | | 107.0 | 4.38 | 4.42 | 06/07/96 | 09:00 AM 06/07/96 10:00 AM | |
| 95 | SIP | 1.0 | 0.0 | 1.0 HRS | | | 4.42 | 4.46 | 06/07/96 | 10:00 AM 06/07/96 11:00 AM | |
| 96 | CLEAN UP | 2.0 | 0.0 | 2.0 HRS | | 109.0 | 4.46 | 4.54 | 06/07/96 | 11:00 AM 06/07/96 01:00 PM | |
| 97 | SUBTOTAL | 5.0 | | 5.0 HRS | 105.0 | | | | | | |
| 98 | | | | | | | | | | | |
| 99 | 6 B CONT. CENT./SOLIDS | | | | | | | | | | |
| 100 | | | | | | | | | | | |
| 101 | SET UP | 1.00 | 0.0 | 1.0 HRS | | 106.0 | 4.33 | 4.38 | 06/07/96 | 08:00 AM 06/07/96 09:00 AM | |
| 102 | CENTRIFUGATION | 1.00 | 0.0 | 1.0 HRS | | 106.1 | 4.38 | 4.42 | 06/07/96 | 09:00 AM 06/07/96 10:00 AM | 562.1 lb 9.4 LPM = 1.00 HRS |
| 103 | WASH | 0.10 | 0.0 | 0.1 HRS | | | 4.42 | 4.42 | 06/07/96 | 10:00 AM 06/07/96 10:06 AM | 1.0 lb 0.2 LPM = 0.10 HRS |
| 104 | CIP | 0.25 | 0.0 | 0.3 HRS | | 106.4 | 4.42 | 4.43 | 06/07/96 | 10:06 AM 06/07/96 10:21 AM | 20.0 lb 1.3 LPM = 0.25 HRS |
| 105 | SIP | 1.00 | 0.0 | 1.0 HRS | | 107.4 | 4.43 | 4.47 | 06/07/96 | 10:21 AM 06/07/96 11:21 AM | |
| 106 | CLEAN UP | 0.50 | 0.0 | 0.5 HRS | | 107.9 | 4.47 | 4.49 | 06/07/96 | 11:21 AM 06/07/96 11:51 AM | |
| 107 | SUBTOTAL | 3.85 | | 3.85 HRS | 106.1 | | | | | | |
| 108 | | | | | | | | | | | |
| 109 | 1 C INOCULUM PREP | | | | | | | | | | |
| 110 | | | | | | | | | | | |
| 111 | SET UP | 1.0 | 0.0 | 1.0 HRS | 14.5 | | 0.50 | 0.56 | 06/03/96 | 01:30 PM 06/03/96 02:30 PM | |
| 112 | PREINCUBATION | 1.0 | 0.0 | 1.0 HRS | 15.5 | | 0.60 | 0.65 | 06/03/96 | 02:30 PM 06/03/96 03:30 PM | |
| 113 | INCUBATION | 23.0 | 0.0 | 23.0 HRS | | 38.8 | 0.65 | 1.60 | 06/03/96 | 03:30 PM 06/04/96 02:30 PM | |
| 114 | CLEAN UP | 0.3 | 0.0 | 0.3 HRS | | | 1.60 | 1.61 | 06/04/96 | 02:30 PM 06/04/96 02:45 PM | |
| 115 | SUBTOTAL | 25.0 | | 25.0 HRS | 38.5 | | | | | | |

FIG. 12C-1

| | | PROCESS TIME LINE | | | | | | | | | |
|---|---|---|---|---|---|---|---|---|---|---|---|
| | | DURATION (HRS.) | | | REL. TIME SCALE (HRS) | | ABS. DAYS | | START | | |
| | OPERATION | CALC. | A/D | ADJ. | PREP | EXEC. | COMPL. | START | END | DATE | TIME |
| | 2 C FLASK GROWTH | | | | | 15.5 | | | | 06/03/96 | 08:00 AM |
| 116 | | | | | | | | | | | |
| 117 | | | | | | | | | | | |
| 118 | SET UP | 1.0 | 0.0 | 1.0 HRS | 37.5 | | | 1.52 | 1.56 | 06/04/96 | 12:30 PM |
| 119 | PREINCUBATION | 1.0 | 0.0 | 1.0 HRS | 38.5 | | | 1.56 | 1.60 | 06/04/96 | 01:30 PM |
| 120 | INCUBATION | 23.0 | 0.0 | 23.0 HRS | | 61.5 | | 1.60 | 2.56 | 06/04/96 | 02:30 PM |
| 121 | CLEAN UP | 0.3 | 0.0 | 0.3 HRS | | | 61.8 | 2.56 | 2.57 | 06/05/96 | 01:30 PM |
| 121 | SUBTOTAL | 25.0 | | 25.0 HRS | | 61.5 | | | | | |
| 122 | | | | | | | | | | | |
| 123 | 3 C SEED FERMENTATION | | | | | | | | | | |
| 124 | SET UP | 1.0 | 0.0 | 1.0 HRS | 60.5 | | | 2.48 | 2.52 | 06/05/96 | 11:30 AM |
| 125 | PREINCUBATION | 1.0 | 0.0 | 1.0 HRS | 61.5 | | | 2.52 | 2.56 | 06/05/96 | 12:30 PM |
| 126 | FERMENTATION | 21.0 | 0.0 | 21.0 HRS | | 82.5 | | 2.56 | 3.44 | 06/05/96 | 01:30 PM |
| 127 | HARVEST | 0.5 | 0.0 | 0.5 HRS | | 83.0 | | 3.44 | 3.46 | 06/06/96 | 10:30 AM |
| 128 | CIP | 1.0 | 0.0 | 1.0 HRS | | | 83.5 | 3.46 | 3.48 | 06/06/96 | 10:30 AM |
| 129 | SIP | 1.0 | 0.0 | 1.0 HRS | | | 84.5 | 3.48 | 3.52 | 06/06/96 | 11:30 AM |
| 130 | CLEAN UP | 3.0 | 0.0 | 3.0 HRS | | | 87.5 | 3.52 | 3.65 | 06/06/96 | 12:30 PM |
| 131 | SUBTOTAL | 28.5 | | 28.5 HRS | | 83.0 | | | | | |
| 132 | | | | | | | | | | | |
| 133 | 4 C PRODUCTION FERMENTATION | | | | | | | | | | |
| 134 | SET UP | 1.0 | 0.0 | 1.0 HRS | 82.0 | | | 3.38 | 3.42 | 06/06/96 | 09:00 AM |
| 135 | PREINCUBATION | 1.0 | 0.0 | 1.0 HRS | 83.0 | | | 3.42 | 3.46 | 06/06/96 | 10:00 AM |
| 136 | FERMENTATION | 21.0 | 0.0 | 21.0 HRS | | 104.0 | | 3.46 | 4.33 | 06/06/96 | 11:00 AM |
| 137 | CIP | 1.0 | 0.0 | 1.0 HRS | | | 105.0 | 4.33 | 4.38 | 06/07/96 | 08:00 AM |
| 138 | SIP | 1.0 | 0.0 | 1.0 HRS | | | 106.0 | 4.38 | 4.42 | 06/07/96 | 09:00 AM |
| 139 | CLEAN UP | 2.0 | 0.0 | 2.0 HRS | | | 108.0 | 4.42 | 4.50 | 06/07/96 | 10:00 AM |
| 140 | SUBTOTAL | 27.0 | | 27.0 HRS | | 104.0 | | | | | |
| 141 | | | | | | | | | | | |
| 142 | | | | | | | | | | | |

| FINISH | | CALCULATIONS |
|---|---|---|
| DATE | TIME | |
| | | |
| 06/04/96 | 01:30 PM | |
| 06/04/96 | 02:30 PM | |
| 06/05/96 | 01:30 PM | |
| 06/05/96 | 01:45 PM | |
| | | |
| | | |
| 06/05/96 | 12:30 PM | |
| 06/05/96 | 01:30 PM | |
| 06/06/96 | 10:30 AM | |
| 06/06/96 | 11:00 AM | 50.0 L  1.7 LPM = 0.50 HRS |
| 06/06/96 | 11:30 AM | |
| 06/06/96 | 12:30 PM | |
| 06/06/96 | 03:30 PM | |
| | | |
| | | |
| 06/06/96 | 10:00 AM | |
| 06/06/96 | 11:00 AM | |
| 06/07/96 | 08:00 AM | |
| 06/07/96 | 09:00 AM | |
| 06/07/96 | 10:00 AM | |
| 06/07/96 | 12:00 PM | |

FIG. 12C-2

| | | | | | | | | | | |
|---|---|---|---|---|---|---|---|---|---|---|
| 143 | 5 C HEAT EXCHANGE | | | | | | | | | |
| 144 | | | | | | | | | | |
| 145 | | | | 104.5 | | | | | | |
| 146 | SET UP | 0.50 | 0.0 | 0.5 HRS | | | | | | |
| 147 | TRANSFER | 1.00 | 0.0 | 1.0 HRS | 105.0 | 4.35 | 06/07/96 08:00 AM | 06/07/96 08:30 AM | 562.1 LB | 9.4 LPM = 1.00 HRS |
| 148 | CIP | 1.00 | 0.0 | 1.0 HRS | | 4.38 | 06/07/96 09:00 AM | 06/07/96 09:00 AM | | |
| 149 | SIP | 1.00 | 0.0 | 1.0 HRS | | 4.42 | 06/07/96 09:00 AM | 06/07/96 10:00 AM | | |
| 150 | CLEAN UP | 2.00 | 0.0 | 2.0 HRS | | 4.46 | 06/07/96 10:00 AM | 06/07/96 11:00 AM | | |
| | | | | | | 4.54 | 06/07/96 11:00 AM | 06/07/96 01:00 PM | | |
| 151 | SUBTOTAL | 5.0 | | 5.0 HRS | 105.0 | | | | | |
| 152 | | | | | | | | | | |
| 153 | 6 C CONT. CENT./SOLIDS | | | | | | | | | |
| 154 | | | | 105.0 | | | | | | |
| 155 | SET UP | 1.00 | 0.0 | 1.0 HRS | | 4.38 | 06/07/96 08:00 AM | 06/07/96 09:00 AM | 562.1 LB | 9.4 LPM = 1.00 HRS |
| 156 | CENTRIFUGATION | 1.00 | 0.0 | 1.0 HRS | 106.0 | 4.42 | 06/07/96 09:00 AM | 06/07/96 10:00 AM | 1.0 LB | 0.2 LPM = 0.10 HRS |
| 157 | WASH | 0.10 | 0.0 | 0.1 HRS | 106.1 | 4.42 | 06/07/96 10:00 AM | 06/07/96 10:06 AM | 20.0 LB | 1.3 LPM = 0.25 HRS |
| 158 | CIP | 0.25 | 0.0 | 0.3 HRS | | 4.43 | 06/07/96 10:06 AM | 06/07/96 10:21 AM | | |
| 159 | SIP | 1.00 | 0.0 | 1.0 HRS | | 4.47 | 06/07/96 10:21 AM | 06/07/96 11:21 AM | | |
| 160 | CLEAN UP | 0.50 | 0.0 | 0.5 HRS | | 4.49 | 06/07/96 11:21 AM | 06/07/96 11:51 AM | | |
| 161 | SUBTOTAL | 3.85 | | 3.85 HRS | 106.1 | | | | | |
| 162 | | | | | | | | | | |
| 163 | 7 A RESOLUBLIZATION | | | | | | | | | |
| 164 | | | | 106.1 | | | | | | |
| 165 | SET UP | 1.00 | 0.0 | 1.0 HRS | | 4.42 | 06/07/96 09:06 AM | 06/07/96 10:06 AM | 46.7 LB | 1.6 LPM = 0.50 HRS |
| 166 | DILUTION | 0.50 | 0.0 | 0.5 HRS | 106.6 | 4.44 | 06/07/96 10:06 AM | 06/07/96 10:36 AM | | |
| 167 | AGITATE | 1.00 | 0.0 | 1.0 HRS | 107.6 | 4.48 | 06/07/96 10:36 AM | 06/07/96 11:36 AM | | |
| 168 | CIP | 1.00 | 0.0 | 1.0 HRS | 108.6 | 4.53 | 06/07/96 11:36 AM | 06/07/96 12:36 PM | | |
| 169 | SIP | 1.00 | 0.0 | 1.0 HRS | 109.6 | 4.57 | 06/07/96 12:36 PM | 06/07/96 01:36 PM | | |
| 170 | CLEAN UP | 1.00 | 0.0 | 1.0 HRS | 110.6 | 4.61 | 06/07/96 01:36 PM | 06/07/96 02:36 PM | | |
| 171 | SUBTOTAL | 5.50 | | 5.50 HRS | 107.6 | | | | | |
| 172 | | | | | | | | | | |
| 173 | 8 A HEAT EXCHANGE | | | | | | | | | |
| 174 | | | | | | | | | | |

FIG. 12D-1

| | OPERATION | PROCESS TIME LINE | | | | REL. TIME SCALE (HRS) | | | ABS. DAYS | | START | | FINISH | | CALCULATIONS |
|---|---|---|---|---|---|---|---|---|---|---|---|---|---|---|---|
| | | DURATION (HRS.) | | | ADJ. | PREP | EXEC. | COMPL. | START | END | DATE | TIME | DATE | TIME | |
| | | CALC. | A/D | | | | | | | | | | | | |
| 175 | SET UP | 0.50 | 0.0 | 0.5 HRS | | 107.6 | | | 4.46 | 4.48 | 06/03/96 | 08:00 AM | | | |
| 176 | TRANSFER | 0.30 | 0.0 | 0.3 HRS | | | 107.9 | | 4.48 | 4.50 | 06/07/96 | 11:06 AM | 06/07/96 | 11:36 AM | 66.5 L@ = 3.7 LPM = 0.30 HRS |
| 177 | CIP | 0.0 | 0.0 | 0.0 HRS | | | | 107.9 | 4.50 | 4.50 | 06/07/96 | 11:36 AM | 06/07/96 | 11:54 AM | |
| 178 | SIP | 0.0 | 0.0 | 0.0 HRS | | | | 107.9 | 4.50 | 4.50 | 06/07/96 | 11:54 AM | 06/07/96 | 11:54 AM | |
| 179 | CLEAN UP | 0.0 | 0.0 | 0.0 HRS | | | | 107.9 | 4.50 | 4.50 | 06/07/96 | 11:54 AM | 06/07/96 | 11:54 AM | |
| 180 | SUBTOTAL | 0.8 | | 0.8 HRS | | | | | | | | | | | |
| 181 | | | | | | | | | | | | | | | |
| 182 | 9 A HOMMOGENIZATION | | | | | | | | | | | | | | |
| 183 | | | | | | | | | | | | | | | |
| 184 | SET UP | 0.25 | 0.0 | 0.3 HRS | | 107.9 | | | 4.49 | 4.50 | 06/07/96 | 11:39 AM | 06/07/96 | 11:54 AM | |
| 185 | LYSIS | 0.68 | 0.0 | 0.7 HRS | | | 108.6 | | 4.50 | 4.52 | 06/07/96 | 11:54 AM | 06/07/96 | 12:34 PM | 66.5 L@ = 1.6 LPM = 0.68 HRS |
| 186 | CIP | 0.0 | 0.0 | 0.0 HRS | | | | 108.6 | 4.52 | 4.52 | 06/07/96 | 12:34 PM | 06/07/96 | 12:34 PM | |
| 187 | SIP | 0.0 | 0.0 | 0.0 HRS | | | | 108.6 | 4.52 | 4.52 | 06/07/96 | 12:34 PM | 06/07/96 | 12:34 PM | |
| 188 | CLEAN UP | 0.0 | 0.0 | 0.0 HRS | | | | 108.6 | 4.52 | 4.52 | 06/07/96 | 12:34 PM | 06/07/96 | 12:34 PM | |
| 189 | SUBTOTAL | 0.9 | | 0.9 HRS | | | | | | | | | | | |
| 190 | | | | | | | | | | | | | | | |
| 191 | 10 A HEAT EXCHANGE | | | | | | | | | | | | | | |
| 192 | | | | | | | | | | | | | | | |
| 193 | SET UP | 0.50 | 0.0 | 0.5 HRS | | 108.6 | | | 4.50 | 4.52 | 06/07/96 | 12:04 PM | 06/07/96 | 12:34 PM | |
| 194 | TRANSFER | 0.30 | 0.0 | 0.3 HRS | | | 108.9 | | 4.52 | 4.54 | 06/07/96 | 12:34 PM | 06/07/96 | 12:52 PM | 69.0 L@ = 3.8 LPM = 0.30 HRS |
| 195 | CIP | 0.0 | 0.0 | 0.0 HRS | | | | 108.9 | 4.54 | 4.54 | 06/07/96 | 12:52 PM | 06/07/96 | 12:52 PM | |
| 196 | SIP | 0.0 | 0.0 | 0.0 HRS | | | | 108.9 | 4.54 | 4.54 | 06/07/96 | 12:52 PM | 06/07/96 | 12:52 PM | |
| 197 | CLEAN UP | 0.0 | 0.0 | 0.0 HRS | | | | 108.9 | 4.54 | 4.54 | 06/07/96 | 12:52 PM | 06/07/96 | 12:52 PM | |
| 198 | SUBTOTAL | 0.8 | | 0.8 HRS | | | | | | | | | | | |
| 199 | | | | | | | | | | | | | | | |
| 200 | 8 B HEAT EXCHANGE | | | | | | | | | | | | | | |
| 201 | | | | | | | | | | | | | | | |
| 202 | SET UP | 0.00 | 0.0 | 0.0 HRS | | 108.9 | | | 4.54 | 4.54 | 06/07/96 | 12:52 PM | 06/07/96 | 12:52 PM | |

FIG. 12D-2

| # | Step | | | | | | | | | | | |
|---|---|---|---|---|---|---|---|---|---|---|---|---|
| 203 | TRANSFER | 0.30 | 0.0 | 0.3 HRS | | 109.2 | 4.54 | 4.55 | 06/07/96 | 12:52 PM | 06/07/96 | 01:10 PM | 66.5 LB | 3.7 LPM = 0.30 HRS |
| 204 | CIP | 0.0 | 0.0 | 0.0 HRS | | 109.2 | 4.55 | 4.55 | | | 06/07/96 | 01:10 PM | | |
| 205 | SIP | 0.0 | 0.0 | 0.0 HRS | | 109.2 | 4.55 | 4.55 | | | 06/07/96 | 01:10 PM | | |
| 206 | CLEAN UP | 0.0 | 0.0 | 0.0 HRS | | 109.2 | 4.55 | 4.55 | | | 06/07/96 | 01:10 PM | | |
| 207 | SUBTOTAL | 0.3 | | 0.3 HRS | 109.2 | | | | | | | | |
| 208 | | | | | | | | | | | | | |
| 209 | 9 B HOMOGENIZATION | | | | | | | | | | | | |
| 210 | | | | | | | | | | | | | |
| 211 | SET UP | 0.00 | 0.0 | 0.0 HRS | | 109.9 | 4.55 | 4.58 | 06/07/96 | 01:10 PM | 06/07/96 | 01:10 PM | 66.5 LB | 1.6 LPM = 0.68 HRS |
| 212 | LYSIS | 0.68 | 0.0 | 0.7 HRS | 109.9 | | 4.55 | 4.58 | 06/07/96 | 01:10 PM | 06/07/96 | 01:51 PM | | |
| 213 | CIP | 0.0 | 0.0 | 0.0 HRS | | 109.9 | 4.58 | 4.58 | | | 06/07/96 | 01:51 PM | | |
| 214 | SIP | 0.0 | 0.0 | 0.0 HRS | | 109.9 | 4.58 | 4.58 | | | 06/07/96 | 01:51 PM | | |
| 215 | CLEAN UP | 0.0 | 0.0 | 0.0 HRS | | 109.9 | 4.58 | 4.58 | | | 06/07/96 | 01:51 PM | | |
| 216 | SUBTOTAL | 0.7 | | 0.7 HRS | 109.9 | | | | | | | | |
| 217 | | | | | | | | | | | | | |
| 218 | 10 B HEAT EXCHANGE | | | | | | | | | | | | |
| 219 | | | | | | | | | | | | | |
| 220 | SET UP | 0.50 | 0.0 | 0.5 HRS | | 110.2 | 4.56 | 4.58 | 06/07/96 | 01:21 PM | 06/07/96 | 01:51 PM | 69.0 LB | 3.8 LPM = 0.30 HRS |
| 221 | TRANSFER | 0.30 | 0.0 | 0.3 HRS | 110.2 | | 4.58 | 4.59 | 06/07/96 | 01:51 PM | 06/07/96 | 02:09 PM | | |
| 222 | CIP | 0.0 | 0.0 | 0.0 HRS | | 110.2 | 4.59 | 4.59 | | | 06/07/96 | 02:09 PM | | |
| 223 | SIP | 0.0 | 0.0 | 0.0 HRS | | 110.2 | 4.59 | 4.59 | | | 06/07/96 | 02:09 PM | | |
| 224 | CLEAN UP | 0.0 | 0.0 | 0.0 HRS | | 110.2 | 4.59 | 4.59 | | | 06/07/96 | 02:09 PM | | |
| 225 | SUBTOTAL | 0.8 | | 0.8 HRS | 110.2 | | | | | | | | |
| 226 | | | | | | | | | | | | | |
| 227 | 8 C HEAT EXCHANGE | | | | | | | | | | | | |
| 228 | | | | | | | | | | | | | |
| 229 | SET UP | 0.00 | 0.0 | 0.0 HRS | | 110.5 | 4.59 | 4.59 | 06/07/96 | 02:09 PM | 06/07/96 | 02:09 PM | 66.5 LB | 3.7 LPM = 0.30 HRS |
| 230 | TRANSFER | 0.30 | 0.0 | 0.3 HRS | 110.5 | 111.5 | 4.59 | 4.60 | 06/07/96 | 02:09 PM | 06/07/96 | 02:27 PM | | |
| 231 | CIP | 1.0 | 0.0 | 1.0 HRS | | 112.5 | 4.60 | 4.64 | 06/07/96 | 02:27 PM | 06/07/96 | 03:27 PM | | |
| 232 | SIP | 1.0 | 0.0 | 1.0 HRS | | 113.5 | 4.64 | 4.69 | 06/07/96 | 03:27 PM | 06/07/96 | 04:27 PM | | |
| 233 | CLEAN UP | 1.0 | 0.0 | 1.0 HRS | | | 4.69 | 4.73 | 06/07/96 | 04:27 PM | 06/07/96 | 05:27 PM | | |
| 234 | SUBTOTAL | 3.3 | | 3.3 HRS | 110.5 | | | | | | | | |

FIG. 12E-1

| | OPERATION | PROCESS TIME LINE | | | REL. TIME SCALE (HRS) | | | ABS. DAYS | | START | | FINISH | | CALCULATIONS |
|---|---|---|---|---|---|---|---|---|---|---|---|---|---|---|
| | | DURATION (HRS.) | | | PREP | EXEC. | COMPL. | START | END | DATE | TIME | DATE | TIME | |
| | | CALC. | A/D | ADJ. | | | | | | | | | | |
| 235 | | | | | | 15.5 | | | | 06/03/96 | 08:00 AM | | | |
| 236 | 9 C HOMMOGENIZATION | | | | | | | | | | | | | |
| 237 | | | | | | | | | | | | | | |
| 238 | SET UP | 0.00 | 0.0 | 0.0 HRS | 110.5 | | | | | | | | | |
| 239 | LYSIS | 0.68 | 0.0 | 0.7 HRS | | 111.1 | | 4.60 | 4.60 | 06/07/96 | 02:27 PM | 06/07/96 | 02:27 PM | 66.5 LB    1.6 LPM  =  0.68 HRS |
| 240 | CIP | 1.0 | 0.0 | 1.0 HRS | | | 112.1 | 4.60 | 4.63 | 06/07/96 | 02:27 PM | 06/07/96 | 03:07 PM | |
| 241 | SIP | 1.0 | 0.0 | 1.0 HRS | | | 113.1 | 4.63 | 4.67 | 06/07/96 | 03:07 PM | 06/07/96 | 04:07 PM | |
| 242 | CLEAN UP | 1.0 | 0.0 | 1.0 HRS | | | 114.1 | 4.67 | 4.71 | 06/07/96 | 04:07 PM | 06/07/96 | 05:07 PM | |
| | | | | | | | | 4.71 | 4.76 | 06/07/96 | 05:07 PM | 06/07/96 | 06:07 PM | |
| 243 | SUBTOTAL | 3.7 | | 3.7 HRS | | | | | | | | | | |
| 244 | | | | | | | | | | | | | | |
| 245 | 10 C HEAT EXCHANGE | | | | | | | | | | | | | |
| 246 | | | | | | | | | | | | | | |
| 247 | SET UP | 0.00 | 0.0 | 0.0 HRS | 111.1 | | | | | | | | | |
| 248 | TRANSFER | 0.30 | 0.0 | 0.3 HRS | | 111.4 | | 4.63 | 4.63 | 06/07/96 | 03:07 PM | 06/07/96 | 03:07 PM | 69.0 LB    3.8 LPM  =  0.30 HRS |
| 249 | CIP | 1.0 | 0.0 | 1.0 HRS | | | 112.4 | 4.63 | 4.64 | 06/07/96 | 03:07 PM | 06/07/96 | 03:25 PM | |
| 250 | SIP | 1.0 | 0.0 | 1.0 HRS | | | 113.4 | 4.64 | 4.68 | 06/07/96 | 03:25 PM | 06/07/96 | 04:25 PM | |
| 251 | CLEAN UP | 1.0 | 0.0 | 1.0 HRS | | | 114.4 | 4.68 | 4.73 | 06/07/96 | 04:25 PM | 06/07/96 | 05:25 PM | |
| | | | | | | | | 4.73 | 4.77 | 06/07/96 | 05:25 PM | 06/07/96 | 06:25 PM | |
| 252 | SUBTOTAL | 3.3 | | 3.3 HRS | | | | | | | | | | |
| 253 | | | | | | | | | | | | | | |
| 254 | 11 A RESOLUBLIZATION | | | | | | | | | | | | | |
| 255 | | | | | | | | | | | | | | |
| 256 | SET UP | 1.0 | 0.0 | 1.0 HRS | 108.9 | | | 4.49 | 4.54 | 06/07/96 | 11:52 AM | 06/07/96 | 12:52 PM | |
| 257 | DILUTION | 0.5 | 0.0 | 0.5 HRS | | 109.4 | | 4.54 | 4.56 | 06/07/96 | 12:52 PM | 06/07/96 | 01:22 PM | 206.9 LB    6.9 LPM  =  0.50 HRS |
| 258 | AGITATE | 0.5 | 0.0 | 0.5 HRS | | 109.9 | | 4.56 | 4.58 | 06/07/96 | 01:22 PM | 06/07/96 | 01:52 PM | 0.50 HRS |
| 259 | CIP | 0.0 | 0.0 | 0.0 HRS | | | 109.9 | 4.58 | 4.58 | 06/07/96 | 01:52 PM | 06/07/96 | 01:52 PM | |
| 260 | SIP | 0.0 | 0.0 | 0.0 HRS | | | 109.9 | 4.58 | 4.58 | 06/07/96 | 01:52 PM | 06/07/96 | 01:52 PM | |
| 261 | CLEAN UP | 0.0 | 0.0 | 0.0 HRS | | | 109.9 | 4.58 | 4.58 | 06/07/96 | 01:52 PM | 06/07/96 | 01:52 PM | |
| 262 | SUBTOTAL | 2.0 | | 2.0 HRS | | 109.9 | | | | | | | | |

FIG. 12E-2

| | | | | | | | | | | |
|---|---|---|---|---|---|---|---|---|---|---|
| 263 | 12 A CONT. CENT/SOLIDS | | | | | | | | | |
| 264 | | | | | | | | | | |
| 265 | | | | | | | | | | |
| 266 | SET UP | 1.0 | 0.0 | 1.0 HRS | 109.9 | | 4.54 | 4.58 | 06/07/96 12:52 PM | 06/07/96 01:52 PM | 275.9 lb 9.2 LPM = 0.50 HRS |
| 267 | CENTRIFUGATION | 0.5 | 0.0 | 0.5 HRS | | 110.4 | 4.58 | 4.60 | 06/07/96 01:52 PM | 06/07/96 02:22 PM | 3.0 lb 0.5 LPM = 0.10 HRS |
| 268 | WASH | 0.1 | 0.0 | 0.1 HRS | | 110.5 | 4.60 | 4.60 | 06/07/96 02:22 PM | 06/07/96 02:28 PM | 8.0 lb 0.5 LPM = 0.25 HRS |
| 269 | CIP | 0.0 | 0.0 | 0.0 HRS | | | 4.60 | 4.60 | 06/07/96 02:28 PM | 06/07/96 02:28 PM | |
| 270 | SIP | 0.0 | 0.0 | 0.0 HRS | | 110.5 | 4.60 | 4.60 | 06/07/96 02:28 PM | 06/07/96 02:28 PM | |
| 271 | CLEAN UP | 0.0 | 0.0 | 0.0 HRS | | 110.5 | 4.60 | 4.60 | 06/07/96 02:28 PM | 06/07/96 02:28 PM | |
| 272 | SUBTOTAL | 1.6 | | 1.6 HRS | | 110.5 | | | | | |
| 273 | | | | | | | | | | | |
| 274 | 11 B RESOLUBLIZATION | | | | | | | | | | |
| 275 | | | | | | | | | | | |
| 276 | SET UP | 0.0 | 0.0 | 0.0 HRS | 110.5 | | 4.60 | 4.60 | 06/07/96 02:28 PM | 06/07/96 02:28 PM | 206.9 lb 6.9 LPM = 0.50 HRS |
| 277 | DILUTION | 0.5 | 0.0 | 0.5 HRS | | 111.0 | 4.60 | 4.62 | 06/07/96 02:28 PM | 06/07/96 02:58 PM | |
| 278 | AGITATE | 0.3 | 0.0 | 0.3 HRS | | 111.2 | 4.62 | 4.63 | 06/07/96 02:58 PM | 06/07/96 03:13 PM | |
| 279 | CIP | 1.0 | 0.0 | 1.0 HRS | | 112.2 | 4.63 | 4.68 | 06/07/96 03:13 PM | 06/07/96 04:13 PM | |
| 280 | SIP | 1.0 | 0.0 | 1.0 HRS | | 113.2 | 4.68 | 4.72 | 06/07/96 04:13 PM | 06/07/96 05:13 PM | |
| 281 | CLEAN UP | 1.0 | 0.0 | 1.0 HRS | | 114.2 | 4.72 | 4.76 | 06/07/96 05:13 PM | 06/07/96 06:13 PM | 0.50 HRS |
| 282 | SUBTOTAL | 3.8 | | 3.8 HRS | | 111.2 | | | | | |
| 283 | | | | | | | | | | | |
| 284 | 12 B CONT. CENT/SOLIDS | | | | | | | | | | |
| 285 | | | | | | | | | | | |
| 286 | SET UP | 1.0 | 0.0 | 1.0 HRS | 111.2 | | 4.59 | 4.63 | 06/07/96 02:13 PM | 06/07/96 03:13 PM | 275.9 lb 9.2 LPM = 0.50 HRS |
| 287 | CENTRIFUGATION | 0.5 | 0.0 | 0.5 HRS | | 111.7 | 4.63 | 4.66 | 06/07/96 03:13 PM | 06/07/96 03:43 PM | 3.0 lb 0.5 LPM = 0.10 HRS |
| 288 | WASH | 0.1 | 0.0 | 0.1 HRS | | 111.8 | 4.66 | 4.66 | 06/07/96 03:43 PM | 06/07/96 03:49 PM | 8.0 lb 0.5 LPM = 0.25 HRS |
| 289 | CIP | 0.3 | 0.0 | 0.3 HRS | | 112.1 | 4.66 | 4.67 | 06/07/96 03:49 PM | 06/07/96 04:04 PM | |
| 290 | SIP | 1.0 | 0.0 | 1.0 HRS | | 113.1 | 4.67 | 4.71 | 06/07/96 04:04 PM | 06/07/96 05:04 PM | |
| 291 | CLEAN UP | 0.5 | 0.0 | 0.5 HRS | | 113.6 | 4.71 | 4.73 | 06/07/96 05:04 PM | 06/07/96 05:34 PM | |
| 292 | SUBTOTAL | 3.4 | | 3.4 HRS | | 111.8 | | | | | |
| 293 | | | | | | | | | | | |
| 294 | 13 A RESOLUBLIZATION | | | | | | | | | | |

FIG. 12F-1

| | | PROCESS TIME LINE | | | | | | | | | | | |
|---|---|---|---|---|---|---|---|---|---|---|---|---|---|
| | | DURATION (HRS.) | | | REL. TIME SCALE (HRS) | | | ABS. DAYS | | START | | FINISH | |
| | OPERATION | CALC. | A/D | ADJ. | PREP | EXEC. | COMPL. | START | END | DATE | TIME | DATE | TIME | | CALCULATIONS |
| 295 | | | | | | | | | | 06/03/96 | 08:00 AM | | | | |
| 296 | SET UP | 1.0 | 0.0 | 1.0 HRS | | | | 4.56 | 4.60 | 06/07/96 | 01:28 PM | 06/07/96 | 02:28 PM | | |
| 297 | DILUTION | 0.5 | 0.0 | 0.5 HRS | 110.5 | 111.0 | | 4.60 | 4.62 | 06/07/96 | 02:28 PM | 06/07/96 | 02:58 PM | 60.7 LB | 2.0 LPM = 0.50 HRS |
| 298 | AGITATE | 18.0 | 0.0 | 18.0 HRS | | 129.0 | | 4.62 | 5.37 | 06/07/96 | 02:58 PM | 06/08/96 | 08:58 AM | | 23.50 HRS |
| 299 | CIP | 1.0 | 0.0 | 1.0 HRS | | | 130.0 | 5.37 | 5.42 | 06/08/96 | 08:58 AM | 06/08/96 | 09:58 AM | | |
| 300 | SIP | 1.0 | 0.0 | 1.0 HRS | | | 131.0 | 5.42 | 5.46 | 06/08/96 | 09:58 AM | 06/08/96 | 10:58 AM | | |
| 301 | CLEAN UP | 1.0 | 0.0 | 1.0 HRS | | | 132.0 | 5.46 | 5.50 | 06/08/96 | 10:58 AM | 06/08/96 | 11:58 AM | | |
| 302 | SUBTOTAL | 22.5 | | 22.5 HRS | | 129.0 | | | | | | | | | |
| 303 | | | | | | | | | | | | | | | |
| 304 | 14 A CONCENTRATION | | | | | | | | | | | | | | 26.99 SF |
| 305 | | | | | | | | | | | | | | | |
| 306 | SET UP | 1.0 | 0.0 | 1.0 HRS | 127.6 | | | 5.28 | 5.32 | 06/08/96 | 06:38 AM | 06/08/96 | 07:38 AM | | |
| 307 | FLUSH | 0.7 | 0.0 | 0.7 HRS | 128.3 | | | 5.32 | 5.35 | 06/08/96 | 07:38 AM | 06/08/96 | 08:18 AM | 54.0 LB | 3.0 L/SF/Hr or 1.35 LPM |
| 308 | PRIME | 0.7 | 0.0 | 0.7 HRS | 129.0 | | | 5.35 | 5.37 | 06/08/96 | 08:18 AM | 06/08/96 | 08:58 AM | 54.0 LB | 3.0 L/SF/Hr or 1.35 LPM |
| 309 | CONCENTRATION | 1.0 | 0.0 | 1.0 HRS | | 130.0 | | 5.37 | 5.42 | 06/08/96 | 08:58 AM | 06/08/96 | 09:58 AM | 81.0 LB | 3.0 L/SF/Hr or 1.35 LPM |
| 310 | DILUTION | 0.4 | 0.0 | 0.4 HRS | | 130.4 | | 5.42 | 5.43 | 06/08/96 | 09:58 AM | 06/08/96 | 10:25 AM | 13.5 LB | 0.5 LPM |
| 311 | WASH | 0.9 | 0.0 | 0.9 HRS | | 131.3 | | 5.43 | 5.47 | 06/08/96 | 10:25 AM | 06/08/96 | 11:19 AM | 72.9 LB | 3.0 L/SF/Hr or 1.35 LPM |
| 312 | FLUSH | 0.3 | 0.0 | 0.3 HRS | | | 131.7 | 5.47 | 5.49 | 06/08/96 | 11:19 AM | 06/08/96 | 11:39 AM | 27.0 LB | 3.0 L/SF/Hr or 1.35 LPM |
| 313 | STORE | 0.7 | 0.0 | 0.7 HRS | | | 132.3 | 5.49 | 5.51 | 06/08/96 | 11:39 AM | 06/08/96 | 12:19 PM | 54.0 LB | 3.0 L/SF/Hr or 1.35 LPM |
| 314 | CIP | 1.0 | 0.0 | 1.0 HRS | | | 133.3 | 5.51 | 5.56 | 06/08/96 | 12:19 PM | 06/08/96 | 01:19 PM | | |
| 315 | SIP | 1.0 | 0.0 | 1.0 HRS | | | 134.3 | 5.56 | 5.60 | 06/08/96 | 01:19 PM | 06/08/96 | 02:19 PM | | |
| 316 | CLEAN UP | 1.0 | 0.0 | 1.0 HRS | | | 135.3 | 5.60 | 5.64 | 06/08/96 | 02:19 PM | 06/08/96 | 03:19 PM | | |
| 317 | SUBTOTAL | 8.7 | | 8.7 HRS | | 131.3 | | | | | | | | MAX FR | 1.35 LPM |
| 318 | | | | | | | | | | | | | | | |
| 319 | 15 A MICROFILTRATION | | | | | | | | | | | | | | 12.60 SF |
| 320 | | | | | | | | | | | | | | | |
| 321 | SET UP | 1.0 | 0.0 | 1.0 HRS | 131.1 | | | 5.42 | 5.46 | 06/08/96 | 10:03 AM | 06/08/96 | 11:03 AM | | |
| 322 | FLUSH | 0.1 | 0.0 | 0.1 HRS | 131.2 | | | 5.46 | 5.47 | 06/08/96 | 11:03 AM | 06/08/96 | 11:11 AM | 25.2 LB | 15.0 L/SF/Hr or 3.15 LPM |
| 323 | PRIME | 0.1 | 0.0 | 0.1 HRS | 131.3 | | | 5.47 | 5.47 | 06/08/96 | 11:11 AM | 06/08/96 | 11:19 AM | 25.2 LB | 15.0 L/SF/Hr or 3.15 LPM |

FIG. 12F-2

| # | Step | | | | | | Start Date | Start Time | End Date | End Time | Vol | | Rate | | |
|---|---|---|---|---|---|---|---|---|---|---|---|---|---|---|---|
| 324 | FILTRATION | | | | 0.5 | 0.5 HRS | | | | | | | | | |
| 325 | WASH | | | 131.8 | 0.0 | 0.0 HRS | | 5.47 | 5.49 | 06/08/96 | 11:19 AM | 06/08/96 | 11:49 AM | 94.5 LØ | 15.0 L/SF/Hr | or 3.15 LPM |
| 326 | REGENERATE | | | | 0.0 | 0.0 HRS | 131.9 | 5.49 | 5.49 | 06/08/96 | 11:49 AM | 06/08/96 | 11:49 AM | 0.0 LØ | 15.0 L/SF/Hr | or 3.15 LPM |
| 327 | STORE | | | | 0.1 | 0.1 HRS | 131.9 | 5.49 | 5.50 | 06/08/96 | 11:49 AM | 06/08/96 | 11:51 AM | 6.3 LØ | 15.0 L/SF/Hr | or 3.15 LPM |
| 328 | CIP | | | | 1.0 | 1.0 HRS | 132.9 | 5.50 | 5.54 | 06/08/96 | 11:51 AM | 06/08/96 | 11:55 AM | 12.6 LØ | 15.0 L/SF/Hr | or 3.15 LPM |
| 329 | SIP | | | | 1.0 | 1.0 HRS | 133.9 | 5.54 | 5.58 | 06/08/96 | 11:55 AM | 06/08/96 | 12:55 PM | | | |
| 330 | CLEAN UP | | | | 1.0 | 1.0 HRS | 134.9 | 5.58 | 5.62 | 06/08/96 | 12:55 PM | 06/08/96 | 01:55 PM | | | |
| 331 | | | | | | | | | | 06/08/96 | 01:55 PM | 06/08/96 | 02:55 PM | | | |
| 332 | SUBTOTAL | | | 131.8 | 4.9 | 4.9 HRS | | | | | | | | | | |
| 333 | 16 A P/A MPLC | | | | | | | | | | | | | 63.8 L.CV | 0.4 H/D | 60.32 CM DIA. |
| 334 | | | | | | | | | | | | | | | MAX FR | |
| 335 | EQUILIBRATION | 131.4 | 132.5 | | 1.1 | 1.1 HRS | | 5.43 | 5.48 | 06/08/96 | 10:17 AM | 06/08/96 | 11:24 AM | 319.9 LØ | 100.0 CM/HR | or 4.76 LPM |
| 336 | LOAD | | 133.9 | | 0.7 | 0.7 HRS | | 5.49 | 5.52 | 06/08/96 | 11:49 AM | 06/08/96 | 12:31 PM | 100.5 LØ | 50.0 CM/HR | or 2.38 LPM |
| 337 | WASH | | 135.2 | | 1.3 | 1.3 HRS | | 5.52 | 5.58 | 06/08/96 | 12:31 PM | 06/08/96 | 01:52 PM | 191.4 LØ | 50.0 CM/HR | or 2.38 LPM |
| 338 | ELUTE A | | 135.2 | | 1.3 | 1.3 HRS | | 5.58 | 5.63 | 06/08/96 | 01:52 PM | 06/08/96 | 03:12 PM | 191.4 LØ | 50.0 CM/HR | or 2.38 LPM |
| 339 | ELUTE B | | | | 0.0 | 0.0 HRS | | 5.63 | 5.63 | 06/08/96 | 03:12 PM | 06/08/96 | 03:12 PM | 0.0 LØ | 30.0 CM/HR | or 1.43 LPM |
| 340 | REGENERATE | | | | 0.2 | 0.2 HRS | | 5.63 | 5.64 | 06/08/96 | 03:12 PM | 06/08/96 | 03:25 PM | 63.8 LØ | 100.0 CM/HR | or 4.76 LPM |
| 341 | STORE | | | | 0.4 | 0.4 HRS | | 5.64 | 5.66 | 06/08/96 | 03:25 PM | 06/08/96 | 03:52 PM | 127.6 LØ | 100.0 CM/HR | or 4.76 LPM |
| 342 | CIP | | | | 1.0 | 1.0 HRS | 135.4 | 5.66 | 5.70 | 06/08/96 | 03:52 PM | 06/08/96 | 04:52 PM | | | |
| 343 | SIP | | | | 1.0 | 1.0 HRS | 135.9 | 5.70 | 5.74 | 06/08/96 | 04:52 PM | 06/08/96 | 05:52 PM | | | |
| 344 | CLEAN UP | | | | 1.0 | 1.0 HRS | 136.9 | 5.74 | 5.79 | 06/08/96 | 05:52 PM | 06/08/96 | 06:52 PM | | | |
| 345 | | | | 137.9 | | | | | | | | | | | | |
| 346 | | | | 138.9 | | | | | | | | | | | | |
| 347 | SUBTOTAL | | | 135.2 | 5.2 | 5.2 HRS | | | | | | | | | | |
| 348 | 17 A P/A MPLC | | | | | | | | | | | | | 12.2 L.CV | 0.4 H/D | 34.75 CM DIA. |
| 349 | | | | | | | | | | | | | | | MAX FR | 4.76 LPM |
| 350 | EQUILIBRATION | 135.6 | 136.3 | | 0.6 | 0.6 HRS | | 5.62 | 5.65 | 06/08/96 | 02:59 PM | 06/08/96 | 03:38 PM | 61.0 LØ | 100.0 CM/HR | or 1.58 LPM |
| 351 | LOAD | | 137.1 | | 1.1 | 1.1 HRS | | 5.63 | 5.68 | 06/08/96 | 03:12 PM | 06/08/96 | 04:17 PM | 51.0 LØ | 50.0 CM/HR | or 0.79 LPM |
| 352 | WASH | | 137.8 | | 0.8 | 0.8 HRS | | 5.68 | 5.71 | 06/08/96 | 04:17 PM | 06/08/96 | 05:03 PM | 36.6 LØ | 50.0 CM/HR | or 0.79 LPM |
| 353 | ELUTE A | | 137.8 | | 0.8 | 0.8 HRS | | 5.71 | 5.74 | 06/08/96 | 05:03 PM | 06/08/96 | 05:49 PM | 36.6 LØ | 50.0 CM/HR | or 0.79 LPM |
| 354 | ELUTE B | | | | 0.0 | 0.0 HRS | | 5.74 | 5.74 | 06/08/96 | 05:49 PM | 06/08/96 | 05:49 PM | 0.0 LØ | 30.0 CM/HR | or 0.47 LPM |

FIG. 12G-1

| | | OPERATION | PROCESS TIME LINE | | | REL. TIME SCALE (HRS) | | | ABS. DAYS | | START | | FINISH | | | CALCULATIONS | | |
|---|---|---|---|---|---|---|---|---|---|---|---|---|---|---|---|---|---|---|
| | | | DURATION (HRS.) | | | PREP | EXEC. | COMPL. | START | END | DATE | TIME | DATE | TIME | | | | |
| | | | CALC. | A/D | ADJ. | | | | | | | | | | | | | |
| | | | | | | | | | | | 06/03/96 | 08:00 AM | | | | | | |
| 355 | | REGENERATE | 0.1 | 0.0 | 0.1 HRS | | | 138.0 | 5.74 | 5.75 | 06/08/96 | 05:49 PM | 06/08/96 | 05:57 PM | 12.2 L@ | 100.0 CM/HR | or | 1.58 LPM |
| 356 | | STORE | 0.3 | 0.0 | 0.3 HRS | | | 138.2 | 5.75 | 5.76 | 06/08/96 | 05:57 PM | 06/08/96 | 06:13 PM | 24.4 L@ | 100.0 CM/HR | or | 1.58 LPM |
| 357 | | CIP | 1.0 | 0.0 | 1.0 HRS | | | 139.2 | 5.76 | 5.80 | 06/08/96 | 06:13 PM | 06/08/96 | 07:13 PM | | | | |
| 358 | | SIP | 1.0 | 0.0 | 1.0 HRS | | | 140.2 | 5.80 | 5.84 | 06/08/96 | 07:13 PM | 06/08/96 | 08:13 PM | | | | |
| 359 | | CLEAN UP | 1.0 | 0.0 | 1.0 HRS | | | 141.2 | 5.84 | 5.88 | 06/08/96 | 08:13 PM | 06/08/96 | 09:13 PM | | | | |
| 360 | | SUBTOTAL | 6.7 | | 6.7 HRS | | 137.8 | | | | | | | | | MAX FR | | 1.58 LPM |
| 361 | | | | | | | | | | | | | | | | | | |
| 362 | 18 A FLOW DIALYSIS | | | | | | | | | | | | | | | | 12.20 SF | |
| 363 | | | | | | | | | | | | | | | | | | |
| 364 | | SET UP | 1.0 | 0.0 | 1.0 HRS | 136.5 | | | 5.65 | 5.69 | 06/08/96 | 03:29 PM | 06/08/96 | 04:29 PM | | | | |
| 365 | | FLUSH | 0.7 | 0.0 | 0.7 HRS | 137.2 | | | 5.69 | 5.72 | 06/08/96 | 04:29 PM | 06/08/96 | 05:09 PM | 24.4 L@ | 3.0 L/SF/Hr | or | 0.61 LPM |
| 366 | | PRIME | 0.7 | 0.0 | 0.7 HRS | 137.8 | | | 5.72 | 5.74 | 06/08/96 | 05:09 PM | 06/08/96 | 05:49 PM | 24.4 L@ | 3.0 L/SF/Hr | or | 0.61 LPM |
| 367 | | DIALYSIS | 1.0 | 0.0 | 1.0 HRS | | 138.8 | | 5.74 | 5.78 | 06/08/96 | 05:49 PM | 06/08/96 | 06:49 PM | 36.6 L@ | 3.0 L/SF/Hr | or | 0.61 LPM |
| 368 | | WASH | 0.0 | 0.0 | 0.0 HRS | | 138.8 | | 5.78 | 5.78 | 06/08/96 | 06:49 PM | 06/08/96 | 06:49 PM | 0.0 L@ | 3.0 L/SF/Hr | or | 0.61 LPM |
| 369 | | FLUSH | 0.3 | 0.0 | 0.3 HRS | | | 139.2 | 5.78 | 5.80 | 06/08/96 | 06:49 PM | 06/08/96 | 07:09 PM | 12.2 L@ | 3.0 L/SF/Hr | or | 0.61 LPM |
| 370 | | STORE | 0.7 | 0.0 | 0.7 HRS | | | 139.8 | 5.80 | 5.83 | 06/08/96 | 07:09 PM | 06/08/96 | 07:49 PM | 24.4 L@ | 3.0 L/SF/Hr | or | 0.61 LPM |
| 371 | | CIP | 1.0 | 0.0 | 1.0 HRS | | | 140.8 | 5.83 | 5.87 | 06/08/96 | 07:49 PM | 06/08/96 | 08:49 PM | | | | |
| 372 | | SIP | 1.0 | 0.0 | 1.0 HRS | | | 141.8 | 5.87 | 5.91 | 06/08/96 | 08:49 PM | 06/08/96 | 09:49 PM | | | | |
| 373 | | CLEAN UP | 1.0 | 0.0 | 1.0 HRS | | | 142.8 | 5.91 | 5.95 | 06/08/96 | 09:49 PM | 06/08/96 | 10:49 PM | | | | |
| 374 | | SUBTOTAL | 7.3 | | 7.3 HRS | | 138.8 | | | | | | | | | MAX FR | | 0.61 LPM |
| 375 | | | | | | | | | | | | | | | | | | |
| 376 | 19 A P/A MPLC | | | | | | | | | | | | | | 7.0 L.CV | 0.4 H/D | 28.81 CM DIA. | |
| 377 | | | | | | | | | | | | | | | | | | |
| 378 | | EQUILIBRATION | 0.5 | 0.0 | 0.5 HRS | 138.5 | | | 5.77 | 5.77 | 06/08/96 | 05:59 PM | 06/08/96 | 06:31 PM | 34.8 L@ | 100.0 CM/HR | or | 1.09 LPM |
| 379 | | LOAD | 0.2 | 0.0 | 0.2 HRS | | 139.1 | | 5.78 | 5.79 | 06/08/96 | 06:49 PM | 06/08/96 | 07:03 PM | 7.3 L@ | 50.0 CM/HR | or | 0.54 LPM |
| 380 | | WASH | 0.6 | 0.0 | 0.6 HRS | | 139.7 | | 5.79 | 5.82 | 06/08/96 | 07:03 PM | 06/08/96 | 07:41 PM | 20.9 L@ | 50.0 CM/HR | or | 0.54 LPM |
| 381 | | ELUTE A | 0.6 | 0.0 | 0.6 HRS | | 140.3 | | 5.82 | 5.85 | 06/08/96 | 07:41 PM | 06/08/96 | 08:20 PM | 20.9 L@ | 50.0 CM/HR | or | 0.54 LPM |
| 382 | | ELUTE B | 0.0 | 0.0 | 0.0 HRS | | 140.3 | | 5.85 | 5.85 | 06/08/96 | 08:20 PM | 06/08/96 | 08:20 PM | 0.0 L@ | 30.0 CM/HR | or | 0.33 LPM |
| 383 | | REGENERATE | 0.1 | 0.0 | 0.1 HRS | | | 140.4 | 5.85 | 5.85 | 06/08/96 | 08:20 PM | 06/08/96 | 08:26 PM | 7.0 L@ | 100.0 CM/HR | or | 1.09 LPM |

FIG. 12G-2

| | | | | | | | | | | | |
|---|---|---|---|---|---|---|---|---|---|---|---|
| 384 | STORE | 0.2 | 0.0 | 0.2 HRS | | 140.7 | 5.85 | 5.86 | 06/08/96 | 08:26 PM | 06/08/96 | 08:39 PM | 13.9 L@ | 100.0 CM/HR or | 1.09 LPM |
| 385 | CIP | 1.0 | 0.0 | 1.0 HRS | | 141.7 | 5.86 | 5.90 | 06/08/96 | 08:39 PM | 06/08/96 | 09:39 PM | | | |
| 386 | SIP | 1.0 | 0.0 | 1.0 HRS | | 142.7 | 5.90 | 5.94 | 06/08/96 | 09:39 PM | 06/08/96 | 10:39 PM | | | |
| 387 | CLEAN UP | 1.0 | 0.0 | 1.0 HRS | | 143.7 | 5.94 | 5.99 | 06/08/96 | 10:39 PM | 06/08/96 | 11:39 PM | | | |
| 388 | SUBTOTAL | 5.4 | | 5.4 HRS | 140.3 | | | | | | | | MAX FR | | 1.09 LPM |
| 389 | | | | | | | | | | | | | | | |
| 390 | 20 A FLOW DIALYSIS | | | | | | | | | | | | | 2.43 SF | |
| 391 | | | | | | | | | | | | | | | |
| 392 | SET UP | 0.0 | 0.0 | 0.0 HRS | 139.0 | | 5.79 | 5.79 | 06/08/96 | 07:00 PM | 06/08/96 | 07:00 PM | 4.9 L@ | 3.0 L/SF/HR or | 0.12 LPM |
| 393 | FLUSH | 0.7 | 0.0 | 0.7 HRS | 139.7 | | 5.79 | 5.82 | 06/08/96 | 07:00 PM | 06/08/96 | 07:40 PM | 4.9 L@ | 3.0 L/SF/HR or | 0.12 LPM |
| 394 | PRIME | 0.7 | 0.0 | 0.7 HRS | 140.3 | | 5.82 | 5.85 | 06/08/96 | 07:40 PM | 06/08/96 | 08:20 PM | 14.6 L@ | 3.0 L/SF/HR or | 0.12 LPM |
| 395 | DIALYSIS | 2.0 | 0.0 | 2.0 HRS | | 142.3 | 5.85 | 5.93 | 06/08/96 | 08:20 PM | 06/08/96 | 10:20 PM | 0.0 L@ | 3.0 L/SF/HR or | 0.12 LPM |
| 396 | WASH | 0.0 | 0.0 | 0.0 HRS | | 142.3 | 5.93 | 5.93 | 06/08/96 | 10:20 PM | 06/08/96 | 10:20 PM | 2.4 L@ | 3.0 L/SF/HR or | 0.12 LPM |
| 397 | FLUSH | 0.3 | 0.0 | 0.3 HRS | | 142.7 | 5.93 | 5.94 | 06/08/96 | 10:20 PM | 06/08/96 | 10:40 PM | 4.9 L@ | 3.0 L/SF/HR or | 0.12 LPM |
| 398 | STORE | 0.7 | 0.0 | 0.7 HRS | | 143.3 | 5.94 | 5.97 | 06/08/96 | 10:40 PM | 06/08/96 | 11:20 PM | | | |
| 399 | CIP | 0.0 | 0.0 | 0.0 HRS | | 143.3 | 5.97 | 5.97 | 06/08/96 | 11:20 PM | 06/08/96 | 11:20 PM | | | |
| 400 | SIP | 0.0 | 0.0 | 0.0 HRS | | 143.3 | 5.97 | 5.97 | 06/08/96 | 11:20 PM | 06/08/96 | 11:20 PM | | | |
| 401 | CLEAN UP | 0.0 | 1.0 | 1.0 HRS | | 144.3 | 5.97 | 6.01 | 06/08/96 | 11:20 PM | 06/08/96 | 12:20 AM | | | |
| 402 | SUBTOTAL | 4.3 | | 5.3 HRS | 142.3 | | | | | | | | MAX FR | | 0.12 LPM |
| 403 | | | | | | | | | | | | | | | |
| 404 | 17 A P/A MPLC | | | | | | | | | | | | 5.3 L.CV | 0.4 H/D | 26.35 CM DIA. |
| 405 | | | | | | | | | | | | | | | |
| 406 | EQUILIBRATION | 0.5 | 0.0 | 0.5 HRS | 142.0 | | 5.89 | 5.91 | 06/08/96 | 09:28 PM | 06/08/96 | 09:57 PM | 26.6 L@ | 100.0 CM/HR or | 0.91 LPM |
| 407 | LOAD | 0.1 | 0.0 | 0.1 HRS | | 142.4 | 5.93 | 5.94 | 06/08/96 | 10:20 PM | 06/08/96 | 10:26 PM | 2.9 L@ | 50.0 CM/HR or | 0.45 LPM |
| 408 | WASH | 0.6 | 0.0 | 0.6 HRS | | 143.0 | 5.94 | 5.96 | 06/08/96 | 10:26 PM | 06/08/96 | 11:01 PM | 16.0 L@ | 50.0 CM/HR or | 0.45 LPM |
| 409 | ELUTE A | 0.6 | 0.0 | 0.6 HRS | | 143.6 | 5.96 | 5.98 | 06/08/96 | 11:01 PM | 06/08/96 | 11:36 PM | 16.0 L@ | 50.0 CM/HR or | 0.45 LPM |
| 410 | ELUTE B | 0.0 | 0.0 | 0.0 HRS | | 143.6 | 5.96 | 5.98 | 06/08/96 | 11:36 PM | 06/08/96 | 11:36 PM | 0.0 L@ | 30.0 CM/HR or | 0.27 LPM |
| 411 | REGENERATE | 0.1 | 0.0 | 0.1 HRS | | 143.7 | 5.98 | 5.99 | 06/08/96 | 11:36 PM | 06/08/96 | 11:42 PM | 5.3 L@ | 100.0 CM/HR or | 0.91 LPM |
| 412 | STORE | 0.2 | 0.0 | 0.2 HRS | | 143.9 | 5.99 | 6.00 | 06/08/96 | 11:42 PM | 06/08/96 | 11:54 PM | 10.6 L@ | 100.0 CM/HR or | 0.91 LPM |
| 413 | CIP | 0.0 | 0.0 | 0.0 HRS | | 143.9 | 6.00 | 6.00 | 06/08/96 | 11:54 PM | 06/08/96 | 11:54 PM | | | |
| 414 | SIP | 0.0 | 0.0 | 0.0 HRS | | 143.9 | 6.00 | 6.00 | 06/08/96 | 11:54 PM | 06/08/96 | 11:54 PM | | | |

FIG. 12H

| | | PROCESS TIME LINE | | | REL. TIME SCALE (HRS) | | ABS. DAYS | | START | | FINISH | | CALCULATIONS |
|---|---|---|---|---|---|---|---|---|---|---|---|---|---|
| | OPERATION | DURATION (HRS.) | | | PREP | EXEC. COMPL. | START | END | DATE | TIME | DATE | TIME | |
| | | CALC. | A/D | ADJ. | | | | | | | | | |
| 415 | CLEAN UP | 1.0 | 0.0 | 1.0 HRS | | 15.5 | | | 06/03/96 | 08:00 AM | | | |
| 416 | SUBTOTAL | 2.1 | | 2.1 HRS | | 143.6 144.9 | 6.00 | 6.04 | 06/08/96 | 11:54 PM | 06/09/96 | 12:54 AM | MAX FR  0.91 LPM |
| 417 | | | | | | | | | | | | | |
| 418 | 22 A STERILE FILTRATION | | | | | | | | | | | | 0.09 SF |
| 419 | | | | | 152.6 | 144.1 | | | | | | | 2.2 L@ 50.0 L/SF/Hr or 0.07 LPM |
| 420 | SET UP | 0.5 | 0.0 | 0.5 HRS | | | 6.34 | 6.36 | 06/09/96 | 08:06 AM | 06/09/96 | 06:36 AM | |
| 421 | FILTRATION | 0.5 | 0.0 | 0.5 HRS | | | 5.98 | 6.00 | 06/08/96 | 11:36 PM | 06/09/96 | 12:06 AM | |
| 422 | STORAGE | 0.5 | 0.0 | 0.5 HRS | | 144.6 | 6.00 | 6.03 | 06/09/96 | 12:06 AM | 06/09/96 | 12:36 AM | |
| 423 | CIP | 0.0 | 0.0 | 0.0 HRS | | 144.6 | 6.03 | 6.03 | 06/09/96 | 12:36 AM | 06/09/96 | 12:36 AM | |
| 424 | SIP | 0.0 | 0.0 | 0.0 HRS | | 144.6 | 6.03 | 6.03 | 06/09/96 | 12:36 AM | 06/09/96 | 12:36 AM | |
| 425 | CLEAN UP | 1.0 | 0.0 | 1.0 HRS | | 145.6 | 6.03 | 6.07 | 06/09/96 | 12:36 AM | 06/09/96 | 01:36 AM | |
| 426 | SUBTOTAL | 1.5 | | 1.5 HRS | | 144.1 | | | | | | | MAX FR  0.07 LPM |

FIG. 14A

| | | | GROUP 1 | |
|---|---|---|---|---|
| | UNIT OPERATION TYPE | PARAMETER | SOLN. | |
| T1 | INNOCULUM PREP | NUMBER OF FLASKS<br>MEDIA VOLUME/FLASK | | 2<br>0.25 LITERS |
| T2 | FLASK GROWTH | SCALE UP RATIO<br>MEDIA VOLUME/FLASK | | 10 FOLD<br>1.25 L |
| T3 | FERMENTATION<br>PRODUCTION | SCALE UP RATIO<br>FERMENTOR WORKING VOLUME<br>ANTIFOAM A<br>ANTIFOAM B<br>BASE<br>ACID | <br>S-101<br>S-102<br>S-103<br>S-104<br>S-105 | 10 FOLD<br>500 LITERS<br>1 MI/L<br>1 MI/L<br>5 MI/L<br>5 MI/L |
| T4 | INITIAL SEEDING | NUMBER OF AMPULES<br>VOLUME PER AMPULE<br>STARTING CELL DENSITY<br>AMPULE SPLIT RATIO<br>CULTURE VESSEL TYPE<br>FEED VOLUME | | 2<br>2 MI<br>300,000 CELLS/MI<br>1 VESSELS/AMPULE<br>ROLL. BOT.<br>100 MI |
| T5 | CULTURE VESSEL SPLIT | VESSEL SPLIT RATIO<br>NEW VESSEL TYPE<br>FEED VOLUME<br>SERUM CONTENT | | 2<br>RB<br>100 MI<br>2.0% FETAL BOVINE SERUM |
| T6 | SPINNER FLASK SEEDING | FLASK FEED VOLUME<br>VESSEL/FLASK RATIO<br>uCARRIER DENSITY<br>NUMBER OF PBS WASHES<br>NUMBER OF MEDIA WASHES<br>NO. OF MEDIA/SERUM WASHES | | 4 LITERS<br>0.1 L. CELLS/L FLASK<br>5 Gm/LITER<br>2<br>1<br>2 FBS |
| T7 | BIOSYNTHESIS<br>BIOREACTOR PREPARATION<br>(STIRRED TANK REACTOR) | REACTOR FEED VOLUME<br>SPINNER/REACTOR RATIO<br>uCARRIER DENSITY<br>NUMBER OF PBS WASHES<br>NUMBER OF MEDIA WASHES<br>NO. OF MEDIA/SERUM WASHES | | 500 LITERS<br>8.3<br>5 Gm/LITER<br>2<br>1<br>2 |
| T8 | BIOSYNTHESIS<br>BIOREACTOR PREPARATION<br>(HOLLOW FIBER REACTOR) | REACTOR FEED VOLUME<br>NUMBER OF PBS WASHES<br>NUMBER OF MEDIA WASHES<br>NO. OF MEDIA/SERUM WASHES<br>SERUM CONTENT | | 100 LITERS<br>2<br>2<br>2<br>2.0% FETAL BOVINE SERUM |
| T9 | BIOSYNTHESIS<br>BIOREACTOR PREPARATION<br>(FLUIDIZED BED REACTOR) | REACTOR FEED VOLUME<br>uCARRIER DENSITY<br>NUMBER OF PBS WASHES<br>NUMBER OF MEDIA WASHES<br>NO. OF MEDIA/SERUM WASHES<br>SERUM CONTENT | | LITERS<br>Gms/L |
| T10 | INITIAL SEEDING | NUMBER OF AMPULES<br>VOLUME PER AMPULE<br>STARTING CELL DENSITY<br>AMPULE SPLIT RATIO | | 2<br>2 MI<br>300,000 CELLS/MI<br>1 VESSELS/AMPULE |

FIG. 14B

| GROUP 2 | | | GROUP 3 | | |
|---|---|---|---|---|---|
| PARAMETER | SOLN. | | PARAMETER | SOLN. | |
| TEMPERATURE<br>AGITATION<br>DURATION | | 37 C<br>200 RPM<br>18 HOURS | FINAL OD | | 12 |
| TEMPERATURE<br>AGITATION<br>DURATION | | 37 C<br>200 HOURS<br>16 RPM | FINAL OD | | 12 |
| GROWTH TEMPERATURE<br>AGITATION<br>SPARGE RATE<br>BACK PRESSURE<br>TOTAL DURATION | | 37 HOURS<br>1 HP/100L<br>1.5 VVM<br>5 PSIG<br>21 HRS | FINAL OD<br>DRY CELL MASS<br>PRODUCT CONCENTRATION<br>CIP | | 12<br>9.96 Gms TDCM/L<br>0.3 Gms PRODUCT/L<br>Y |
| SERUM CONTENT<br>FEED RATE<br><br>DAYS TO CONFLUENCE | | 2.0% FETAL BOVINE SERUM<br>1 FEED PER VESSEL PER<br>2 DAYS<br>2 DAYS | AMPLIFICATION FACTOR | | 100% |
| FEED RATE<br><br>DAYS TO CONFLUENCE | | 1 FEED PER VESSEL PER<br>2 DAYS<br>2 DAYS | AMPLIFICATION FACTOR | | 100% |
| SERUM CONTENT<br>FEED RATE<br><br>DAYS TO CONFLUENCE | | 2.0% FETAL BOVINE SERUM<br>1 FEED PER VESSEL PER<br>2 DAYS<br>2 DAYS | AMPLIFICATION FACTOR | | 100% |
| SERUM CONTENT<br>FEED RATE<br><br>DAYS TO CONFLUENCE<br>SERUM FREE MEDIA WASHES | | 2.0% FETAL BOVINE SERUM<br>1 FEED PER VESSEL PER<br>2 DAYS<br>10 DAYS<br>2 | PRODUCT CONCENTRATION<br>TOTAL PROTEIN CONCEN. | | 2500% Mg PROD/L<br>0.125 Mg TP/MI |
| NUMBER OF REACTORS<br>FEED RATE<br><br>DAYS TO CONFLUENCE | | 1<br>1 FEED PER VESSEL PER<br>1 DAYS<br>10 DAYS | HARVEST VOLUME<br>PRODUCT CONCENTRATION<br>TOTAL PROTEIN CONCEN. | | 500% LITERS<br>25 Mg PROD/L<br>0.125 Mg TP/MI |
| NUMBER OF REACTORS<br>FEED RATE<br><br>DAYS TO CONFLUENCE | | 1<br>1 FEED PER VESSEL PER<br>1 DAYS<br>10 DAYS | PRODUCT CONCENTRATION<br>TOTAL PROTEIN CONCEN. | | 2500% Mg PROD/L<br>0.125 Mg TP/MI |
| SERUM CONTENT<br>FEED RATE<br><br>DAYS TO CONFLUENCE | | 2.0% FETAL BOVINE SERUM<br>1 FEED PER VESSEL PER<br>2 DAYS<br>2 DAYS | AMPLIFICATION FACTOR | | 100% |

FIG. 15A

| UNIT OPERATION TYPE | PARAMETER | SOLN. | GROUP 1 |
|---|---|---|---|
| | CULTURE VESSEL TYPE | | ROLL. BOT. |
| | FEED VOLUME | | 100 MI |
| T11 CULTURE VESSEL SPLIT | VESSEL SPLIT RATIO | | 2 |
| | NEW VESSEL TYPE | RB | |
| | FEED VOLUME | | 100 MI |
| | SERUM CONTENT | | 2.0% FETAL BOVINE SERUM |
| T12 SPINNER FLASK SPLIT | FLASK FEED VOLUME | | 4 LITERS |
| | VESSEL/FLASK RATIO | | 0.1 L CELLS/L FLASK |
| | uCARRIER DENSITY | | 5 Gm/LITER |
| | NUMBER OF PBS WASHES | | 2 |
| | NUMBER OF MEDIA WASHES | | 1 |
| | NO. OF MEDIA/SERUM WASHES | | 2 |
| T13 BIOSYNTHESIS BIOREACTOR PREPARATION (STIRRED TANK REACTOR) | REACTOR FEED VOLUME | | 500 LITERS |
| | SPINNER/REACTOR RATIO | | 8.3 |
| | uCARRIER DENSITY | | 5 Gm/LITER |
| | NUMBER OF PBS WASHES | | 2 |
| | NUMBER OF MEDIA WASHES | | 1 |
| | NO. OF MEDIA/SERUM WASHES | | 2 |
| T14 BIOSYNTHESIS BIOREACTOR PREPARATION (FLUIDIZED BED REACTOR) | REACTOR FEED VOLUME | | LITERS |
| | uCARRIER DENSITY | | GmS/L |
| | NUMBER OF PBS WASHES | | |
| | NUMBER OF MEDIA WASHES | | |
| | NO. OF MEDIA/SERUM WASHES | | |
| | SERUM CONTENT | | |
| T15 INITIAL COUPLING | FLASK FEED VOLUME | | 4 LITERS |
| | VESSEL/FLASK RATIO | | 0.1 L CELLS/L FLASK |
| | uCARRIER DENSITY | | 5 Gm/LITER |
| | NUMBER OF PBS WASHES | | 2 |
| | NUMBER OF MEDIA WASHES | | 1 |
| | NO. OF MEDIA/SERUM WASHES | | 2 FBS |
| T16 ADDITIONAL COUPLING | REACTOR FEED VOLUME | | 500 LITERS |
| | SPINNER/REACTOR RATIO | | 8.3 |
| | uCARRIER DENSITY | | 5 Gm/LITER |
| | NUMBER OF PBS WASHES | | 2 |
| | NUMBER OF MEDIA WASHES | | 1 |
| | NO. OF MEDIA/SERUM WASHES | | 2 |
| T17 PEPTIDE CLEAVAGE | REACTOR FEED VOLUME | | 100 LITERS |
| | NUMBER OF PBS WASHES | | 2 |
| | NUMBER OF MEDIA WASHES | | 2 |
| | NO. OF MEDIA/SERUM WASHES | | 2 |
| | SERUM CONTENT | | 2.0% FETAL BOVINE SERUM |
| T18 TISSUE THAWING | CRUDE PRODUCT YEILD | | 25 Gm CRUDE PROD./Kg TISSUE |
| | ENVIRONMENTAL TEMPERATURE | | 25 C |
| | THAW DURATION | | 16 HOURS |
| T19 HOMOGENIZATION | CRUDE PRODUCT YEILD | | 25 Gm CRUDE PROD./Kg TISSUE |
| | LIQUID/SOLID RATIO | | 10 L SOLUTION/KG TISSUE |
| | HOMMOGENIZATION TEMP. | | 4 C |
| | HOMMOGENIZER TYPE | | RS |
| | ENERGY INPUT | | 200 HP/100L/HR |
| | DURATION | | 4 HOURS |
| T20 LIQUID THAWING | | | |

FIG. 15B

| GROUP 2 | | | GROUP 3 | | |
|---|---|---|---|---|---|
| PARAMETER | SOLN. | | PARAMETER | SOLN. | |
| PBS WASHES | | 200 Ml | | | |
| TRYPSIN WASH | | 100 Ml | | | |
| FEED RATE | | 1 FEED PER VESSEL PER 2 DAYS | AMPLIFICATION FACTOR | | 100% |
| DAYS TO CONFLUENCE | | 2 DAYS | | | |
| PBS WASHES | | 200 Ml | | | |
| TRYPSIN WASH | | 100 Ml | | | |
| SERUM CONTENT | | 2.0% FETAL BOVINE SERUM | AMPLIFICATION FACTOR | | 100% |
| FEED RATE | | 1 FEED PER VESSEL PER 2 DAYS | | | |
| DAYS TO CONFLUENCE | | 2 DAYS | | | |
| SERUM CONTENT | | 2.0% FETAL BOVINE SERUM | PRODUCT CONCENTRATION | | 2500% Mg PROD/L |
| FEED RATE | | 1 FEED PER VESSEL PER 2 DAYS | TOTAL PROTEIN CONCEN. | | 0.125 Mg TP/Ml |
| DAYS TO CONFLUENCE | | 10 DAYS | | | |
| SERUM FREE MEDIA WASHES | | 2 | | | |
| NUMBER OF REACTORS | | 1 | PRODUCT CONCENTRATION | | 2500% Mg PROD/L |
| FEED RATE | | 1 FEED PER VESSEL PER 1 DAYS | TOTAL PROTEIN CONCEN. | | 0.125 Mg TP/Ml |
| DAYS TO CONFLUENCE | | 10 DAYS | | | |
| SERUM CONTENT | | 2.0% FETAL BOVINE SERUM | AMPLIFICATION FACTOR | | 100% |
| FEED RATE | | 1 FEED PER VESSEL PER 2 DAYS | | | |
| DAYS TO CONFLUENCE | | 2 DAYS | | | |
| SERUM CONTENT | | 2.0% FETAL BOVINE SERUM | PRODUCT CONCENTRATION | | 2500% Mg PROD/L |
| FEED RATE | | 1 FEED PER VESSEL PER 2 DAYS | TOTAL PROTEIN CONCEN. | | 0.125 Mg TP/Ml |
| DAYS TO CONFLUENCE | | 10 DAYS | | | |
| SERUM FREE MEDIA WASHES | | 2 | | | |
| NUMBER OF REACTORS | | 1 | HARVEST VOLUME | | 500% LITERS |
| FEED RATE | | 1 FEED PER VESSEL PER 1 DAYS | PRODUCT CONCENTRATION | | 25 Mg PROD/L |
| DAYS TO CONFLUENCE | | 10 DAYS | TOTAL PROTEIN CONCEN. | | 0.125 Mg TP/Ml |
| CONTAMINANT PROTEIN CONC. | | 100 Gm/L | TEMPERATURE REGULATION | | Y |
| | | | CIP | | Y |
| | | | SIP | | Y |
| CONTAMINANT PROTEIN CONC. | | 100 Gm/L | TEMPERATURE REGULATION | | Y |
| | | | CIP | | Y |
| | | | SIP | | Y |
| | | | AMPLIFICATION FACTOR | | 100% |

FIG. 16A

| UNIT OPERATION TYPE | | GROUP 1 | |
|---|---|---|---|
| | PARAMETER | SOLN. | |
| T21 PRODUCT Ppt BY SOLIDS | REAGENT CONCENTRATION | | 1 M |
| T22 PRODUCT Ppt BY LIQUIDS | REAGENT CONCENTRATION | | 1 M |
| T23 CONTAINMENT Ppt BY SOLIDS | REAGENT CONCENTRATION | | 1 M |
| T24 CONTAINMENT Ppt BY LIQUIDS | REAGENT CONCENTRATION | | 1 M |
| T25 SOLIDS HARVEST TANGENTIAL FLOW MF | POROSITY AVERAGE FLUX RATE<br><br>TOTAL THROUGHPUT FILTRATION TIME | | 0.2 MICRON<br>11 L/SF/HR AT<br>40 PSIG AT<br>4 C<br>400 LITERS/SF<br>1 HR |
| T26 CONTINUOUS CENTRIFUGATION SOLIDS HARVEST | SYSTEM VOID VOLUME | | 5 LITERS |
| T27 CONTINUOUS CENTRIFUGATION SUPERNATANT HARVEST | SYSTEM VOID VOLUME | | 6 LITERS |
| T28 DILUTION | SYSTEM VOID VOLUME | | 6 LITERS |
| T29 BATCH CENTRIFUGATION SOLIDS HARVEST | SYSTEM VOID VOLUME | | 6 LITERS |

FIG. 16B

| GROUP 2 | | | GROUP 3 | | |
|---|---|---|---|---|---|
| PARAMETER | SOLN. | | PARAMETER | SOLN. | |
| Kgms OF REAGENT/LITERS PRODUCT<br>TEMPERATURE<br>ADDITION TIME<br>ADDITIONAL MIX TIME | | 0.25 Kg/L<br>4 C<br>0.5 HOURS<br>2 HOURS | STEP RECOVERY OF PRODUCT<br>STEP RECOVERY OF T.P.<br><br>TEMPERATURE REGULATION<br>CIP<br>SIP | | 95%<br>95%<br><br>Y<br>Y<br>Y |
| LITERS REAGENT/LITERS PRODUCT<br>TEMPERATURE<br>ADDITION TIME<br>ADDITIONAL MIX TIME | | 0.25 L/L<br>4 C<br>0.5 HOURS<br>2 HOURS | STEP RECOVERY OF PRODUCT<br>STEP RECOVERY OF T.P.<br><br>TEMPERATURE REGULATION<br>CIP<br>SIP | | 95%<br>95%<br><br>Y<br>Y<br>Y |
| Kgms OF REAGENT/LITERS PRODUCT<br>TEMPERATURE<br>ADDITION TIME<br>ADDITIONAL MIX TIME | | 0.25 Kg/L<br>4 C<br>0.5 HOURS<br>2 HOURS | STEP RECOVERY OF PRODUCT<br>STEP RECOVERY OF T.P.<br><br>TEMPERATURE REGULATION<br>CIP<br>SIP | | 95%<br>95%<br><br>Y<br>Y<br>Y |
| LITERS REAGENT/LITERS PRODUCT<br>TEMPERATURE<br>ADDITION TIME<br>ADDITIONAL MIX TIME | | 0.25 L/L<br>4 C<br>0.5 HOURS<br>2 HOURS | STEP RECOVERY OF PRODUCT<br>STEP RECOVERY OF T.P.<br><br>TEMPERATURE REGULATION<br>CIP<br>SIP | | 95%<br>95%<br><br>Y<br>Y<br>Y |
| FLUSH<br>PRIME<br>CONCENTRATION FACTOR<br>WASH<br>REGENERATE<br>STORE | | 2 L/SF<br>2 L/SF<br>10 FOLD<br>0.5 L/SF<br>1 L/SF<br>2 L/SF | STEP RECOVERY OF PRODUCT<br>STEP RECOVERY OF T.P.<br><br>TEMPERATURE REGULATION<br>CIP<br>SIP | | 95%<br>95%<br><br>Y<br>Y<br>Y |
| RCF<br>TIME<br>VOLUME REDUCTION<br>WASH VOLUME | | 10,000 X G<br>60 MINUTES<br>30 X VOL. REDUCTION<br>0.2 X SYSTEM VOID VOLUME | STEP RECOVERY OF PRODUCT<br>STEP RECOVERY OF T.P.<br><br>TEMPERATURE REGULATION<br>CIP<br>SIP | | 95%<br>95%<br><br>Y<br>Y<br>Y |
| RCF<br>TIME<br>VOLUME REDUCTION<br>WASH VOLUME | | 10,000 X G<br>30 MINUTES<br>0.062 VOL. REDUCTION<br>1.5 X SYSTEM VOID VOLUME | STEP RECOVERY OF PRODUCT<br>STEP RECOVERY OF T.P.<br><br>TEMPERATURE REGULATION<br>CIP<br>SIP | | 85%<br>0.3<br><br>Y<br>Y<br>Y |
| RCF<br>TIME<br>VOLUME REDUCTION<br>WASH VOLUME | | 10,000 X G<br>30 MINUTES<br>16 X VOL. REDUCTION<br>1.5 X SYSTEM VOID VOLUME | STEP RECOVERY OF PRODUCT<br>STEP RECOVERY OF T.P.<br><br>TEMPERATURE REGULATION<br>CIP<br>SIP | | 95%<br>0.95<br><br>Y<br>Y<br>Y |
| RCF<br>TIME | | 10,000 X G<br>30 MINUTES | STEP RECOVERY OF PRODUCT<br>STEP RECOVERY OF T.P. | | 95%<br>0.95 |

FIG. 17A

| | GROUP 1 | | |
|---|---|---|---|
| UNIT OPERATION TYPE | PARAMETER | SOLN. | |
| T30 BATCH CENTRIFUGATION SUPERNATANT HARVEST | SYSTEM VOID VOLUME | | 6 LITERS |
| T31 CELL DISRUPTION HIGH PRESS. HOMOGEN. | PRODUCT TEMPERATURE<br>UTILITY TEMPERATURE<br>VOID VOLUME | | 8 C<br>2 C<br>5 LITERS |
| T32 CELL DISRUPTION BEAD MILL | NUMBER OF PASSES<br>BEAD SIZE<br>VOID VOLUME<br>FLOW RATE | | 2<br><br><br>0.5 LPM |
| T33 CELL DISRUPTION CHEMICAL LYSIS | REAGENT<br>TEMPERATURE<br>EXPOSURE TIME | | 0.5 M NaOH<br>4 C<br>2 HOURS |
| T34 MICROFILTRATION TANGENTIAL FLOW | POROSITY<br>AVERAGE FLUX RATE<br><br><br>TOTAL THROUGHPUT<br>FILTRATION TIME | | 0.2 MICRON<br>50 L/SF/HR AT<br>40 PSIG AT<br>4 C<br>400 LITERS/SF<br>2 HR |
| T35 MICROFILTRATION DEAD END | POROSITY<br>AVERAGE FLUX RATE<br><br><br>TOTAL THROUGHPUT<br>FILTRATION TIME | | 0.2 MICRON<br>50 L/SF/HR AT<br>40 PSIG AT<br>4 C<br>400 LITERS/SF<br>0.5 HR |
| T36 ULTRAFILTRATION CONCENTRATION/DILUTION | POROSITY<br>AVERAGE FLUX RATE<br><br><br>CONCENTRATION TIME | | 60 K NMWL<br>3 L/SF/HR AT<br>40 PSIG AT<br>4 C<br>2 HR |
| T37 ULTRAFILTRATION FLOW DIALYSIS | POROSITY<br>AVERAGE FLUX RATE | | 60 K NMWL<br>3 L/SF/HR AT<br>40 PSIG AT<br>4 C |

FIG. 17B

| GROUP 2 | | GROUP 3 | |
|---|---|---|---|
| PARAMETER | SOLN. | PARAMETER | SOLN. |
| VOLUME REDUCTION<br>WASH VOLUME | 16 X VOL. REDUCTION<br>1.5 X SYSTEM VOID VOLUME | TEMPERATURE REGULATION<br>CIP<br>SIP | Y<br>Y<br>Y |
| RCF<br>TIME<br>VOLUME REDUCTION<br>WASH VOLUME | 10000 X G<br>30 MINUTES<br>16 X VOL. REDUCTION<br>1.5 X SYSTEM VOID VOLUME | STEP RECOVERY OF PRODUCT<br>STEP RECOVERY OF T.P.<br><br>TEMPERATURE REGULATION<br>CIP<br>SIP | 95%<br>0.95<br><br>Y<br>Y<br>Y |
| NUMBER OF PASSES<br>PRESSURE<br>FLOW RATE<br>TEMPERATURE INCREASE | 6 TIMES<br>12,000 PSI<br>5 LPM<br>1.8 DEGREES C/1,000 PSI | RINSE<br>STEP RECOVERY OF PRODUCT<br>STEP RECOVERY OF T.P.<br>TEMPERATURE REGULATION<br>CIP<br>SIP | 500% VOID VOLUMES<br>95%<br>95%<br>Y<br>Y<br>Y |
| | | STEP RECOVERY OF PRODUCT<br>STEP RECOVERY OF T.P.<br><br>TEMPERATURE REGULATION<br>CIP<br>SIP | 95%<br><br><br>Y<br>Y<br>Y |
| LITERS REAGENT/Gm PRODUCT<br>TITRATION | 0.4 L/Gm<br>0 Ml/LITER | STEP RECOVERY OF PRODUCT<br>STEP RECOVERY OF T.P.<br><br>TEMPERATURE REGULATION<br>CIP<br>SIP | 95%<br><br><br>Y<br>Y<br>Y |
| FLUSH<br>PRIME<br>WASH<br>SOLIDS<br>REGENERATE<br>STORE | 2.00 L/SF<br>2.00 L/SF<br>0.50 L/SF<br>0.30% OF PRODUCT SOLUTION<br>1.00 L/SF<br>2.00 L/SF | STEP RECOVERY OF PRODUCT<br>STEP RECOVERY OF T.P.<br><br>TEMPERATURE REGULATION<br>CIP<br>SIP | 95%<br>95%<br><br>Y<br>Y<br>Y |
| FLUSH<br>PRIME<br>WASH<br>SOLIDS<br>REGENERATE<br>STORE | 0 L/SF<br>0 L/SF<br>0.5 L/SF<br>0.003 OF PRODUCT SOLUTION<br>1 L/SF<br>2 L/SF | STEP RECOVERY OF PRODUCT<br>STEP RECOVERY OF T.P.<br><br>TEMPERATURE REGULATION<br>CIP<br>SIP | 95%<br>0.95<br><br>N<br>N<br>N |
| FLUSH<br>PRIME<br>WASH<br>DILUTE CONCENTRATE<br>SOLIDS<br>REGENERATE | 2.00 L/SF<br>2.00 L/SF<br>0.50 L/SF<br>10.0 FOLD<br>0.30% OF PRODUCT SOLUTION<br>1.00 L/SF | STORE<br>STEP RECOVERY OF PRODUCT<br>STEP RECOVERY OF T.P.<br>TEMPERATURE REGULATION<br>CIP<br>SIP | 2.00 L/SF<br>95%<br>95%<br>Y<br>Y<br>Y |
| FLUSH<br>PRIME<br>DIALYSIS BUFFER<br>WASH | 2 L/SF<br>2.00 L/SF<br>5.0 X FEED STREAM VOLUME<br>0.50 L/SF | STORE<br>STEP RECOVERY OF PRODUCT<br>STEP RECOVERY OF T.P.<br>TEMPERATURE REGULATION | 200% L/SF<br>95%<br>95%<br>Y |

FIG. 18A

| UNIT OPERATION TYPE | PARAMETER | SOLN. | GROUP 1 | |
|---|---|---|---|---|
| | DIALYSIS TIME | | 2 | HR |
| T38 PROD. ADS. CHROMATOGRAPHY HPLC | COLUMN CAPACITY<br>COLUMN OVERSIZE FACTOR<br>COLUMN ASPECT RATIO<br>MAX. LINEAR VELOCITY | | 10<br>1.5<br>0.37<br>100<br>45<br>4 | Mg PROD./MI OF PACKING<br>FOLD<br>H/D<br>Cm/HR AT<br>PSIG AND<br>C |
| T39 PROD. ADS. CHROMATOGRAPHY MPLC | COLUMN CAPACITY<br>COLUMN OVERSIZE FACTOR<br>COLUMN ASPECT RATIO<br>MAX. LINEAR VELOCITY | | 10<br>1.5<br>0.37<br>100<br>45<br>4 | Mg PROD./MI OF PACKING<br>FOLD<br>H/D<br>Cm/HR AT<br>PSIG AND<br>C |
| T40 PROD. ADS. CHROMATOGRAPHY LPLC | COLUMN CAPACITY<br>COLUMN OVERSIZE FACTOR<br>COLUMN ASPECT RATIO<br>MAX. LINEAR VELOCITY | | 10<br>1.5<br>0.37<br>100<br>45<br>4 | Mg PROD./MI OF PACKING<br>FOLD<br>H/D<br>Cm/HR AT<br>PSIG AND<br>C |
| T41 CONT. ADS. CHROMATOGRAPHY HPLC | COLUMN CAPACITY<br>COLUMN OVERSIZE FACTOR<br>COLUMN ASPECT RATIO<br>MAX. LINEAR VELOCITY | | 30<br>1.5<br>0.37<br>100<br>45<br>4 | Mg CONT./MI OF PACKING<br>FOLD<br>H/D<br>Cm/HR AT<br>PSIG AND<br>C |
| T42 CONT. ADS. CHROMATOGRAPHY MPLC | COLUMN CAPACITY<br>COLUMN OVERSIZE FACTOR<br>COLUMN ASPECT RATIO<br>MAX. LINEAR VELOCITY | | 10<br>1.5<br>0.37<br>100<br>45<br>400% | Mg CONT./MI OF PACKING<br>FOLD<br>H/D<br>Cm/HR AT<br>PSIG AND<br>C |
| T43 CONT. ADS. CHROMATOGRAPHY LPLC | COLUMN CAPACITY<br>COLUMN OVERSIZE FACTOR<br>COLUMN ASPECT RATIO<br>MAX. LINEAR VELOCITY | | 10<br>1.5<br>0.37<br>100<br>45<br>4 | Mg CONT./MI OF PACKING<br>FOLD<br>H/D<br>Cm/HR AT<br>PSIG AND<br>C |
| T44 SIZE EXCL. CHROMATOGRAPHY HPLC | LOAD CAPACITY<br>LENGTH<br>MAX. LINEAR VELOCITY<br><br>VOID VOLUME | | 5%<br>100<br>100<br>45<br>4<br>25% | OF TOTAL COLUMN VOLUME<br>Cm<br>Cm/HR AT<br>PSIG AND<br>C<br>COLUMN VOLUME |
| T45 SIZE EXCL. CHROMATOGRAPHY MPLC | LOAD CAPACITY<br>LENGTH<br>MAX. LINEAR VELOCITY<br><br>VOID VOLUME | | 5%<br>100<br>100<br>45<br>4<br>25% | OF TOTAL COLUMN VOLUME<br>Cm<br>Cm/HR AT<br>PSIG AND<br>C<br>COLUMN VOLUME |

FIG. 18B

| GROUP 2 | | | GROUP 3 | | |
|---|---|---|---|---|---|
| PARAMETER | SOLN. | | PARAMETER | SOLN. | |
| SOLIDS | | 0.30% OF PRODUCT SOLUTION | CIP | | Y |
| REGENERATE | | 1.00 L/SF | SIP | | Y |
| COLUMN EQUILIBRATION | | 5 COLUMN VOLUMES | PROD. ELUTION VOLUME | | 80% |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 0 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 5 COLUMN VOLUMES | PROD. ELUTION VOLUME | | 80% |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 0 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 5 COLUMN VOLUMES | PROD. ELUTION VOLUME | | 42% |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 2 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 5 COLUMN VOLUMES | PROD. ELUTION VOLUME | | 42% |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 2 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 5 COLUMN VOLUMES | PROD. ELUTION VOLUME | | 42% |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 2 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 5 COLUMN VOLUMES | PROD. ELUTION VOLUME | | 42% COLUMNS VOLUMES |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 2 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 4 COLUMN VOLUMES | PROD. ELUTION VOLUME | | 42% COLUMNS VOLUMES |
| COLUMN WASH | | 1 COLUMN VOLUMES | STEP RECOVERY OF PRODUCT | | 95% |
| COLUMN REGENERATE | | 1 COLUMN VOLUMES | STEP RECOVERY OF T.P. | | 95% |
| COLUMN STORE | | 2 COLUMN VOLUMES | TEMPERATURE REGULATION | | N |
| | | | CIP | | Y |
| | | | SIP | | Y |
| COLUMN EQUILIBRATION | | 4 COLUMN VOLUMES | PROD. ELUTION VOLUME | | 42% COLUMNS VOLUMES |
| COLUMN WASH | | 1 COLUMN VOLUMES | STEP RECOVERY OF PRODUCT | | 95% |
| COLUMN REGENERATE | | 1 COLUMN VOLUMES | STEP RECOVERY OF T.P. | | 95% |
| COLUMN STORE | | 2 COLUMN VOLUMES | TEMPERATURE REGULATION | | N |
| | | | CIP | | Y |
| | | | SIP | | Y |

FIG. 19A

| | | GROUP 1 | |
|---|---|---|---|
| UNIT OPERATION TYPE | PARAMETER | SOLN. | |
| T46 SIZE EXCL. CHROMATOGRAPHY LPLC | LOAD CAPACITY<br>LENGTH<br>MAX. LINEAR VELOCITY<br><br>VOID VOLUME | | 5% OF TOTAL COLUMN VOLUME<br>100 Cm<br>100 Cm/HR AT<br>45 PSIG AND<br>4 C<br>25% COLUMN VOLUME |
| T47 DILUTION | DILUTION FACTOR | | 3 LITERS/LITER |
| T48 RESOLUBILIZATION | REGEANT/PRODUCT RATIO<br><br>DISSOLUTION TIME<br>ADDITIONAL MIX TIME | | 0 L/Kg PRODUCT<br><br>0.50 HOURS<br>0.50 HOURS |
| T49 ENZYMATIC MODIFICTAION | ENZYME TO PRODUCT RATIO<br><br>ENZYME CONCENTRATION<br>REACTION TEMP.<br>REACTION DURATION | | 0.084 LITERS OF ENZYME STOCK PER LITER OF START. PROC. VOL.<br>2 Mg/Ml<br>37 DEGREES C<br>30 MINUTES<br>100% |
| T50 LYOPHILIZATION | PRODUCT CAPACITY/LOAD<br>PRODUCT UNIT SIZE | | 8 UNITS<br>100 GRAMS/UNIT |
| T51 HEAT EXCHANGE | PROCESS INITIAL TEMP<br>PROCESS FINAL TEMP<br>UTILITY INITIAL TEMP<br>UTILITY FINAL TEMP<br>PROCESS SPECIFIC HEAT<br>DESIGN TYPE (P,T,C) | | 98.6 DEGREES C<br>39.2 DEGREES C<br>34 DEGREES C<br>5 DEGREES C<br>38.6 K BTU/HR<br>P |
| T52 STORAGE | | | |
| T53 FERMENTATION SEED | SCALE UP RATIO<br>FERMENTOR WORKING VOLUME<br>ANTIFOAM A<br>ANTIFOAM B<br>BASE<br>ACID | | 10 FOLD<br>50 LITERS<br>1 MI/L<br>1 MI/L<br>5 MI/L<br>5 MI/L |
| T54 INITIAL SEEDING | FLASK FEED VOLUME<br>SPINNER SPLIT RATIO | | 12 LITERS<br>4 |

FIG. 19B

| GROUP 2 | | | GROUP 3 | | |
|---|---|---|---|---|---|
| PARAMETER | SOLN. | | PARAMETER | SOLN. | |
| COLUMN EQUILIBRATION<br>COLUMN WASH<br>COLUMN REGENERATE<br>COLUMN STORE | | 4 COLUMN VOLUMES<br>1 COLUMN VOLUMES<br>1 COLUMN VOLUMES<br>2 COLUMN VOLUMES | PROD. ELUTION VOLUME<br>STEP RECOVERY OF PRODUCT<br>STEP RECOVERY OF T.P.<br>TEMPERATURE REGULATION<br>CIP<br>SIP | | 42% COLUMN VOLUMES<br>95%<br>95%<br>N<br>Y<br>Y |
| DILUTION TIME<br>ADDITIONAL MIX TIME | | 0.5 HOURS<br>1 HOURS | STEP RECOVERY OF PRODUCT<br>STEP RECOVERY OF T.P.<br><br>TEMPERATURE REGULATION<br>CIP<br>SIP | | 95%<br>95%<br><br>Y<br>Y<br>Y |
| REGEANT 1<br>CONCENTRATION | | WATER<br>DIST. | STEP RECOVERY OF PRODUCT<br>STEP RECOVERY OF T.P.<br><br>TEMPERATURE REGULATION<br>CIP<br>SIP | | 95%<br>95%<br><br>Y<br>Y<br>Y |
| TITRATION SOLUTION-1<br>TITRATION SOLUTION-2<br>NEUTRALIZATION | | 0.067 L/L PROCESS<br>0.02 L/L PROCESS<br>0.57 L/L PROCESS | STEP RECOVERY OF PRODUCT<br>STEP RECOVERY OF T.P.<br><br>TEMPERATURE REGULATION<br>CIP<br>SIP | | 95%<br>95%<br><br>Y<br>Y<br>Y |
| LYOPHILIZATION TIME<br>PRODUCT WEIGHT REDUCTION | | 18 HOURS<br>0.95 | STEP RECOVERY OF PRODUCT<br>STEP RECOVERY OF T.P.<br><br><br>CIP<br>SIP | | 95%<br>95%<br><br>Y<br>Y<br>Y |
| EXPOSURE TIME | | 1 HOURS | STEP RECOVERY OF PRODUCT<br>STEP RECOVERY OF T.P.<br><br>TEMPERATURE REGULATION<br>CIP<br>SIP | | 100%<br>100%<br><br>Y<br>Y<br>Y |
| | | | STEP RECOVERY OF PRODUCT<br>STEP RECOVERY OF T.P.<br><br>TEMPERATURE REGULATION<br>CIP<br>SIP | | 95%<br>95%<br><br>Y<br>Y<br>Y |
| GROWTH TEMPERATURE<br>AGITATION<br>SPARGE RATE<br>BACK PRESSURE<br>TOTAL DURATION | | 37 HOURS<br>1 HP/100L<br>1.5 VVM<br>5 PSIG<br>21 HRS | FINAL OD<br>CIP | | 12<br><br><br>Y |
| SERUM CONTENT<br>FEED RATE | | 2% FBS<br>1 FEED PER VESSEL PER | AMPLIFICATION FACTOR | | 1 |

FIG. 20A

| | | GROUP 1 | |
|---|---|---|---|
| UNIT OPERATION TYPE | PARAMETER | SOLN. | |
| | uCARRIER DENSITY<br>NUMBER OF PBS WASHES<br>NUMBER OF MEDIA WASHES<br>NO. OF MEDIA/SERUM WASHES | | 5 Gm/LITER<br>2<br>1<br>2 FBS |
| T55 CULTURE VESSEL SPLIT | FLASK FEED VOLUME<br><br>SPINNER SPLIT RATIO<br>uCARRIER DENSITY<br>NUMBER OF PBS WASHES<br>NUMBER OF MEDIA WASHES<br>NO. OF MEDIA/SERUM WASHES | | 12 LITERS<br><br>4<br>5 Gm/LITER<br>2<br>1<br>2 FBS |
| T56 CULTURE FLASK SPLIT | | | |
| T57 STIRRED TANK REACTOR | | | |
| T58 FLUIDIZED BED REACTOR | PROCESS INITIAL TEMP<br>PROCESS FINAL TEMP<br>UTILITY INITIAL TEMP<br>UTILITY FINAL TEMP<br>PROCESS SPECIFIC HEAT<br>DESIGN TYPE (P,T,C) | | 37 DEGREES C<br>4 DEGREES C<br>2 DEGREES C<br>5 DEGREES C<br>12 K BTU/HR<br>P |
| T59 LIQUID/LIQUID EXTRACTION | LIQUID/LIQUID RATIO<br>EXTRACTION TEMPERATURE<br>ADDITION DURATION<br>ADDITIONAL MIX. DURATION<br>MIX ENERGY | | 1 L EXTRACTION/L PRODUCT<br>4 C<br>0.5 HOURS<br>4 HOURS<br>0.3 HP/100L |
| T60 SOLID/LIQUID EXTRACTION | LIQUID/LIQUID RATIO<br>EXTRACTION TEMPERATURE<br>DURATION<br>MIX ENERGY | | 1 L EXTRACTION/L PRODUCT<br>4 C<br>4 HOURS<br>0.3 HP/100 L |

FIG. 20B

| GROUP 2 | | | GROUP 3 | | |
|---|---|---|---|---|---|
| PARAMETER | SOLN. | | PARAMETER | SOLN. | |
| DAYS TO CONFLUENCE | | 2 DAYS<br>2 DAYS | | | |
| SERUM CONTENT | | 2% FBS | AMPLIFICATION FACTOR | | 1 |
| FEED RATE | | 1 FEED PER VESSEL PER<br>2 DAYS | | | |
| DAYS TO CONFLUENCE | | 2 DAYS | | | |
| | | | STEP RECOVERY OF PRODUCT<br>STEP RECOVERY OF T.P.<br><br>CIP<br>SIP | | 0.95<br>95%<br><br>Y<br>Y<br>Y |
| EXPOSURE TIME | | 50% HOURS | STEP RECOVERY OF PRODUCT<br>STEP RECOVERY OF T.P.<br><br>TEMPERATURE REGULATION<br>CIP<br>SIP | | 0.95<br>100%<br><br>Y<br>Y<br>Y |
| PHASE SEPARATION TIME<br>PRODUCT PHASE (TOP/BOTTOM)<br>HARVEST TIME | | 1600% HOURS<br>TOP<br>0.5 HOURS | STEP RECOVERY OF PRODUCT<br>STEP RECOVERY OF T.P.<br><br>TEMPERATURE REGULATION<br>CIP<br>SIP | | 0.9<br>50%<br><br>Y<br>Y<br>Y |
| PHASE SEPARATION TIME<br>PRODUCT PHASE (TOP/BOTTOM)<br>HARVEST TIME | | 1600% HOURS<br>TOP<br>0.5 HOURS | STEP RECOVERY OF PRODUCT<br>STEP RECOVERY OF T.P.<br><br>TEMPERATURE REGULATION<br>CIP<br>SIP | | 0.9<br>50%<br><br>Y<br>Y<br>Y |

SYSTEM AND METHOD FOR SIMULATION AND MODELING OF BIOPHARMACEUTICAL BATCH PROCESS MANUFACTURING FACILITIES

CROSS-REFERENCE TO RELATED APPLICATION

This application claims priority to U.S. Provisional Patent Application No. 60/037,387, filed Feb. 7, 1997, the contents of which are entirely incorporated herein by reference.

BACKGROUND OF THE INVENTION

1. Field of the Invention

The present invention relates generally to the design of large scale batch manufacturing facilities, and specifically to the design of biopharmaceutical drug manufacturing processes.

2. Related Art

Biopharmaceutical plants produce biopharmaceutical products through biological methods. Typical biopharmaceutical synthesis methods are mammalian cell culture, microbial fermentation and insect cell culture. Occasionally biopharmaceutical products are produced from natural animal or plant sources or by a synthetic technique called solid phase synthesis. Mammalian cell culture, microbial fermentation and insect cell culture involve the growth of living cells and the extraction of biopharmaceutical products from the cells or the medium surrounding the cells. Solid phase synthesis and crude tissue extraction are processes by which biopharmaceuticals are synthesized from chemicals or extracted from natural plant or animal tissues, respectively.

The process for producing biopharmaceuticals is complex. In addition to basic synthesis, additional processing steps of separation, purification, conditioning and formulation are required to produce the end product biopharmaceutical. Each of these processing steps includes additional unit operations. For example, the step of purification may include the step of Product Adsorption Chromatography, which may further include the unit operations of High Pressure Liquid Chromatography (HPLC), Medium Pressure Liquid Chromatography (MPLC), Low Pressure Liquid Chromatography (LPLC), etc. The production of biopharmaceuticals is complex because of the number, complexity and combinations of synthesis methods and processing steps possible. Consequently, the design of a biopharmaceutical plant is expensive.

Tens of millions of dollars can be misspent during the design and construction phases of biopharmaceutical plants due to inadequacies in the design process. Errors and inefficiencies are introduced in the initial design of the biopharmaceutical production process because no effective tools for modeling and simulating a biopharmaceutical production process exists. The inadequacies in the initial process design carry through to all phases of the biopharmaceutical plant design and construction. Errors in the basic production process design propagate through all of the design and construction phases, resulting in increased cost due to change orders late in the facility development project. For example, detailed piping and instrumentation diagrams (P&IDs) normally cost thousands of dollars per diagram. Problems in the biopharmaceutical production process design frequently necessitate the re-working of these detailed P&IDS. This adds substantially to the overall cost of design and construction of a biopharmaceutical plant.

There are generally three phases of biopharmaceutical plants which coincide with the different levels of drug approval by the FDA. A Clinical Phase I/II biopharmaceutical plant produces enough biopharmaceutical product to support both phase I and phase II clinical testing of the product which may involve up to a few hundred patients. A Clinical Phase III biopharmaceutical plant produces enough biopharmaceutical product to support two to three-thousand patients during phase III clinical testing. A Clinical Phase III plant will also produce enough of the biopharmaceutical drug to support an initial commercial offering upon the licensing of the drug by the FDA for commercial sale. The successive phases represent successively larger biopharmaceutical facilities to support full scale commercial production after product licensing. Often the production process design is repeated for each phase, resulting in increased costs to each phase of plant development.

The design, architecture and engineering of biopharmaceutical plants is a several hundred million dollars a year industry because of the complex nature of biopharmaceutical production. Design of biopharmaceutical plants occurs in discrete phases. The first phase is the conceptual design phase. The first step in the conceptual design phase is identifying the high-level steps of the process that will produce the desired biopharmaceutical. Examples of high-level steps are synthesis, separation, purification and conditioning. After the high-level process steps have been identified, the unit operations associated with each of the high-level steps are identified. Unit operations are discrete process steps that make up the high-level process steps. In a microbial fermentation process, for example, the high-level step of synthesis may include the unit operations of inoculum preparation, flask growth, seed fermentation and production fermentation.

The unit operation level production process is typically designed by hand and is prone to errors and inefficiencies. Often, in the conceptual design phase, the specifications for the final production process are not complete. Therefore some of the equipment design parameters, unit operation yields and actual production rates for the various unit operations must be estimated. These factors introduce errors into the initial design base of the production process. Additionally, since the production process is designed by hand, attempting to optimize the process for efficiency and production of biopharmaceutical products is impractically time consuming.

Scale calculations for each of the unit operations are performed to determine the size and capacity of the equipment necessary to produce the desired amount of product per batch. Included in the scale calculations is the number of batches per year needed to produce the required amount of biopharmaceutical product. A batch is a single run of the biopharmaceutical process that produces the product. Increasing the size and capacity of the equipment increases the amount of product produced per batch. The batch cycle time is the amount of time required to produce one batch of product. The amount of product produced in a given amount of time, therefore, is dependent upon the amount produced per batch, and the batch cycle time. The scale calculations are usually executed by hand to determine the size and capacity of the equipment that will be required in each of the unit operations. Since the scale calculations are developed from the original conceptual design parameters, they are also subject to the same errors inherent in the initial conceptual design base.

Typically a process flow diagram is generated after the scale calculations for the unit operations have been performed. The process flow diagram graphically illustrates the process equipment such as tanks and pumps necessary to accommodate the process for a given batch scale. The process flow diagram illustrates the different streams of product and materials through the different unit operations. Generally associated with the process flow diagram is a material balance table which shows the quantities of materials consumed and produced in each step of the biopharmaceutical production process. The material balance table typically includes rate information of consumption of raw materials and production of product. The process flow diagram and material balance table provides much of the information necessary to develop a preliminary equipment list. The preliminary equipment list shows the equipment necessary to carry out all of the unit operations in the manufacturing procedure. Since the process flow diagram, material balance table and preliminary equipment list are determined from the original conceptual design parameters, they are subject to the same errors inherent in the initial conceptual design base.

A preliminary facility layout for the plant is developed from the process flow diagram, material balance table and preliminary equipment list. The preliminary facility layout usually begins with a bubble or block diagram of the plant that illustrates the adjacencies of rooms housing different high-level steps, as well as a space program which dimensions out the space and square footage of the building. From this information a preliminary equipment layout for the plant is prepared. The preliminary equipment layout attempts to show all the rooms in the plant, including corridors, staircases, etc. Mechanical, electrical and plumbing engineers estimate the mechanical, electrical and plumbing needs of the facility based on the facility design layout and the utility requirements of the manufacturing equipment. Since the preliminary facility layout is developed from the original conceptual design parameters, they are subject to the same errors inherent in the initial conceptual design base.

Typically the next phase of biopharmaceutical plant design is preliminary piping and instrumentation diagram (P&ID) design. Preliminary P&IDs are based on the process flow diagram from the conceptual design phase. Often the calculations on the process design are re-run and incorporated into the preliminary P&ID. The preliminary P&IDs incorporate the information from the material balance table with the preliminary equipment list to show the basic piping and instrumentation required to run the manufacturing process.

Detailed design is the next phase of biopharmaceutical plant design. Plans and specifications which allow vendors and contractors to bid on portions of the biopharmaceutical plant are developed during the detailed design. Detailed P&IDs are developed which schematically represent every detail of the process systems for the biopharmaceutical plant. The detailed P&IDs include for example, the size and components of process piping, mechanical, electrical and plumbing systems; all tanks, instrumentation, controls and hardware. A bill of materials and detailed specification sheets on all of the equipment and systems are developed from the P&IDs. Detailed facility architecture diagrams are developed that coincide with the detailed P&IDs and equipment specifications. The detailed P&IDs and facility construction diagrams allow builders and engineering companies to bid on the biopharmaceutical plant project. Since the preliminary and detailed P&IDs are developed from the original conceptual design parameters, they are subject to the same errors inherent in the initial conceptual design base. Reworking the preliminary and detailed P&IDs due to errors in the conceptual design phase can cost thousands of dollars per diagram.

The inability to accurately model and simulate the biopharmaceutical production process drives inaccurate initial design. Often, these inaccuracies result in changes to the design and construction diagrams at the plant construction site, or repair and reconstruction of the plant during the construction phase resulting in millions of dollars in additional cost.

What is needed, therefore, is a system and method for accurately simulating and modeling a biopharmaceutical production process. A method and system for simulating and modeling biopharmaceutical production process would allow designers to reduce the number of errors introduced into plant design at the earliest stages. Such a system and method would allow an engineer to validate the production process design and maximize the efficiency of the plant by finding the optimum equipment configurations. Such a system and method would generate detailed specifications for the equipment and process steps that would smooth the transition throughout all of the design phases and fix the cost of design and construction of a biopharmaceutical facility. The present invention can also be used for determining the cost of goods for a product.

SUMMARY OF THE INVENTION

The present invention satisfies the above-stated needs by providing a method and system for simulating and scheduling a batch biopharmaceutical production process. The system and method includes the steps of identifying a production process sequence, the production process sequence including a plurality of subprocesses. At least one of the plurality of subprocesses includes a plurality of batch cycles, each of which includes a plurality of unit operations. Each of the unit operations are identified by unit operation identifiers. Next, the system and method retrieves the process parameter information from a master list for each of the unit operation identifiers in the process sequence. The process parameter information includes information on discrete tasks associated with each unit operation. After the steps of identifying and retrieving, the system and method generates a process schedule that identifies initiation and completion times for each of the discrete tasks in the process sequence.

BRIEF DESCRIPTION OF THE FIGURES

FIG. 2 illustrates a flow diagram of the process for determining the necessary reactor volume according to the present invention.

FIG. 3 illustrates a unit operation list for a microbial fermentation process.

FIG. 4 illustrates a unit operation list for a mammalian cell culture process.

FIG. 6 illustrates an exemplary process parameters table.

FIGS. 10–11 illustrate a high-level process time line according to the present invention.

FIGS. 12A–12H illustrate a detailed process time line according to the present invention.

FIGS. 14–20 are detailed examples of a process parameters table showing a list of unit operations and their associated parameters.

DETAILED DESCRIPTION OF THE PREFERRED EMBODIMENTS

The preferred embodiment of the present invention is a computer based system and method for the simulation and modeling of batch process manufacturing facilities. The preferred embodiment is based on a method for generating scheduling information which accurately defines the complex manufacturing operations of batch manufacturing processes. This scheduling capability system allows the definition of manufacturing costs in a more detailed and accurate manner than previously possible. As a result, this invention allows the rapid and accurate evaluation of numerous batch manufacturing alternatives in order to arrive at an optimal process design early in a facility development project. In so doing the invention minimizes project cost over runs which result from inaccuracies that can carry forward from the early stages of design into construction. The invention also defines operations scheduling in a manner that improves the accuracy of material resource planning and preventative maintenance programs for operating manufacturing plants.

Figure 1:
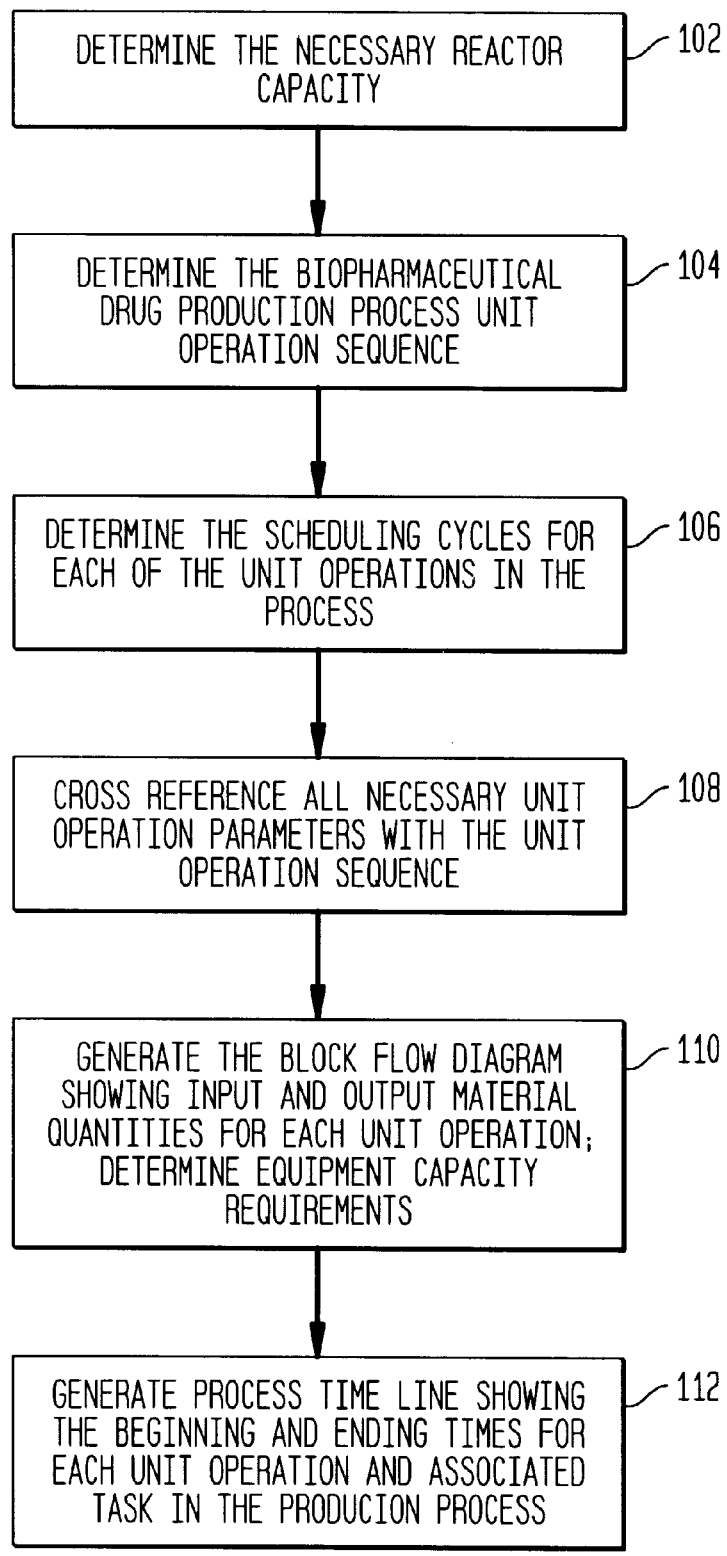
FIG. 1 illustrates a flow diagram of the process to generate a block flow diagram and a process time line according to the present invention.

FIG. 1 illustrates a high-level flow diagram of the preferred embodiment. The process begins by determining the necessary reactor vessel capacity at step 102. The reactor vessel is the container in which the crude product is first synthesized. For example, in mammalian cell culture processes, the reactor vessel houses the mammalian cells suspended in growth media. Next, the unit operation sequence for production of the biopharmaceutical product is determined at step 104. The unit operation sequence is the series of unit operations that are required to produce the biopharmaceutical product. Each unit operation is an individual step in the biopharmaceutical manufacturing process with an associated set of manufacturing equipment. The unit operation list is the list of unit operations that make up the unit operation sequence and their associated sequence information. The unit operation sequence information is the information that defines the scheduling cycles for each of the unit operations in the unit operation list. Scheduling cycles are iterations of unit operations in the unit operation sequence. Together, the unit operation list and the unit operation sequence information define the unit operation sequence. The desired biopharmaceutical product dictates the particular unit operations and their order in the biopharmaceutical production process. Some examples of unit operations are: inoculum preparation, initial seeding of the reactor vessel, solids harvest by centrifugation, high-pressure homogenization, dilution, etc.

Scheduling cycles and cycle offset duration for each of the unit operations in the biopharmaceutical production process are determined at step 106. Scheduling cycles are iterations (the default being one (1)) of unit operations in the unit operation sequence, and occur in three levels. Additionally, each level of scheduling cycle has an associated offset duration that dictates the time period between the beginnings of successive scheduling cycles.

"Cycles per unit operation" is the first level of scheduling cycles. Cycles per unit operation are defined as the number of iterations a unit operation is repeated in a process by itself before proceeding to the next unit operation. For example, the harvest and feed unit operation in a mammalian cell culture process has multiple cycles per unit operation. Product-rich media is drawn from the reactor vessel and nutrient-rich media is fed into the reactor vessel multiple times during one harvest and feed unit operation. The multiple draws of product-rich reactor media are pooled for processing in the next unit operation.

The second level of scheduling cycles is "cycles per batch." Cycles per batch are defined as the number of iterations a set of consecutive unit operations are repeated as a group before proceeding to the next unit operation after the set of consecutive unit operations. The set of consecutive unit operations repeated as a group are also referred to as a subprocess. For example, the set of unit operations including inoculum preparation, flask growth, seed fermentation, production fermentation, heat exchange, and continuous centrifugation/whole-cell harvest in a microbial fermentation process are often cycled together. Running through each of the six steps results in a single harvest from the microbial fermentation reactor vessel. Multiple harvests from a reactor vessel. may be needed to achieve a batch of sufficient quantity. Each additional harvest is pooled with the previous harvest, resulting in a single batch of cell culture for the process.

The third level of scheduling cycles is "cycles per process." Cycles per process are defined as the number of iterations a batch cycle is repeated for a process that employs continuous or semi-continuous product synthesis. In such a case, a single biopharmaceutical production process may result in multiple batches of product. For example, in a mammalian cell-culture process a single cell culture is typically in continuous production for 60–90 days. During this period multiple harvests of crude product are collected and pooled on a batch basis to be processed into the end product biopharmaceutical. The pooling of multiple harvests into a batch of material will occur several times during the cell culture period resulting in multiple batch cycles per process.

In step 108, a process parameters table master list is referenced to obtain all operational parameters for each unit operation in the unit operation list. The process parameters table contains a list of all unit operations and operational parameters necessary to simulate a particular unit operation. Examples of operational parameters are the solutions involved in a particular unit operation, temperature, pressure, duration, agitation, scaling volume, etc. Additionally, the process parameters table supplies all of the individual tasks and task durations involved in a particular unit operation. For example, the unit operation of inoculum preparation includes the individual tasks of setup, preincubation, incubation, and cleanup. Examples of unit operations for biopharmaceutical manufacturing and their associated operational parameters are shown in this application as FIGS. 14–20.

A block flow diagram is generated at step 110 after unit operation list has obtained the operational parameters from the process parameters table at step 108. The block flow diagram illustrates each unit operation in the manufacturing process as a block with inputs for both incoming product and new material, as well as outputs for both processed product and waste. The block flow diagram is a simple yet convenient tool for quantifying material flows through the process in a way that allows the sizing of many key pieces of equipment relative to a given process scale.

The information in each block of the block flow diagram is generated from the parameters and sizing ratios from the process parameters table in the unit operation list, and block flow diagram calculation sets. A calculation set is a set of algebraic equations. The parameters and calculation sets are used to calculate the quantities of material inputs, product and waste outputs required for that unit operation based on the quantity of product material being received from the previous unit operation. Likewise, a given block flow diagram block calculates the quantity of product to be transferred to the next unit operation block in the manufacturing procedure. These calculations take into account the unit operation scheduling cycles identified at step 106, as further explained below.

A process time line is generated at step 112 after the block flow diagram is generated at step 110. The process time line is a very useful feature of the present invention. The process time line is generated from the unit operation list, the tasks associated with each of the unit operations, the scheduling cycles for each of the unit operations in the process, the process parameters from the master process parameters table and the volume of the material as calculated from the block flow diagram. The process time line is a relative time line in hours and minutes from the start date of the production process. The relative time is converted into days and hours to provide a time line for the beginning and ending times of each unit operation and its associated tasks for the entire biopharmaceutical drug production process.

The process time line is a very powerful tool for process design. The process time line can be used to accurately size pumps, filters and heat exchangers used in unit operations, by calculating the flow rate from the known transfer time and the volume of the material to be transferred, filtered or cooled. The process timeline accurately predicts loads for labor, solution preparation, equipment cleaning, reagent, process utilities, preventative maintenance, quality control testing, etc.

FIG. 2 further illustrates step 102 of determining the necessary reactor vessel capacity. The amount of biopharmaceutical product to be produced in a given amount of time is determined in step 202. Normally, the amount of biopharmaceutical product required is expressed in terms of mass produced per year. The number of reactor vessel runs for a particular biopharmaceutical product per year is determined at step 204. Factors considered when determining the number of reactor vessel cycles for a particular biopharmaceutical product are, for example, the number of biopharmaceutical products produced in the reactor vessel (i.e., the reactor vessel is shared to produce different products), the reaction time for each cycle of the reactor vessel and the percentage of up-time for the reactor vessel over the year.

The yield of each batch or reactor cycle is calculated at step 206. The yield from each batch or a reactor cycle is process-dependent and is usually expressed in grams of crude product per liter of broth. Given the required amount of biopharmaceutical product per year from step 202, the number of reactor cycles available to produce the required biopharmaceutical product from step 204, and the yield of each reactor cycle from step 206, the necessary reactor volume to produce the required amount of biopharmaceutical product is calculated at step 208.

FIG. 3 illustrates a unit operation list for an exemplary microbial fermentation biopharmaceutical production process. The far left-hand column, column 302, lists the unit operation sequence numbers for each of the unit operations in the process. The exemplary microbial fermentation unit operation list includes 23 unit operations. The unit operation sequence number defines the order in which the unit operations occur. For example, unit operation sequence number 1, inoculum preparation, occurs first, before unit operation sequence number 2, flask growth. Column 304 shows the unit operation identifier codes associated with each of the unit operations in the unit operation list (see step 108). The unit operation identifier codes are used to bring operational parameters from the process parameters table into the unit operation list. For example, heat exchange, unit operation list numbers 5, 8 and 10, has a unit operation identifier code 51.

As described above with reference to FIG. 1, after the unit operation sequence for a particular biopharmaceutical production process has been determined at step 104, the scheduling cycles associated with each unit operation is determined at step 106. Columns 306, 310 and 318 list the number of scheduling cycles for the microbial fermentation process of FIG. 3. Scheduling cycles are iterations of unit operations in the unit operation sequence, and occur in three levels. Additionally, each level of scheduling cycle has an associated offset duration that dictates the time period between the beginnings of successive scheduling cycles, shown in columns 308, 316 and 324. The latter two levels of scheduling cycles have an associated unit operation starting point and unit operation end point. This is, Columns 312 and 314 specify the start and end unit operations, respectively, for cycles per batch, and Columns 320 and 322 specify the start and end unit operations, respectively, for cycles per process.

Column 306 lists the number of cycles per unit operation for each of the unit operations in the microbial fermentation unit operation sequence. In the exemplary microbial fermentation unit operation sequence, each of the unit operations has only one cycle per unit operation. Again, cycles per unit operation define the number of iterations a unit operation is repeated in a process by itself before proceeding to the next unit operation.

Column 308 lists the cycle offset duration in hours for the cycles per unit operation. Since each of the unit operations in the microbial fermentation example of FIG. 3 has only one cycle per unit operation, there is no cycle offset duration for any of the unit operations. Cycle offset duration defines the time period between the beginnings of successive scheduling cycles.

Column 310 lists the cycles per batch for each of the unit operations in the microbial fermentation unit operation sequence. Unit operation sequence numbers 1–6 are defined as having three cycles per batch. Cycles per batch defines the number of iterations a set of consecutive unit operations are repeated as a group before proceeding to the next unit operation. In FIG. 3, for example, the set of unit operations 1–6, as defined in unit operation start column 312 and unit operation end column 314, cycle together as a group (e.g., the sequence of unit operations for the exemplary microbial fermentation process is 1, 2, 3, 4, 5, 6, 1, 2, 3, 4, 5, 6, 1, 2, 3, 4, 5, 6 and 7). Unit operations 1–6 cycle together as a group three times before the process continues to unit operation 7, as defined in column 310.

After unit operation sequence numbers 1–6 have cycled consecutively three times, the microbial fermentation production process continues at unit operation sequence number 7, resuspension of cell paste. After unit operation sequence number 7, the process continues with three cycles per batch of unit operation sequence numbers 8–10. The unit operations of heat exchange, cell disruption, and heat exchange are cycled consecutively three times, as defined in columns 310, 312 and 314. After unit operation sequence numbers 8–10 have cycled three times, the microbial fermentation production process continues at resuspension/surfactant, unit operation sequence number 11.

Unit operation sequence numbers 11 and 12 cycle together two times, as defined by columns 310, 312 and 314. After unit operation sequence numbers 11 and 12 have been cycled two times the microbial fermentation production process continues without cycling from unit operation sequence number 13 through unit operation sequence number 23 to conclude the microbial fermentation production process.

Columns 326–332 of FIG. 3 represent the step wise recover (SWR) and overall recovery (OAR) percentages of the product and total proteins. SWR is the recovery of protein for the individual unit operation for which it is listed. OAR is the recovery of protein for the overall process up to and including the unit operation for which it is listed. The product recovery columns represent the recovery of the desired product protein from the solution in the process. The protein recovery columns represent the recovery of contaminant proteins from the solution which result in higher purity of the product solution.

FIG. 4 illustrates a unit operation list for an exemplary mammalian cell culture production process. Column 402 lists unit operation sequence numbers 1–19. Unit operation sequence numbers 1–19 define the order in which the unit operations of the mammalian cell culture production process occur. The most notable differences between the microbial fermentation process of FIG. 3 and the mammalian cell culture process of FIG. 4 are the multiple cycles per unit operation of unit operation sequence number 8 and the multiple cycles per process of unit operation sequence numbers 8–18.

Unit operation sequence number 8 of FIG. 4 illustrates the concept of multiple cycles per unit operation. Unit operation sequence number 8 is the unit operation of harvesting product rich growth media from and feeding fresh growth media into the mammalian cell reactor vessel. In most mammalian cell culture processes the product is secreted by the cells into the surrounding growth media in the reactor vessel. To harvest the product, some of the product rich growth media is harvested from the reactor vessel to be processed to remove the product, and an equal amount of fresh growth media is fed into the reactor vessel to sustain production in the reactor vessel. The process of harvesting and feeding the reactor vessel can continue for many weeks for a single biopharmaceutical production process. Unit operation sequence number 8 is repeated seven times, or 7 cycles per unit operation (e.g., the unit operation sequence is 7, 8, 8, 8, 8, 8, 8, 8, 9). Note that the offset duration for unit operation sequence number 8 is 24 hours. The offset duration defines the time period between the cycles per unit operation. In the example of FIG. 4, unit operation sequence number 8 is repeated 7 times (7 cycles per unit operation) and each cycle is separated from the next by 24 hours, or one day. This corresponds to unit operation sequence number 8 having a duration of one week, with a harvest/feed step occurring each day.

FIG. 4 also illustrates the feature of multiple cycles per process. Cycles per process is defined as the number of iterations a batch cycle is repeated in a given process that employs continuous or semi-continuous product synthesis. Each batch cycle results in a batch of product. A single biopharmaceutical production process, therefore, may result in multiple batches of product. In the mammalian cell culture process example of FIG. 4, unit operation sequence numbers 8–18 are repeated together as a group eight times (column 418). Each of these cycles of unit operation sequence numbers 8–18 produce one batch of product (columns 420–422). The offset between each cycle of unit operation sequence numbers 8–18 is 168 hours, or one week (column 424).

In the example of FIG. 4, unit operation sequence numbers 8–18 proceed as follows: the reactor vessel is harvested and fed once each day for seven days; the results of the harvest/feed operation are pooled in unit operation sequence number 9 at the end of the seven days; unit operations 9–18 are then executed to process the pooled harvested growth media from unit operation sequence number 8. Unit operation sequence numbers 8–18 are cycled sequentially once each week to process an additional seven day batch of harvested growth media from unit operation sequence number 8. At the end of eight weeks, the mammalian cell culture process is completed.

Figure 5:
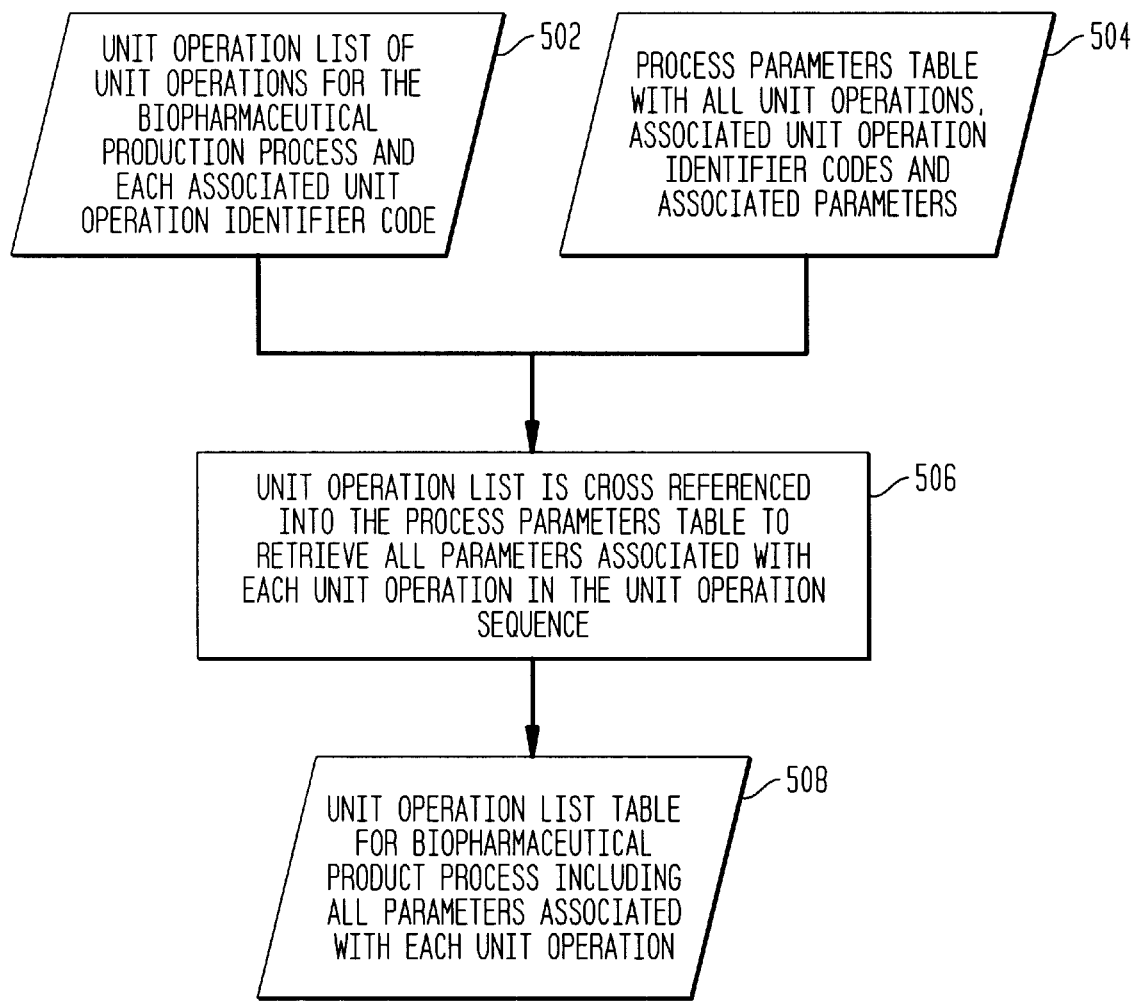
FIG. 5 illustrates a flow diagram for cross-referencing a unit operation list with a process parameters table according to the present invention.

FIG. 5 further illustrates step 108, cross referencing the unit operation sequence with the master process parameters table. The operational parameters in the process parameters table are those parameters necessary to simulate a particular unit operation. The parameters from the process parameters table define the key operational parameters and equipment sizing ratios for each unit operation in the unit operation sequence. The values for these parameters and ratios are variables which can be easily manipulated and ordered to model and evaluate alternative design scenarios for a given process scale. Examples of the process parameters associated with each unit operation are listed in FIGS. 14–20. It should be noted, however, that the list of unit operations, parameters, values, and scaling ratios is not exhaustive. One of ordinary skill in the art could expand the process parameters table to encompass additional unit operations and production processes for other batch process industries such as chemical pharmaceutical, specialty chemical, food, beverage, and cosmetics. Such expansion would allow the present invention to simulate and schedule additional batch production processes for other such batch processes.

FIG. 5 illustrates the files necessary to cross-reference the unit operation list with the process parameters table in step 108. Exemplary unit operation list 502 for the biopharmaceutical production process and process parameters table 504 are input into processing step 506. Step 506 cross-references the unit operation list and process parameters table based on unit operation identification code (see FIG. 3). The parameters are copied from the process parameters table 504 into the unit operation list 502 to generate unit operation list 508.

Figure 7:
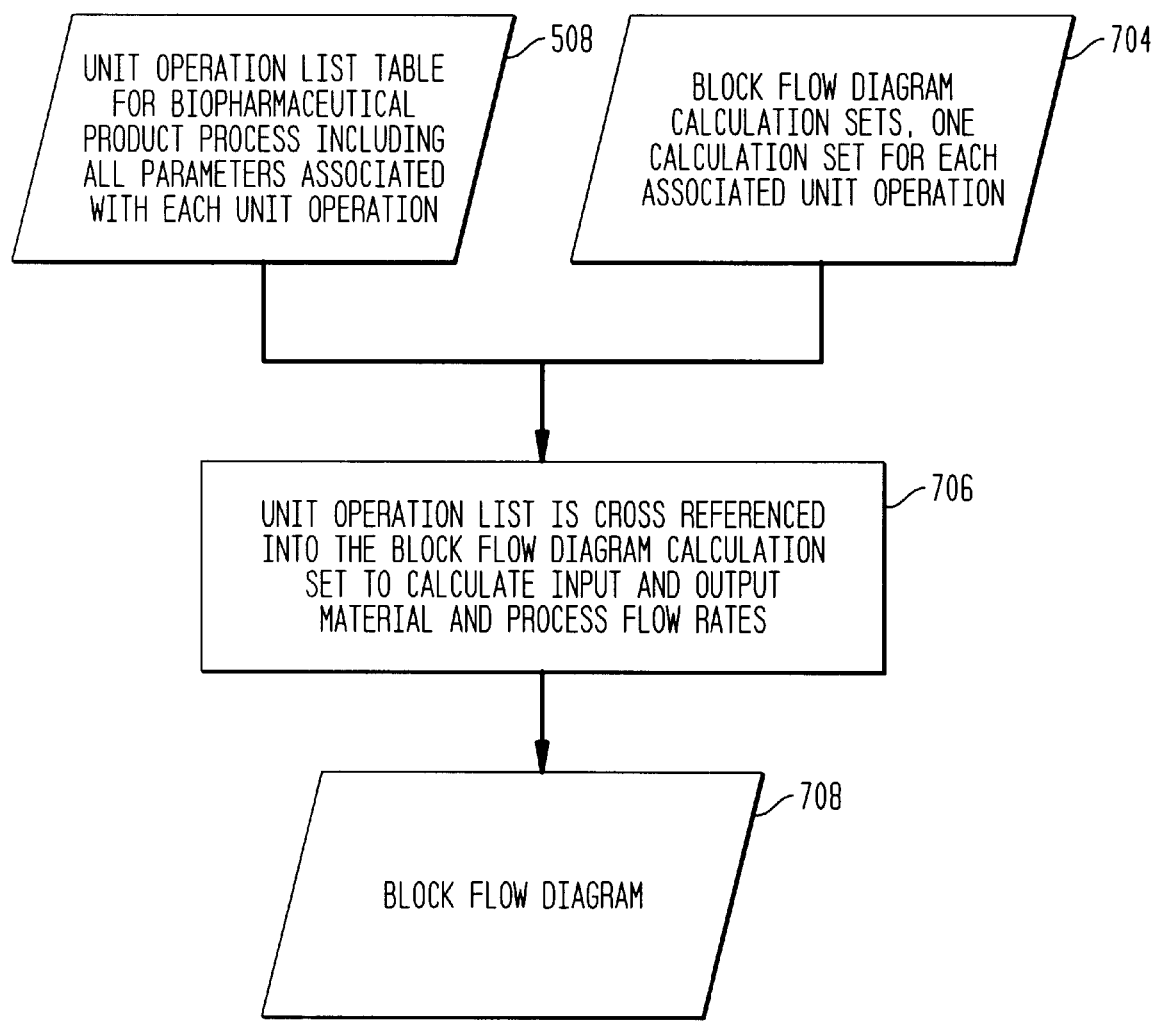
FIG. 7 illustrates the process for generating a block flow diagram according to the present invention.

FIG. 6 further illustrates exemplary process parameters table, 504. The operational parameters in the process parameters table are those parameters necessary to simulate a particular unit operation. The unit operation identification codes of process parameters table 504 are used in the cross-reference step 506 to assign the parameters from the process parameters table 504 to the unit operation list 502. Examples of operational parameters are the solutions involved in a particular unit operation, temperature, pressure, duration, agitation, scaling volume, etc. Additionally, the process parameters table defines all of the individual tasks and task durations involved in each unit operation. It should be noted, however, one of ordinary skill in the art could expand the process parameters table to encompass additional unit operations and production processes for other batch process industries such as chemical pharmaceutical, specialty chemical, food, beverage, and cosmetics. Such expansion would allow the present invention to simulate and schedule additional batch production processes for other such batch processes FIG. 7 further illustrates step 110, generating a block flow diagram. A block flow diagram depicts each unit operation in the biopharmaceutical production process as a block with inputs for both incoming product and new material, as well as outputs for both processed product and waste. The material that flows through each of the unit operation blocks is quantified by calculation sets in each of the block flow diagram blocks. A unit operation block in a block flow diagram is a graphical representation of a unit operation. A calculation set is a set of algebraic equations describing a unit operation. Some examples of outputs of the calculation sets are: required process materials for that unit operation, equipment performance specifications and process data outputs to be used for the next unit operation. Some examples of inputs to the calculation sets are: product quantity (mass) or volume (liters) from a previous unit operation, other parameters and/or multipliers derived from the process parameters table, as well as the design cycles defined in the unit operation list.

Block flow diagram 708 is generated from unit operation list 508 and block flow diagram calculation set 704. Block flow diagram calculation set 704 is an exhaustive list of unit operation identifier codes and the calculation sets associated with each unit operation identifier. Unit operation list 508 and block flow diagram calculation set 704 are linked together based on unit operation identifier code.

Step 706 calculates the block flow diagram material flow requirements and basic equipment sizing requirements from unit operation list 508 which includes all of the associated operational parameters from the process parameters table, and the block flow diagram calculation set 704. Block flow diagram 708 allows the sizing of many key pieces of equipment relative to a given process scale. Since the material flow quantities into and out of each unit operation is determined at step 706, the capacity of many equipment items involved in each unit operation can be determined. The block flow diagram also manage important information in the determined. The block flow diagram also manages important information in the unit operation list 502 such as the percent recovery, percent purity and purification factor of the product in each unit operation. This information helps identify the steps in the process that may need optimization.

The following is an example calculation set for a tangential flow micro-filtration (TFMF) system unit operation. Tangential flow micro-filtration is an important process technology in biopharmaceutical manufacturing. This technology significantly extends the life of the filtration media and reduces the replacement cost of expensive filters.

TFMF generically requires the same steps to prepare the membrane for each use as well as for storage after use. The design parameters for each unit operation such as TFMF have been developed around these generic design requirements.

Generic Parameters (Variables) from the Process Parameters Table

| Equipment Design Type | Plate & Frame |
| Membrane Porosity | 0.2 micron |
| Membrane Flux rate | 125 Liters/square meter/hour |
| Process Time | 2 Hours |
| Retentate/Filtrate Rate | 20 to 1 |
| Flush volume | 21.5 Liters/square meter |

-continued

| Prime volume | 21.5 Liters/square meter |
| Wash Volume | 0.5% of Process Volume |
| Regenerate Volume | 10.8 Liters/square meter |
| Storage Volume | 21.5 Liters/square meter |
| % Recovery of Product | 95% |
| % Recovery of Total Protein | 80% |
| Clean In Place (CIP) | Yes |
| Steam In Place (CIP) | Yes |

Input Values from Previous Unit Operation

| Product Volume | 1,000 Liters |
| Product Quantity | 1.5 Kg |
| Total Protein Quantity | 3.0 Kg |

The calculation set for this unit operation first takes the incoming process volume and uses it as a basis of sizing the filtration membrane for the filtration system based on the above flux rate and required processing time.

1,000 Liters/125 L/SM/Hr/2 Hours=4.0 SM of 0.2 micron membrane

After calculating the square meter (SM) of membrane required by this unit operation, the volumes of each of the support solutions can be calculated based on the above volume ratios.

| Flush volume | 21.5 Liters/SM × 4.0 SM = 86 Liters |
| Prime volume | 21.5 Liters/SM × 4.0 SM = 86 Liters |
| Wash Volume | 5% of 1,000 Liters = 50 Liters |
| Regenerate | 21.5 Liters/SM × 4.0 SM = 86 Liters |
| Storage | 10.8 Liters/SM × 4.0 SM = 42 Liters |

The flow rate of the filtrate is calculated from the volume to be filtered and the required process time.

1,000 Liters/2 Hours=8.3 Liters/minute

The flow rate of the retentate is calculated based on the above retentate/filtrate ratio.

8.3 Liters per minute×20=167 Liters/minute

Based on the input of the process volume to this unit operation and the above parameters, the equipment size, the filtration apparatus, the retentate pump, the support linkage and associated systems can be designed.

In addition, the input values for the quantity of product and contaminant protein received from the previous unit operation together with the recovery factors listed in the parameters allow the calculation of the cumulative recovery of product through this step, as well the percent purity of the product and the product purification factor for this step. This information is helpful for identifying steps in the manufacturing process which require optimization.

Figure 8:
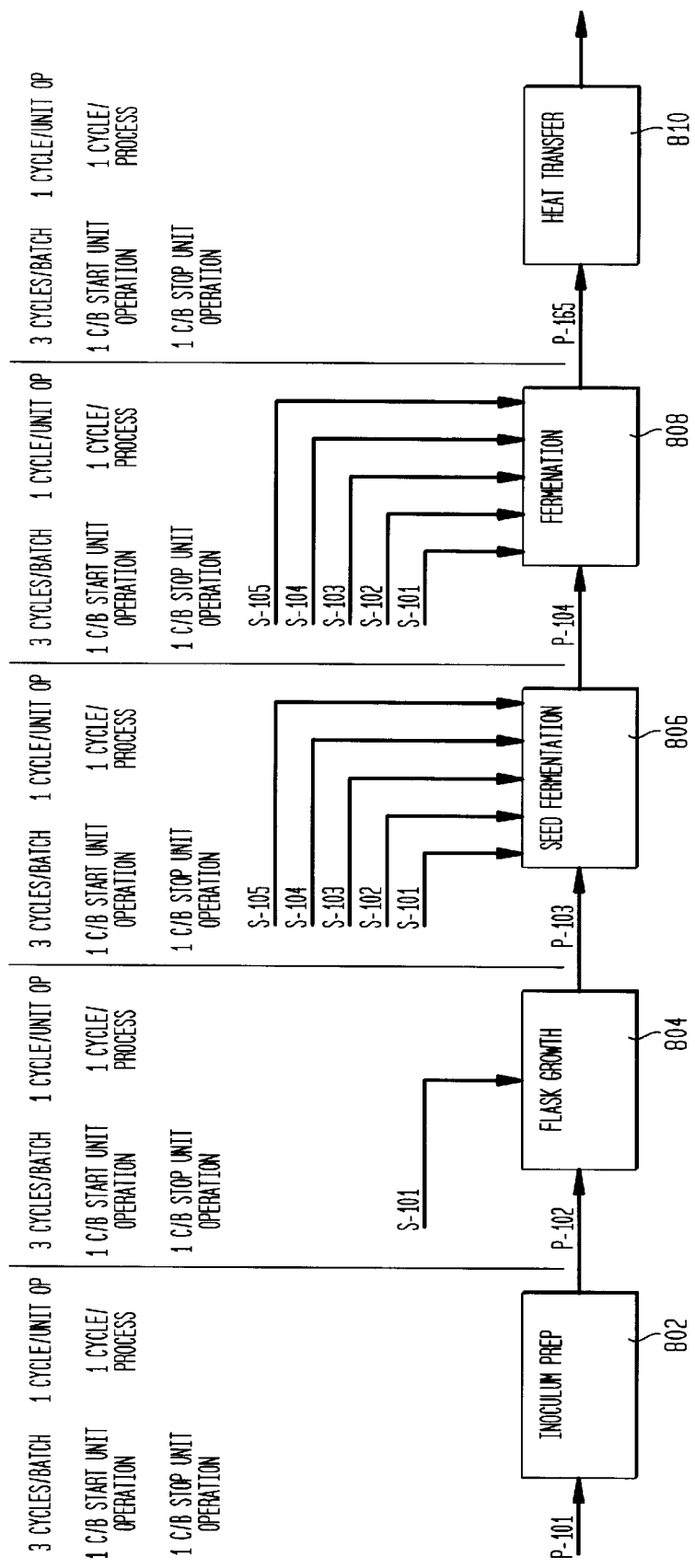
FIG. 8 illustrates an exemplary block flow diagram according to the present invention.

FIG. 8 illustrates an exemplary block flow diagram for the first five unit operations of the microbial fermentation process unit operation list of FIG. 3. Unit operations 1 through 5 are shown as blocks 802, 804, 806, 808 and 810. The input solutions to each of the steps are shown as arrows tagged with solution identifier information from the unit operation list 508. The process streams to which these solutions are added at each unit operation are also shown as arrows tagged with process stream identifier information. Working from the initial process stream characteristics (P-101) in unit operation 1, inoculum prep, the volumes of input materials (solutions) and subsequent process streams in each of the unit operations is determined using scale-up ratios which are included in the information from the unit operation list 508 for each respective unit operation. For example, the volume of solutions and process streams flowing into and out of each of unit operation blocks 802–810 in FIG. 8 is determined by the initial starting characteristics of the process stream P-101 and the volume of its associated input material S-101 in the first unit operation, block 802 and the scale up ratio in each of the successive unit operations, blocks 804–810. The solutions involved in each of unit operation blocks 802–810 are likewise part of the information for each respective unit operation in the unit operation list 508.

Figure 9:
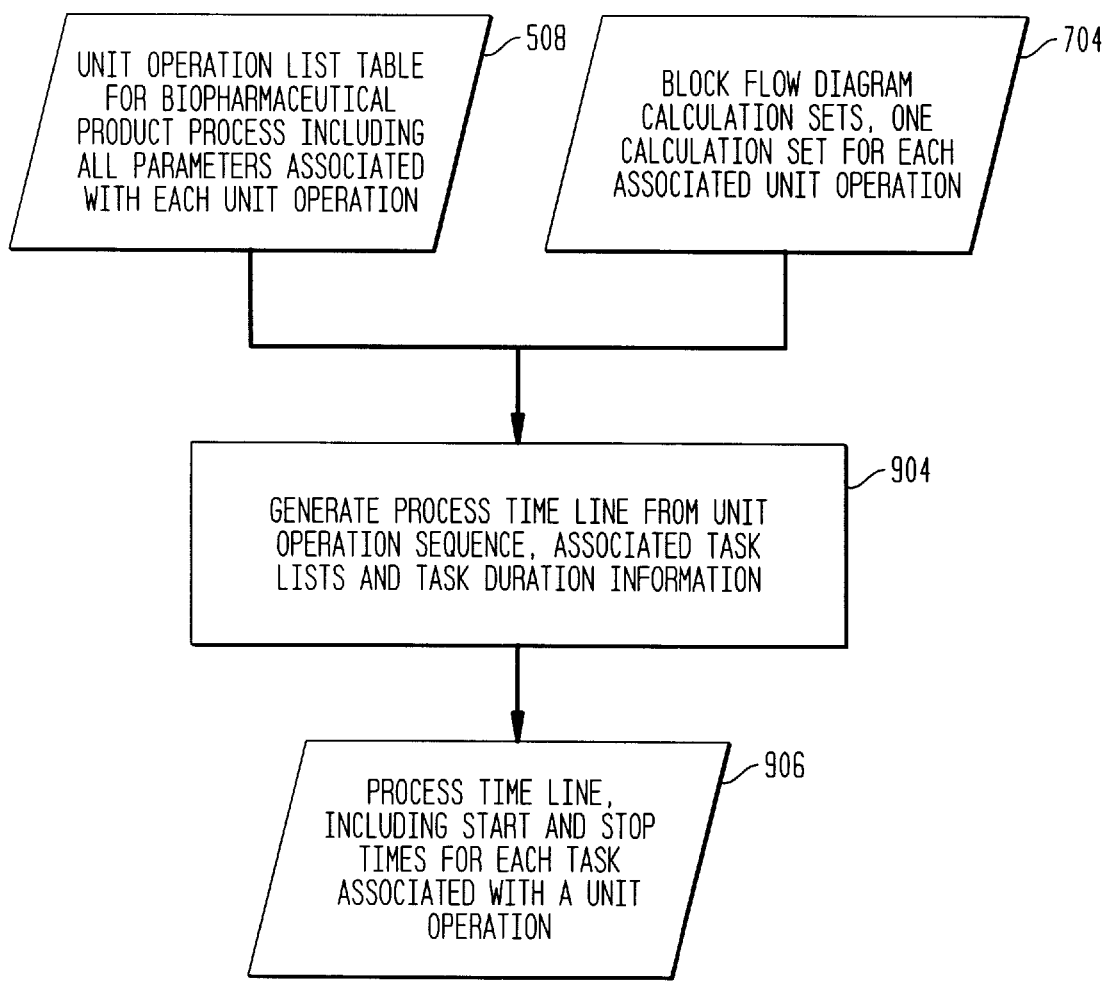
FIG. 9 illustrates a block flow diagram for the process of generating a process time line according to the present invention.

FIG. 9 further illustrates step 112, generating the process time line. The process time line is generated (steps 904 and 906) from unit operation list 508 and block flow diagram calculation set 704. Unit operation list 508 contains enough input information to generate a detailed process time line which includes the start and stop times for most of the tasks associated with each unit operation. The durations of some unit operation tasks are not scale dependent. The durations of other unit operation tasks are, however, scale dependent. In the latter case, as a process is scaled up, the amount of time required to complete a unit operation task increases. In such cases, where duration of a unit operation task is scale dependent, block flow diagram calculation set 704 is required to calculate the quantity of material handled by the unit operation task. After the quantity of material handled by a unit operation task is determined, its duration can be determined. Examples of scale dependent task durations are the time required to pump solutions from one storage tank to another, the amount of time required to heat or cool solutions in a heat exchanger, the amount of time required to filter product or contaminants from solution.

FIG. 10 is an example of a high-level process time line for a microbial fermentation process. The unit operation sequence of the process time line of FIG. 10 corresponds to the unit operation list of FIG. 3. The high-level process time line shown in FIG. 10 illustrates two process cycles of the microbial fermentation unit operation sequence, labeled "First Process Cycle" and "Second Process Cycle." A process cycle is a complete run of the biopharmaceutical production process, as defined by the unit operation sequence for the process.

The first two columns of the process time line of FIG. 10 identify the unit operation sequence number and unit operation description of the unit operation being performed, respectively. The first three sets of unit operations correspond to the three cycles per batch of unit operation sequence numbers 1–6 of FIG. 3. Three cycles of unit operations 1–6 are performed and the results are pooled into unit operation 7, pool harvests. The two columns to the right of the duration column identify the week and day that the particular unit operation is occurring in the first process cycle.

The day and the week each unit operation is performed is calculated from the start time of the process, as well as the cumulative duration of each of the previous unit operations. In the example of FIG. 10, Sunday is defined as the first day of the week. In the example of FIG. 10, the process sequence begins at unit operation 1, inoculum prep, on Friday of the first week. After unit operation 1 has completed (24 hours later, since unit operation 1 has a 24 hour duration) unit operation 2 is performed on Saturday. The begin and end times for each successive unit operation are calculated from the duration of the unit operation and end time of the previous unit operation. Note that FIG. 10 is calculated to the day and week only for the purposes of explanation. Usually the process time line is determined for each of the tasks associated with a unit operation to the minute.

As illustrated in FIG. 10, unit operation 7 occurs on Monday of the third week in the first process cycle. The third column from the left is the duration of each of the unit operations. After the three cycles of unit operations 1 through 6 have been pooled in unit operation 7, the process continues at unit operations 8 through 10, heat exchange, cell disruption and heat exchange. Each of unit operations 8 through 10 are cycled three times and the associated scheduling information is contained in column to the right of the unit operation duration. Since each cycle of unit operations 8 through 10 have a duration of 0.5 hours, as shown in column 3, each cycle occurs on Monday of the third week in the process.

FIG. 11 illustrates the final unit operations of the process time line for the microbial fermentation process. After 3 cycles of unit operations 8 through 10 have been completed, unit operation sequence numbers 11 and 12 cycle together two times on Monday, week 3 of the first process cycle. After unit operation sequence numbers 11 and 12 have been cycled twice, the microbial fermentation production process continues without cycling from unit operation sequence number 13 through unit operation sequence number 22 to conclude the microbial fermentation production process. The durations and associated start times are listed for each of the unit operations 13–22.

FIGS. 12A–12H illustrate the preferred embodiment of a detailed process time line. The unit operation sequence of the process time line of FIGS. 12A–12H correspond to the unit operation list of FIG. 3. The process time line of FIGS. 12A–12H illustrates a single process cycle of the microbial fermentation unit operation sequence. The individual tasks associated with each unit operation are included after the unit operation. For example, in FIG. 12A, unit operation 1A, inoculum prep, consists of the individual tasks of set up, preincubation, incubation, and clean up. Columns 11–14 show the start date and time and finish date and time for each of the tasks in each unit operation. Since setup and clean up are not part of the critical path of the process, they do not directly affect the start and end times of following unit operations. The start and finish date and times for the set up and clean up operations of each of the unit operations are valuable because they ensure that the equipment will be available for each unit operation if the process time line is followed.

The process time line of FIGS. 12A–12H includes examples of unit operation task duration calculations. Row 20, column 15 of FIG. 12A, which corresponds to the harvest task of unit operation 3A, seed fermentation, is an example of a duration calculation. As stated above, the duration of some unit operations is process scale dependent (i.e., the duration is dependent upon the volume processed). The harvest task in the seed fermentation unit operation is an example of a task whose duration is process scale dependent. In column 15, the calculations column, information listed for the harvest task is 50 liters, 1.7 liters/minute, and 0.5 hours. Fifty liters represents the volume of material that is harvested during a harvest task. 1.7 liters/minute (LPM) represents the rate at which the solution is harvested. Given the volume to be harvested and the flow rate of the harvest, the duration of the harvest task is calculated to be 0.5 hours. Each task in a unit operation that is volume dependent has its duration calculated in order to generate the process time line of FIGS. 12A–12H.

The process time line of FIGS. 12A–12H can be resolved to minutes and seconds, if necessary. The accuracy of the process time line allows the precise planning and scheduling of many aspects of the batch manufacturing process. The process time line scheduling information can be used to schedule manufacturing resources such as labor, reagents, reusables, disposables, etc., required directly by the manufacturing process. Pre-process support activities such as solution preparation, and equipment prep and sterilization, required to support the core process, including the labor, reagents, etc. can be scheduled, cost forecasted and provided for. Post-process support activities such as product formulation, aseptic fill, freeze drying, vial capping, vial labeling and packaging required to ship the purified product in a form ready for use may be added to the process time line and managed. Based on the process time line, labor, reagents, etc., required to support these post-process support functions can be acquired and managed. One of the most important aspects of the present invention is the determination of process utility loads such as USP Purified Water, Water For Injection, Pure Steam, etc., for all of the manufacturing equipment. The process time line can be used to determine the peak utility loading, and utility requirements for the facility. Building utility loads such as building steam, heating, ventilation, air conditioning, plumbing, etc., for all manufacturing equipment, process areas and facility equipment can be determined based on the process time line and the equipment associated with each of the unit operations. The process time line can be used to measure the time that the equipment has been in service to schedule preventative maintenance of all plant equipment, Quality Assurance activities including instrument calibration, automated batch documentation, etc. and Quality Control activities including process system maintenance, raw material testing, in process testing and final product testing, etc.

Figure 13:
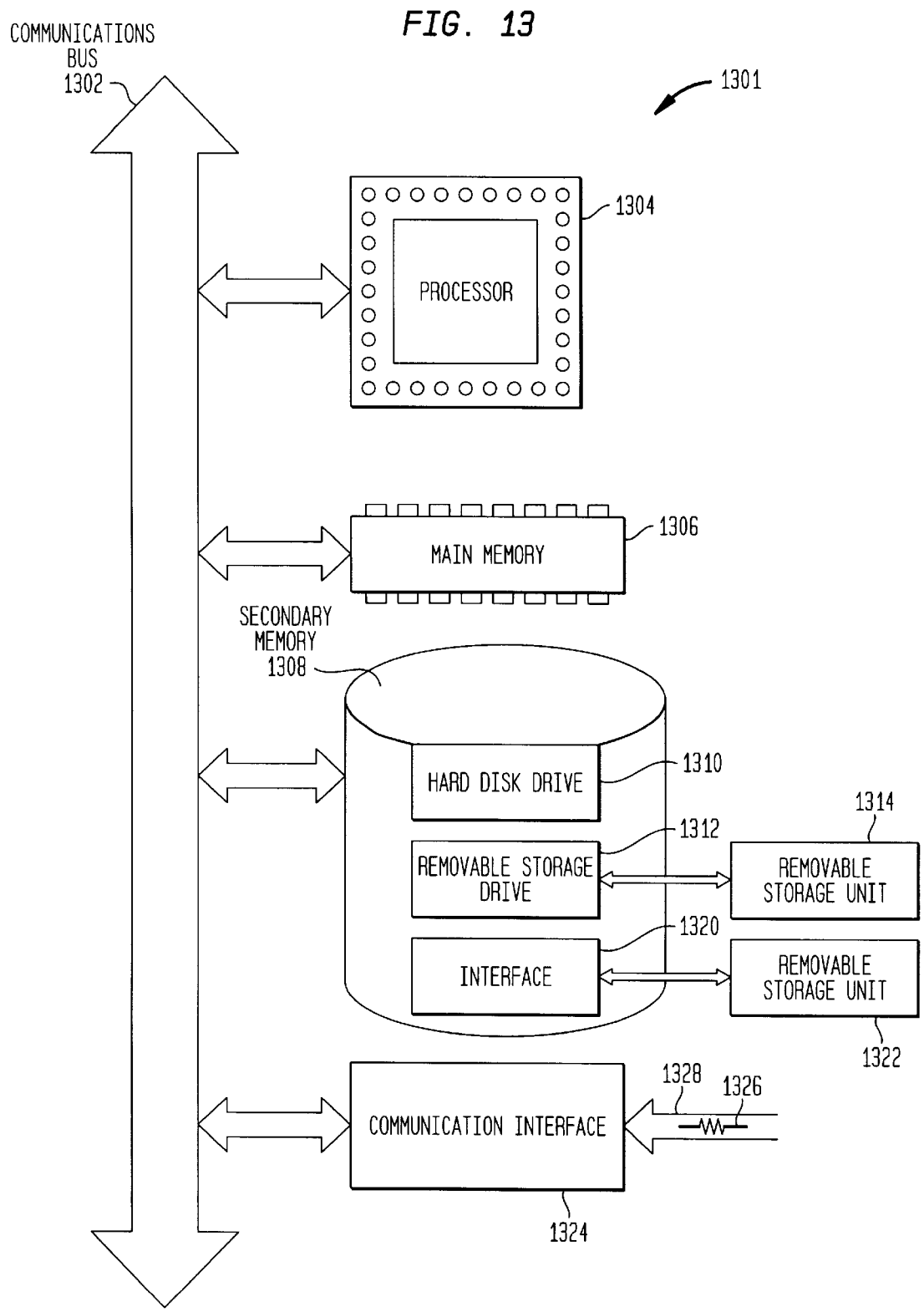
FIG. 13 illustrates an exemplary computer according to an embodiment of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 1301 is shown in FIG. 13. The computer system 1301 includes one or more processors, such as processor 1304. The processor 1304 is connected to a communication bus 1302. Various software embodiments are described in terms of this example computer system. After reading this description, it will become apparent to a person skilled in the relevant art how to implement the invention using other computer systems and/or computer architectures.

Computer system 1302 also includes a main memory 1306, preferably random access memory (RAM), and can also include a secondary memory 1308. The secondary memory 1308 can include, for example, a hard disk drive 1310 and/or a removable storage drive 1312, representing a floppy disk drive, a magnetic tape drive, an optical disk drive, etc. The removable storage drive 1312 reads from and/or writes to a removable storage unit 1314 in a well known manner. Removable storage unit 1314, represents a floppy disk, magnetic tape, optical disk, etc. which is read by and written to by removable storage drive 1312. As will be appreciated, the removable storage unit 1314 includes a computer usable storage medium having stored therein computer software and/or data.

In alternative embodiments, secondary memory 1308 may include other similar means for allowing computer programs or other instructions to be loaded into computer system 1301. Such means can include, for example, a removable storage unit 1322 and an interface 1320. Examples of such can include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1301.

Computer system 1301 can also include a communications interface 1324. Communications interface 1324 allows software and data to be transferred between computer system 1301 and external devices. Examples of communications interface 1324 can include a modem, a network interface (such as an Ethernet card), a communications port, a PCMCIA slot and card, etc. Software and data transferred via communications interface 1324 are in the form of signals which can be electronic, electromagnetic, optical or other signals capable of being received by communications interface 1324. These signals 1326 are provided to communications interface via a channel 1328. This channel 1328 carries signals 1326 and can be implemented using wire or cable, fiber optics, a phone line, a cellular phone link, an RF link and other communications channels.

An this document, the terms "computer program medium" and "computer usable medium" are used to generally refer to media such as removable storage device 1312, a hard disk installed in hard disk drive 1310, and signals 1326. These computer program products are means for providing software to computer system 1301.

Computer programs (also called computer control logic) are stored in main memory and/or secondary memory 1308. Computer programs can also be received via communications interface 1324. Such computer programs, when executed, enable the computer system 1301 to perform the features of the present invention as discussed herein. In particular, the computer programs, when executed, enable the processor 1304 to perform the features of the present invention. Accordingly, such computer programs represent controllers of the computer system 1301.

In an embodiment where the invention is implemented using software, the software may be stored in a computer program product and loaded into computer system 1301 using removable storage drive 1312, hard drive 1310 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While the invention has been particularly shown and described with reference to preferred embodiments thereof, it will be understood by those skilled in the relevant art that various changes in form and details may be made therein without departing from the spirit and scope of the invention.

What is claimed is:

1. A method for scheduling a batch production process, comprising the steps of:
   (1) identifying a production process sequence, said production process sequence including a plurality of unit operations, each of said unit operations being identified by unit operation identifiers; wherein a cycles-per-unit-operation value is selected for each of said plurality of unit operations;
   (2) retrieving process parameter information from a master list for each of said unit operation identifiers in said production process sequence, said process parameter information including information on discrete tasks associated with each of said unit operations; and (3) generating a process schedule, based upon said cycles-per-unit-operation values, that identifies initiation and completion times for each of said discrete tasks for each unit operation in said production process sequence.

2. The method of claim 1, wherein said batch production process is a biopharmaceutical batch production process.

3. A method for simulating and modeling a batch processing manufacturing facility, comprising the steps of:

(1) selecting a sequence of unit operations wherein each of said sequence of unit operations has an identifier code;

(2) selecting a set of scheduling cycles for each of said sequence of unit operations;

(3) referencing a master table using said identifier code to obtain operational parameters for each of said sequence of unit operations;

(4) generating a block flow diagram using said sequence of unit operations and said operational parameters; and (5) generating a process time line using said operational parameters, said block flow diagrams, said set of scheduling cycles for each of said sequence of unit operations, wherein said process time line is used as a tool for batch processing and facility design.

4. The method of claim 1, wherein the batch process manufacturing facility is a biopharmaceutical batch processing facility.

5. The method of claim 3, wherein step (2) comprises the steps of:

(a) selecting a cycles-per-unit-operation value for each of said sequence of unit operations;

(b) selecting a cycles-per-batch value for a first set of at least two of said sequence of unit operations; and (c) selecting a cycles-per-process value for a second set of at least two of said sequence of unit operations.

6. The method of claim 5, wherein said first set and said second set are the same.

7. The method of claim 5, wherein step (2) further comprises the step of:

specifying an offset for each of said cycles-per-unit operation, said cycles-per-batch, and said cycles-per-process.

8. The method of claim 3, wherein step (4) comprises the steps of:

(a) using said identifier code to access a calculation set list for each of said sequence of unit operations;

(b) linking a calculation set from said calculation set list for each of said sequence of unit operations; and (c) calculating material flow and equipment sizing requirements for each of said sequence of unit operations using said operational parameters.

9. A system for simulating and modeling a batch processing manufacturing facility, comprising:

a master table listing a plurality of operational parameters for each of a plurality of unit operations, wherein each of said unit operations has an identifier code, each of said plurality of unit operations specifying at least one task in the batch processing manufacturing facility;

a calculation set list, accessible via said identifier code, listing equations to calculate material flow and equipment sizing requirements for each of said plurality of unit operations;

means for defining scheduling cycles of a sequence of said plurality of unit operations; and means for generating a block flow diagram using said sequence of said plurality of unit operations and said plurality of operational parameters.

10. The system of claim 9, further comprising:

means for generating a process time line using said operational parameters, said block flow diagram and said scheduling cycles wherein said process time line is used as a tool for batch processing and facility design.

11. The system of claim 10, wherein said batch production process is a biopharmaceutical batch production process.

12. A computer program product comprising a computer usable medium having computer readable program code means embodied in said medium for causing an application program to execute on a computer that schedules a batch production process, said computer readable program code means comprising:

a first computer readable program code means for causing the computer to identify a production process sequence, said production process sequence including a plurality of unit operations, each of said unit operations being identified by unit operation identifiers;

a second computer readable program code means for causing the computer to retrieve process parameter information from a master list for each of said unit operation identifiers in said production process sequence, said process parameter information including information on discrete tasks associated with each of said unit operations; and a third computer readable program code means for causing the computer to generate a process schedule that identifies initiation and completion times for each of said discrete tasks in said production process sequence.

13. A computer program product comprising a computer usable medium having computer readable program code means embodied in said medium for causing an application program to execute on a computer that simulates and models a batch processing manufacturing facility, said computer readable program code means comprising:

a first computer readable program code means for causing the computer to select a sequence of unit operations wherein each of said sequence of unit operations has an identifier code;

a second computer readable program code means for causing the computer to select a set of scheduling cycles for each of said sequence of unit operations;

a third computer readable program code means for causing the computer to reference a master table using said identifier code to obtain operational parameters for each of said sequence of unit operations; and a fourth computer readable program code means for causing the computer to generate a block flow diagram using said sequence of unit operations and said operational parameters.

14. The computer program product of claim 13, further comprising:

a fifth computer readable program code means for causing the computer to generate a process time line using said operational parameters, said block flow diagram and said set of scheduling cycles for each of said set of sequence of unit operations, wherein said process time line is used as a tool for batch processing and facility design.

15. The computer program product of claim 13, wherein said second computer readable program code means comprises:

a fifth computer readable program code means for causing the computer to select a cycles-per-unit-operation value for each of said sequence of unit operations;

a sixth computer readable program code means for causing the computer to select a cycles-per-batch value for a first set of at least two of said sequence of unit operations; and a seventh computer readable program code means for causing the computer to select a cycles-per-process value for a second set of at least two of said sequence of unit operations.

16. The computer program product of claim 15, wherein said first set and said second set are the same.

17. The computer program product of claim 15, wherein said second computer readable program code means further comprises:

an eighth computer readable program code means for causing the computer to specify an offset for each of said cycles per unit operation, said cycles per batch, and said cycles per process.

18. The computer program product of claim 13, wherein said fourth computer readable program code means comprises:

a fifth computer readable program code means for causing the computer to use said identifier code to access a calculation set list for each of said sequence of unit operations;

a sixth computer readable program code means for causing the computer to link a calculation set from said calculation set list for each of said sequence of unit operations; and a seventh computer readable program code means for causing the computer to calculate material flow and equipment sizing requirements for each of said sequence of unit operations using said operational parameters.

19. A method for scheduling a batch production process, comprising the steps of:

(1) identifying a production process sequence, said production process sequence including a plurality of unit operations, each of said unit operations being identified by unit operation identifiers; wherein:
  (a) a set of at least two of said plurality of unit operations is selected; and
  (b) a cycles-per-batch value is assigned to said set;
(2) retrieving process parameter information from a master list for each of said unit operation identifiers in said production process sequence, said process parameter information including information on discrete tasks associated with each of said unit operations; and
(3) generating a process schedule, based upon said cycles-per-batch values, that identifies initiation and completion times for each of said discrete tasks for each unit operation in said production process sequence.

20. A method for scheduling a batch production process, comprising the steps of:

(1) identifying a production process sequence, said production process sequence including a plurality of unit operations, each of said unit operations being identified by unit operation identifiers; wherein:
  (a) a set of at least two of said plurality of unit operations is selected; and
  (b) a cycles-per-process value is assigned to said set;
(2) retrieving process parameter information from a master list for each of said unit operation identifiers in said production process sequence, said process parameter information including information on discrete tasks associated with each of said unit operations; and
(3) generating a process schedule, based upon said cycles-per-process values, that identifies initiation and completion times for each of said discrete tasks for each unit operation in said production process sequence.

* * * * *